US010390368B2

(12) United States Patent
Itagaki et al.

(10) Patent No.: US 10,390,368 B2
(45) Date of Patent: Aug. 20, 2019

(54) COMMUNICATION DEVICE AND COMMUNICATION METHOD

(71) Applicant: SONY CORPORATION, Tokyo (JP)

(72) Inventors: Takeshi Itagaki, Saitama (JP); Tomoya Yamaura, Tokyo (JP); Yuichi Morioka, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/741,602

(22) PCT Filed: Jun. 22, 2016

(86) PCT No.: PCT/JP2016/068576
§ 371 (c)(1),
(2) Date: Jan. 3, 2018

(87) PCT Pub. No.: WO2017/038217
PCT Pub. Date: Mar. 9, 2017

(65) Prior Publication Data
US 2018/0199380 A1    Jul. 12, 2018

(30) Foreign Application Priority Data

Aug. 31, 2015  (JP) ................................ 2015-170031

(51) Int. Cl.
*H04W 74/08*    (2009.01)
*H04M 11/00*    (2006.01)
(Continued)

(52) U.S. Cl.
CPC ...... *H04W 74/0825* (2013.01); *H04B 17/318* (2015.01); *H04M 11/00* (2013.01);
(Continued)

(58) Field of Classification Search
CPC ......... H04W 74/0825; H04W 74/0816; H04W 74/08; H04W 84/12; H04B 17/318; H04M 1/74; H04M 11/00
See application file for complete search history.

(56) References Cited

U.S. PATENT DOCUMENTS

2009/0279427 A1    11/2009  Ji et al.
2013/0017794 A1     1/2013  Kloper et al.
(Continued)

FOREIGN PATENT DOCUMENTS

JP    6-37762 A      2/1994
JP    2008-60699 A   3/2008
(Continued)

OTHER PUBLICATIONS

International Search Report dated Sep. 13, 2016 in PCT/JP2016/068576, filed Jun. 22, 2016.
(Continued)

*Primary Examiner* — Afshawn M Towfighi
(74) *Attorney, Agent, or Firm* — Xsensus, LLP

(57) ABSTRACT

[Object] To provide a mechanism capable of securing transmission opportunities of a wireless LAN communication device in a situation in which a signal of a format different from a signal of wireless LAN communication is transmitted.
[Solution] Provided is a communication device, including: a signal processing unit configured to perform reception determination for a second signal having a different format from a first signal related to communication of a wireless local area network (LAN) standard; a control unit configured to control carrier sense or a communication parameter on a basis of the reception determination for the second signal; and a communication unit configured to perform transmission on a basis of the controlled carrier sense or the controlled communication parameter.

18 Claims, 29 Drawing Sheets

(51) Int. Cl.
*H04B 17/318* (2015.01)
*H04W 84/12* (2009.01)

(52) U.S. Cl.
CPC ... *H04W 74/0808* (2013.01); *H04W 74/0816* (2013.01); *H04W 84/12* (2013.01)

(56) References Cited

U.S. PATENT DOCUMENTS

| | | | |
|---|---|---|---|
| 2013/0051255 A1* | 2/2013 | Estevez | H04W 64/00 370/252 |
| 2015/0208253 A1 | 7/2015 | Kim et al. | |

FOREIGN PATENT DOCUMENTS

| | | |
|---|---|---|
| JP | 2012-109833 A | 6/2012 |
| JP | 2014-057362 A | 3/2014 |
| JP | 2015-070409 A | 4/2015 |
| JP | 2015-149542 A | 8/2015 |

OTHER PUBLICATIONS

Kwak et al, "Support for Deferral Management in 802.IIV", IEEE Draft, 11-05-0498-00-000V-TPC-EDT-KWAK-Rudolf, IEEE-SA Mentor, vol. 802.IIv, May 19, 2005 (May 19, 2005), pp. 1-10, XP017689123.
Extended European Search Report dated Mar. 26, 2019 in European Application No. 16841249.2-1215.

* cited by examiner

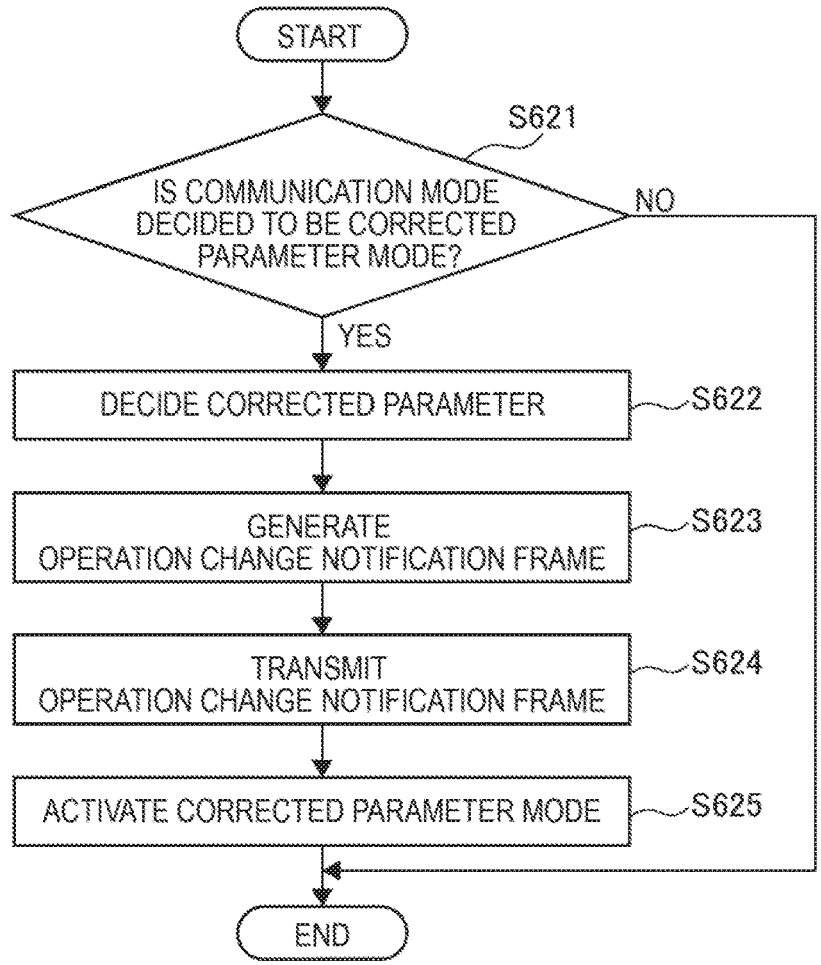
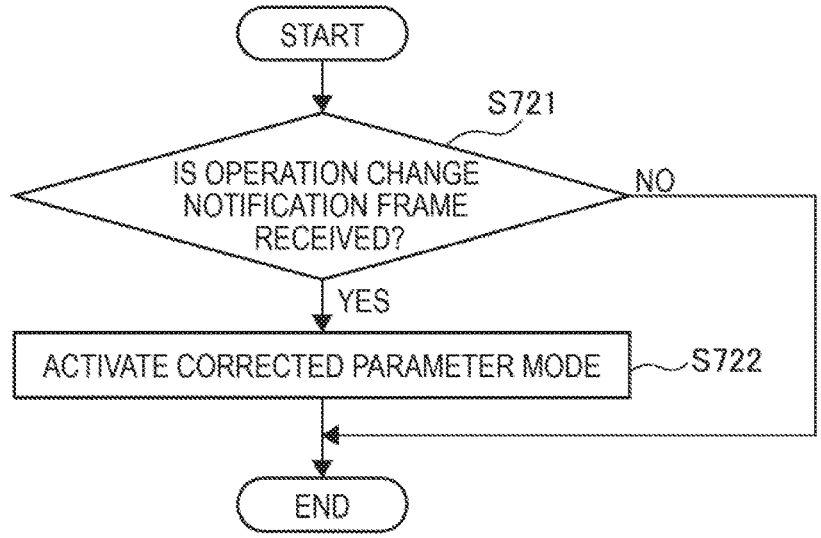

COMMUNICATION DEVICE AND COMMUNICATION METHOD

TECHNICAL FIELD

The present disclosure relates to a communication device and a communication method.

BACKGROUND ART

In recent years, wireless local area networks (LANs) have become widespread, and wireless LAN compatible products (hereinafter also referred to as "wireless communication devices") have increased accordingly. Since a possibility of a decrease in communication efficiency increases as wireless communication devices increase, there is a demand for an improvement in communication efficiency.

One reason for the decrease in the communication efficiency is packet collision in a wireless LAN. For example, in an autonomous distributed wireless LAN, there are cases in which a plurality of wireless communication devices with overlapping communication ranges transmit packets at the same timing, and in this case, packet collision is likely to occur, and the packets are unlikely to be received by wireless communication devices that are transmission destinations.

In this regard, in an autonomous distributed wireless LAN, a technique called carrier sense is employed in order to avoid packet collision. In carrier sense, a wireless communication device monitors a use situation of a wireless transmission path around itself for a predetermined period of time before transmitting a packet and determines whether or not the wireless transmission path is being used by another wireless communication device. In a case in which the wireless transmission path is determined to be being used, the wireless communication device suppresses packet transmission.

Here, in a case in which a wireless communication scheme is different, unfairness of packet transmission opportunities may occur between wireless communication devices having different wireless communication schemes. For example, in a case in which a communication range of one wireless communication device is narrower than a communication range of another wireless communication device, the one wireless communication device is more likely to determine that a wireless transmission path is being used through carrier sense than the other wireless communication device. Therefore, the transmission opportunities of the one wireless communication device are reduced as compared with the other wireless communication device.

On the other hand, an invention in which, in a wireless communication device using a normal wireless communication scheme and a proximity wireless communication scheme, in a case in which the proximity wireless communication scheme is used, the transmission power is set to a value lower than the transmission power in the normal wireless communication scheme, and sensitivity of the carrier sense is set to be lower than sensitivity in the normal wireless communication scheme is disclosed in Patent Literature 1. According to the invention disclosed in Patent Literature 1, in a case in which the proximity wireless communication scheme is used, it is possible to suppress a reduction in transmission opportunities as compared with the case in which the normal wireless communication scheme is used.

CITATION LIST

Patent Literature

Patent Literature 1: JP 2014-057362A

DISCLOSURE OF INVENTION

Technical Problem

However, in the invention disclosed in Patent Literature 1, transmission opportunities are likely to be suppressed in a situation in which a signal having a different format from a signal used in communication of a wireless LAN standard (hereinafter also referred to as "wireless LAN communication") is transmitted from another device. For example, a device (hereinafter referred to as a "non-wireless LAN communication device") that transmits a signal (hereinafter also referred to as a "non-wireless LAN signal") having a format different from a format of a signal related to the wireless LAN communication (hereinafter also referred to as a "wireless LAN signal") may transmit a signal on the basis of a communication protocol different from a communication protocol of the wireless LAN communication device or a criterion different from a communication protocol. In this case, a signal may be transmitted from the non-wireless LAN communication device even at a transmittable timing in the wireless LAN communication, and the wireless LAN communication device can suppress signal transmission accordingly. As a result, transmission opportunities of the wireless LAN communication device are reduced.

In this regard, the present disclosure proposes a mechanism capable of securing transmission opportunities of a wireless LAN communication device in a situation in which a signal of a format different from a signal of wireless LAN communication is transmitted.

Solution to Problem

According to the present disclosure, there is provided a communication device, including: a signal processing unit configured to perform reception determination for a second signal having a different format from a first signal related to communication of a wireless local area network (LAN) standard; a control unit configured to control carrier sense or a communication parameter on a basis of the reception determination for the second signal; and a communication unit configured to perform transmission on a basis of the controlled carrier sense or the controlled communication parameter.

Further, according to the present disclosure, there is provided a communication method, including: performing, by a signal processing unit, reception determination for a second signal having a different format from a first signal related to communication of a wireless local area network (LAN) standard; controlling, by a control unit, carrier sense or a communication parameter on a basis of the reception determination for the second signal; and performing, by a communication unit, transmission on a basis of the controlled carrier sense or the controlled communication parameter.

Advantageous Effects of Invention

As described above, according to the present disclosure, a mechanism capable of securing transmission opportunities of the wireless LAN communication device in a situation in which a signal of a format different from a signal of the wireless LAN communication is transmitted is provided. Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 21 is a flowchart conceptually illustrating an operation change control process of an AP according to the embodiment.

FIG. 22 is a flowchart conceptually illustrating an operation change control process of an STA according to the embodiment.

MODE(S) FOR CARRYING OUT THE INVENTION

Figure 1:
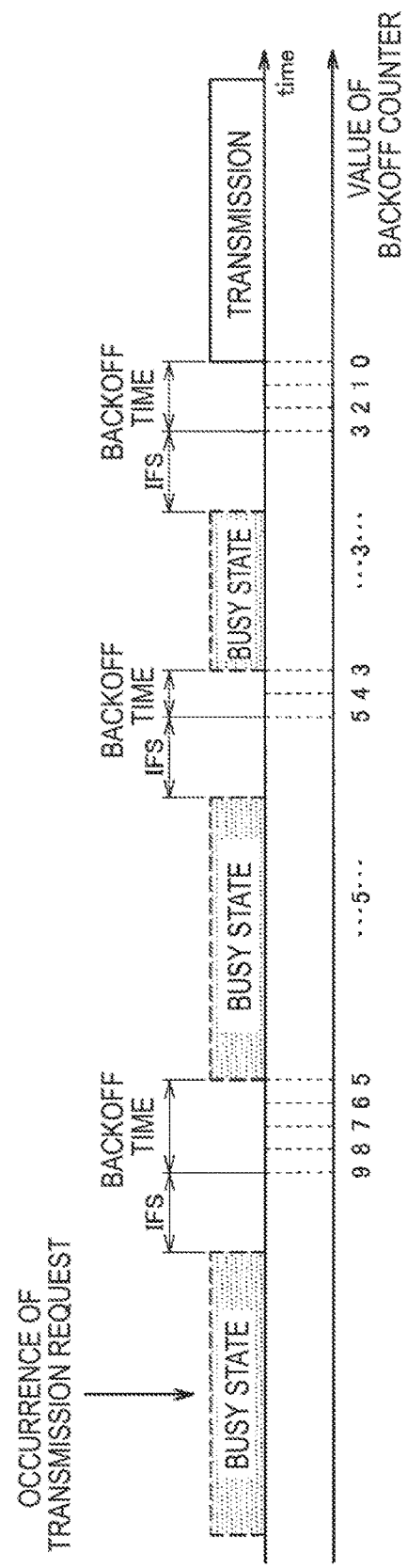
FIG. 1 is a diagram illustrating a status transition example of a wireless LAN communication device that performs carrier sense of a related art.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Further, in this specification and the drawings, a plurality of constituent elements having substantially the same functional configuration are sometimes distinguished by giving the same reference numerals followed by different numbers. For example, a plurality of structural elements having substantially the same function are distinguished if necessary such as an AP 100-1 and an AP 100-2. However, in a case in which it is not necessary to distinguish substantially the same functional components, only the same reference numerals are added. For example, in a case in which it is not necessary to particularly distinguish the AP 100-1 and the AP 100-2, they are referred to simply as an AP 100.

Further, the description will proceed in the following order.
1. Problem of related art
2. First embodiment (determination based on signal pattern/first communication mode)
2-1. Basic configuration of device
2-2. Detailed configuration of device
2-3. Process of device
2-4. Conclusion of first embodiment
3. Second embodiment (determination based on wireless LAN standard/second communication mode)
3-1. Detailed configuration of device
3-2. Process of device
3-3. Conclusion of second embodiment
4. Third embodiment (determination based on detection of non-wireless LAN signal/first communication mode)
4-1. Detailed configuration of device
4-2. Process of device
4-3. Conclusion of third embodiment
5. Fourth embodiment (determination based on signal pattern/first communication mode)
5-1. Detailed configuration of device
5-2. Process of device
5-3. Conclusion of fourth embodiment
6. Fifth embodiment (determination based on signal pattern/third communication mode)
6-1. Detailed configuration of device
6-2. Process of device
6-3. Conclusion of fifth embodiment
7. Application examples
8. Conclusion 1. Problem of Related Art First, a problem of a wireless LAN communication technique of a related art will be described.

In wireless LAN communication of the related art, carrier sense is used to avoid packet collision as described above. In carrier sense, the use situation of a wireless transmission path is monitored for a predetermined period of time before packet transmission, and it is determined whether or not the wireless transmission path is being used by other devices. In a case in which the wireless transmission path is determined to be being used, the packet transmission is suppressed.

Specifically, in a case in which reception power with a strength equal to or greater than a predetermined threshold value is detected during monitoring, the wireless LAN communication device determines that the wireless transmission path is being used by other devices. Further, in a case in which the wireless transmission path is determined to be being used, the wireless LAN communication device stands by without performing the packet transmission. Further, in the Institute of Electrical and Electronics Engineers (IEEE) 802.11 wireless LAN standard, the state in which the wireless transmission path is determined to be being used by carrier sense is specified to mean that a channel state is a busy state, and the state in which the wireless transmission path is determined not to be being used is specified to mean that the channel state is an idle state.

Here, the transmission standby time is managed using a counter. For example, in a distributed coordination function (DCF) and enhanced distributed channel access (EDCA) which are channel access algorithms of the IEEE 802.11 standard, it is determined whether or not the channel state is the idle state for a predetermined period of time using a counter called a backoff counter. Further, the packet is transmitted after a predetermined period of time elapses in the idle state. Further, a transmission standby process using carrier sense of the related art will be described with reference to FIG. 1. FIG. 1 is a diagram illustrating a status transition example of a wireless LAN communication device that performs carrier sense of the related art.

First, in a case in which a transmission request occurs, the wireless LAN communication device randomly decides a standby time called a random backoff. For example, the standby time is managed in units of time slots, and in the example of FIG. 1, nine time slots are decided as the random backoff. The wireless LAN communication device is supposed to start signal transmission after the random backoff expires.

The counter indicating the number of remaining time slots of the random backoff is called a backoff counter. The wireless LAN communication device determines whether or not the random backoff expires by decrementing the value of the backoff counter. Further, in a case in which the channel state is the busy state, the wireless LAN communication device does not decrement the value of the backoff counter.

Then, in a case in which the channel state transitions from the busy state to the idle state, the wireless LAN communication device stands by without performing transmission for a predetermined period of time before the random backoff. For example, the transmission standby time of the predetermined period of time is called an inter frame space (IFS). Further, in the IFS period, the value of the backoff counter is not decremented.

After the IFS elapses, the backoff counter is decremented with the passage of time, and if the value of the backoff counter becomes 0, signal transmission is started. For example, as illustrated in FIG. 1, after the IFS, the value of the backoff counter is decremented from 9 to 5 with the passage of time. In a case in which the channel state transitions back to the busy state, the decrement of the value of the backoff counter is stopped during the busy state and the IFS subsequent thereto. The decrement is restarted each time the IFS elapses. Further, if the value of the backoff counter becomes 0, the wireless LAN communication device starts the signal transmission. Further, in the following description, the state in which the value of the backoff counter is 0, that is, the state in which the random backoff expires, is also referred to as a state in which transmission authority is acquired.

Figure 2:
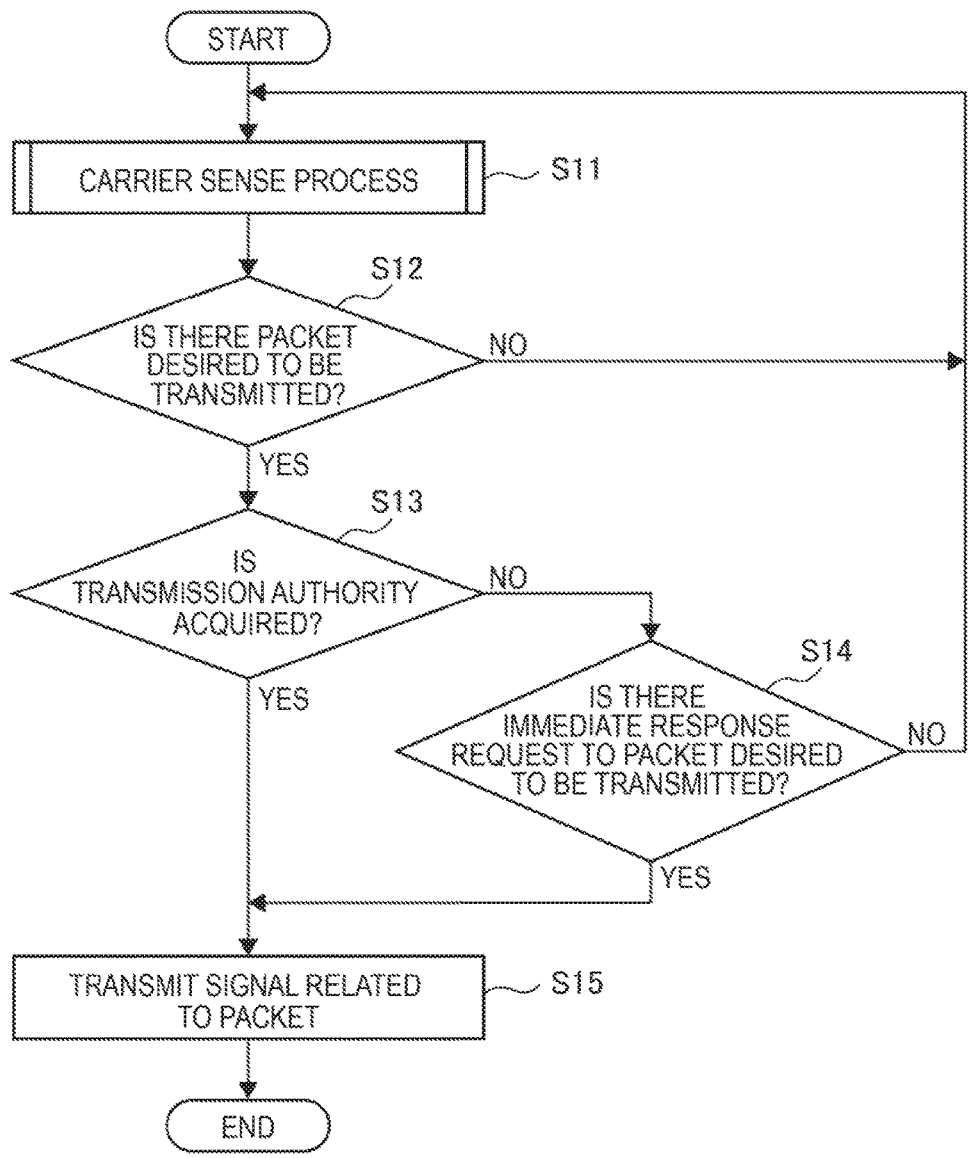
FIG. 2 is a flowchart conceptually illustrating an example of a signal transmission process using carrier sense of a related art.
Figure 3:
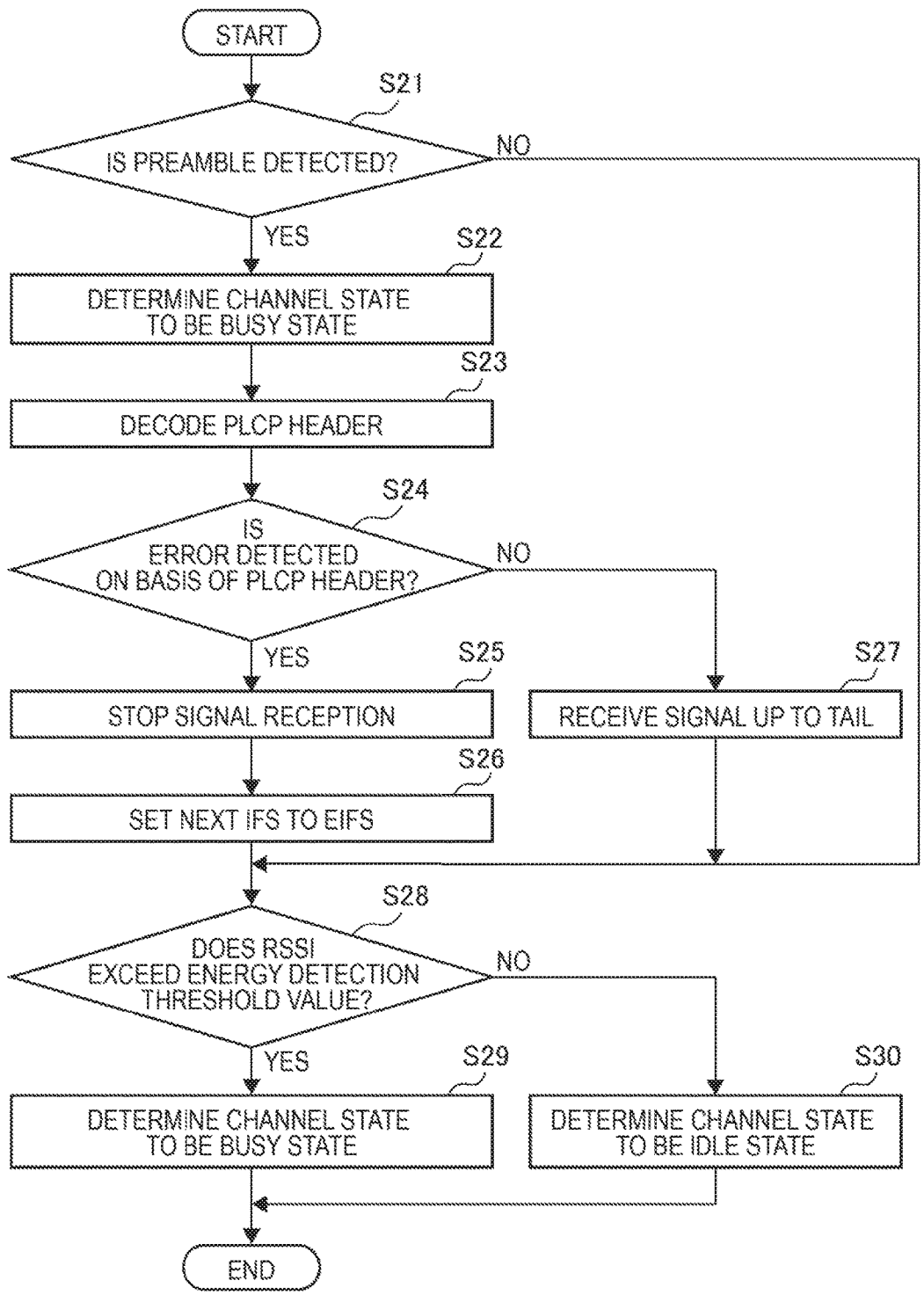
FIG. 3 is a flowchart conceptually illustrating an example of a carrier sense process of a related art.

Next, a signal transmission process using carrier sense of the related art will be described with reference to FIGS. 2 and 3. FIG. 2 is a flowchart conceptually illustrating an example of the signal transmission process using carrier sense of the related art, and FIG. 3 is a flowchart conceptually illustrating an example of a carrier sense process of the related art.

The wireless LAN communication device of the related art performs the carrier sense process before transmitting a signal (step S11). The details will be described later.

Then, the wireless LAN communication device of the related art determines whether or not there is a packet which is desired to be transmitted (step S12), and if it is determined that there is a packet which is desired to be transmitted, the wireless LAN communication device of the related art determines whether or not the transmission authority is acquired (step S13).

If the transmission authority is determined not to be acquired, the wireless LAN communication device of the related art determines whether or not there is an immediate response request to the packet which is desired to be transmitted (step S14).

If it is determined that the transmission authority is acquired or that there is an immediate response request, the wireless LAN communication device of the related art transmits a signal related to a packet (step S15).

Next, the carrier sense process of the related art will be described with reference to FIG. 3.

The wireless LAN communication device of the related art determines whether or not a preamble is detected (step S21). Specifically, the wireless LAN communication device of the related art includes a preamble detection correlator and determines whether or not an output of the preamble detection correlator exceeds a detection threshold value.

If the preamble is determined to be detected, the wireless LAN communication device of the related art determines that the channel state is the busy state (step S22), and decodes a physical layer convergence protocol (PLCP) header (step S23).

Then, the wireless LAN communication device of the related art detects an error on the basis of the PLCP header (step S24). Specifically, the wireless LAN communication device of the related art determines whether or not a cyclic redundancy check (CRC) calculation result for the PLCP header coincides with a CRC value included in the PLCP header.

In a case in which an error is detected, the wireless LAN communication device of the related art stops the signal reception (step S25) and sets the next IFS to an extended inter frame space (EIFS) (step S26).

In a case in which no error is detected, the wireless LAN communication device of the related art receives a signal up to the tail (step S27).

Further, in a case in which the preamble is determined not to be detected in step S21, the wireless LAN communication device of the related art determines whether or not a received signal strength indicator (RSSI) exceeds an energy detection threshold value (step S28).

In a case in which the RSSI is determined to exceed the energy detection threshold value, the wireless LAN communication device of the related art determines that the channel state is the busy state (step S29), and otherwise, the wireless LAN communication device of the related art determines that the channel state is the idle state (step S30).

As described above, the determination on carrier sense, that is, whether or not the channel state is the busy state (hereinafter also referred to as "busy determination"), is performed on the basis of the preamble detection or the energy detection. Further, as another busy determination method, there is a determination method using periodicity of an orthogonal frequency division multiplexing (OFDM) signal. Hereinafter, the determination using the periodicity of the OFDM signal is also referred to as "determination based on Mid Packet detection."

Here, the energy detection generally has a higher detection threshold value than the preamble detection. For example, in the IEEE 802.11 standard, the detection threshold value of the energy detection is specified as −62 dBm per 20 MHz, while the detection threshold value of the preamble detection is specified as −82 dBm per 20 MHz as an output value of the correlator converted to an antenna input. Further, the detection threshold value of the Mid Packet detection is specified as −75 dBm or −72 dBm per 20 MHz as the output value of the correlator converted to the antenna input.

In other words, a signal is less likely to be detected in the energy detection than in the preamble detection. On the other hand, both the preamble detection and the energy detection are used for detection of a wireless LAN signal as described above, but only the energy detection is used for detection of a non-wireless LAN signal. Therefore, the non-wireless LAN signal is less likely to be detected than the wireless LAN signal when a propagation loss and transmission power equivalent to those of the wireless LAN signal are assumed.

Further, the transmission control performed on the basis of the energy detection is not limited to the wireless LAN communication device and may be applied to a non-wireless LAN communication device. However, the transmission control performed on the basis of the preamble detection is an operation specific to the wireless LAN communication device and thus is not necessarily applied to the non-wireless LAN communication device.

Figure 4:
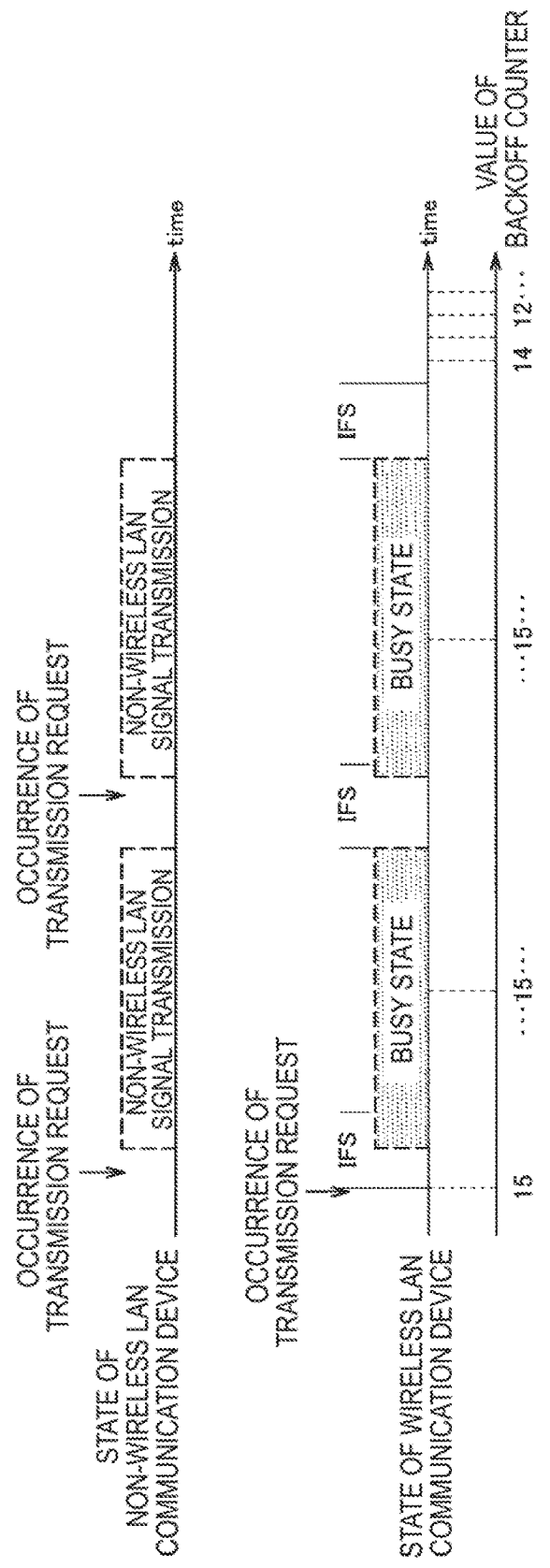
FIG. 4 is a diagram illustrating a status transition example of a wireless LAN communication device that performs carrier sense of a related art in a situation in which a wireless LAN communication device and a non-wireless LAN communication device are mixed.

Therefore, in the wireless LAN communication device, the transmission using carrier sense is more likely to be suppressed than in the non-wireless LAN communication device. As a result, unfairness of transmission opportunities may arise between the wireless LAN communication device and the non-wireless LAN communication device. Further, the unfairness of transmission opportunities will be described with reference to FIG. 4. FIG. 4 is a diagram illustrating a status transition example of the wireless LAN communication device that performs carrier sense of the related art in a situation in which the wireless LAN communication device and the non-wireless LAN communication device are mixed.

If a transmission request occurs, the wireless LAN communication device determines the random backoff and stands by during the IFS time. For example, as illustrated in FIG. 4, if the transmission request occurs, the wireless LAN communication device sets the value of the backoff counter related to the random backoff to 15 and stands by while maintaining the value of the backoff counter until the IFS period elapses.

If the transmission request occurs, the non-wireless LAN communication device may transmit the non-wireless LAN signal without waiting. For example, as illustrated in FIG. 4, if a transmission request is made by the non-wireless LAN communication device while the wireless LAN communication device stands by during the IFS time, the non-wireless LAN communication device starts the transmission of the non-wireless LAN signal during the IFS time.

If a signal is detected in the standby state, the wireless LAN communication device stands by until signal detection ends. For example, as illustrated in FIG. 4, the wireless LAN communication device determines that the channel state is the busy state because the non-wireless LAN signal is detected and stands by until the busy state is canceled while maintaining the value of the backoff counter. Further, if the busy state is canceled, the wireless LAN communication device stands by during the IFS time.

If the transmission request occurs again after the signal transmission ends, the non-wireless LAN communication device may start transmission of the non-wireless LAN signal without waiting. Further, in this case, although the wireless LAN signal is first transmitted, since the non-wireless LAN communication device does not detect the wireless LAN signal, the transmission is not suppressed.

If the wireless LAN communication device ends reception of the non-wireless LAN signal, the wireless LAN communication device stands by again during the IFS time. For example, if the non-wireless LAN signal ceases to be received, the wireless LAN communication device determines that the channel state has transitioned to the idle state and stands by until the IFS time elapses while maintaining the value of the backoff counter. However, if the non-wireless LAN signal is received again in the standby state, the wireless LAN communication device determines that the channel state is the busy state and stands by until the busy state is canceled while maintaining the value of the backoff counter.

As described above, in the situation in which the non-wireless LAN communication device that does not perform the preamble detection and the wireless LAN communication device are mixed, the transmission of the wireless LAN communication device can be suppressed as compared with the non-wireless LAN communication device. Therefore, transmission opportunities of the wireless LAN communication device decrease as compared with the non-wireless LAN communication device, and the unfairness of transmission opportunities occurs.

In this regard, the present disclosure proposes a mechanism capable of securing transmission opportunities of the wireless LAN communication device in the situation in which a signal of a format different from the signal of the wireless LAN communication is transmitted. The details will be described below. Further, for the sake of convenience of description, wireless LAN communication devices according to first to fifth embodiments are distinguished by attaching numbers corresponding to the embodiments to the end such as wireless LAN communication devices 100-1 to 100-5.

2. First Embodiment (Determination Based on Signal Pattern/First Communication Mode)

The problem of related art has been described above. Next, the wireless LAN communication system according to the first embodiment of the present disclosure will be described. The wireless communication system according to the present embodiment performs a reception determination for the non-wireless LAN signal on the basis of a signal pattern and performs detection and reception of a signal in a first communication mode.

2-1. Basic Configuration

Figure 5:
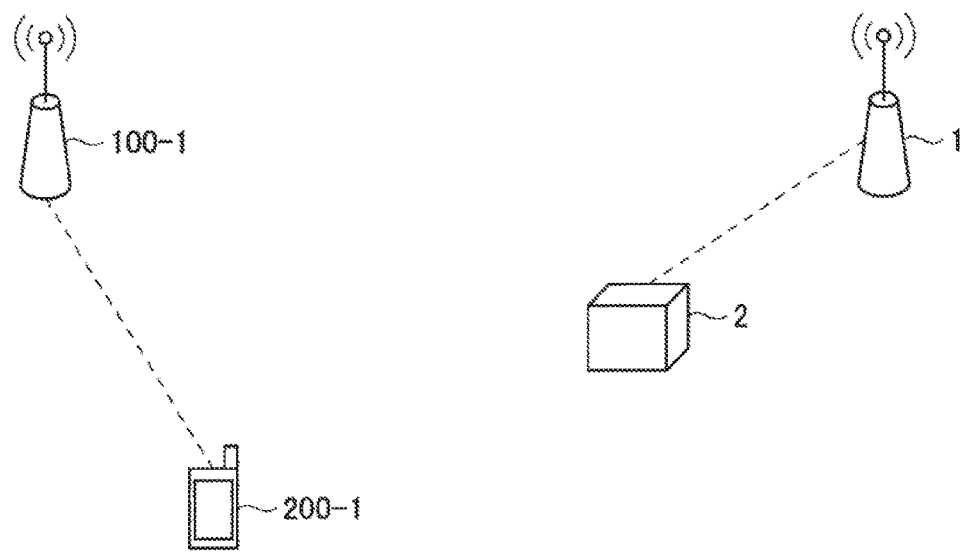
FIG. 5 is a diagram illustrating an example of a schematic physical configuration of a wireless LAN communication system and a non-wireless LAN communication system according to a first embodiment of the present disclosure.

First, a configuration of the wireless LAN communication system according to the first embodiment of the present disclosure will be described with reference to FIG. 5. FIG. 5 is a diagram illustrating an example of a schematic physical configuration of a wireless LAN communication system and a non-wireless LAN communication system according to the first embodiment of the present disclosure.

As illustrated in FIG. 5, the wireless LAN communication system includes a wireless LAN communication device 100-1 and a wireless LAN communication device 200-1. The wireless LAN communication device 100-1 operates as an access point (AP), and the wireless LAN communication device 200-1 operates as a station (STA). Hereinafter, the wireless LAN communication devices 100-1 and 200-1 are also referred to as the wireless LAN communication device 100-1 (200-1) in a case in which there is no need to distinguish the wireless LAN communication devices 100-1 and 200-1. Further, the wireless LAN communication device 100-1 is also referred to as an AP 100-1, and the wireless LAN communication device 200-1 is also referred to as an STA 200-1.

Further, as illustrated in FIG. 5, the non-wireless LAN communication system includes a non-wireless LAN communication device 1 and a non-wireless LAN communication device 2. The non-wireless LAN communication device 1 has a function of an AP, and the non-wireless LAN communication device 2 has a function of an STA. Examples of the non-wireless LAN communication device include a Bluetooth (registered trademark) communication device and mobile phone communication devices according to Long Term Evolution-Licensed Assisted Access (LTE-LAA) or LTE-Unlicensed (LTE-U). Further, the non-wireless LAN communication device may be a non-communication device that transmits radio waves. For example, as a device that transmits radio waves, there is a microwave oven.

Figure 6:
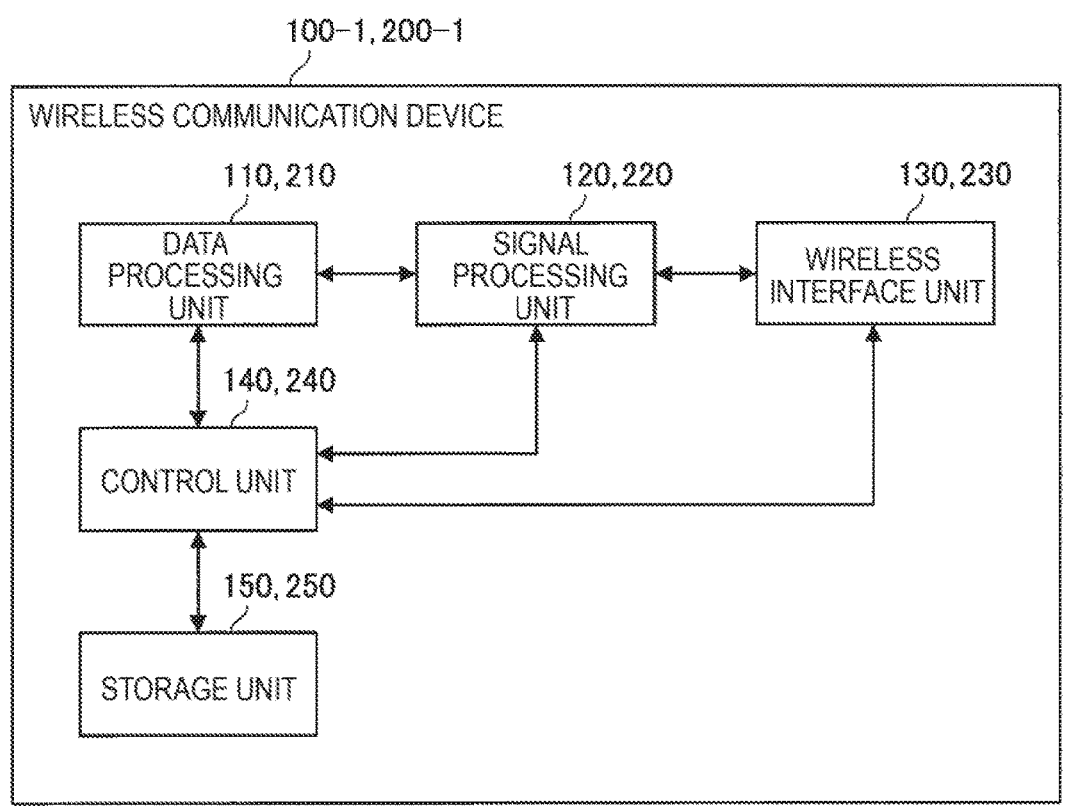
FIG. 6 is a block diagram illustrating an example of a schematic functional configuration of a wireless LAN communication device according to the embodiment.

Next, a basic functional configuration of the wireless LAN communication device 100-1 (200-1) will be described with reference to FIG. 6. FIG. 6 is a block diagram illustrating an example of a schematic functional configuration of the wireless LAN communication device 100-1 (200-1) according to the first embodiment of the present disclosure.

As illustrated in FIG. 6, the wireless LAN communication device 100-1 (200-1) includes a data processing unit 110 (210), a signal processing unit 120 (220), a wireless interface unit 130 (230), a control unit 140 (240), and a storage unit 150 (250). Further, the signal processing unit 120 (220) and the wireless interface unit 130 (230) are also referred to collectively as a wireless communication unit.

The data processing unit 110 (210) performs a process for transmission and reception on data as a part of the communication unit. Specifically, the data processing unit 110 (210) generates a frame on the basis of data provided from a communication upper layer and provides the generated frame to the signal processing unit 120 (220). For example, the data processing unit 110 (210) performs a process of generating a frame (or packet) from data and adding, for example, a media access control (MAC) header for MAC and an error detection code to the generated frame. Further, the data processing unit 110 (210) extracts data from a received frame and provides the extracted data to the communication upper layer. For example, the data processing unit 110 (210) acquires data by performing analysis of the MAC header, code error detection and correction, a reordering process, and the like on the received frame. Further, in a case in which information related to a setting of a network allocation vector (NAV) is stored in the header of the received frame, the data processing unit 110 (210) notifies the control unit 140 (240) of the presence or absence of the setting of the NAV.

The signal processing unit 120 (220) performs signal processing such as modulation on the frame. Specifically, the signal processing unit 120 (220) generates a symbol stream by performing encoding, interleaving, modulation, and addition of the PLCP header and the PLCP preamble on the frame provided from the data processing unit 110 (210) in accordance with a coding and modulation scheme set by the control unit 140 (240). Then, the signal processing unit 120 (220) provides a generated symbol stream to the wireless interface unit 130 (230). Further, the PLCP preamble is used for frame detection and propagation path gain estimation, and the PLCP header includes information for demodulating a portion following the PLCP header, for example, information for modulating a data portion and information indicating a frame length and the like. Further, the signal processing unit 120 (220) acquires a frame by performing demodulation, decoding, and the like on the symbol stream obtained by the process of the wireless interface unit 130 (230) and provides the acquired frame to the data processing unit 110 (210) or to the control unit 140 (240). Further, the signal processing unit 120 (220) carries out the carrier sense process.

The wireless interface unit 130 (230) performs transmission and reception of a signal via an antenna as a part of the communication unit. Specifically, the wireless interface unit 130 (230) performs conversion into an analog signal, amplification, filtering, and frequency up-conversion on the signal related to the symbol stream obtained in the process of the signal processing unit 120 (220). Then, the wireless interface unit 130 (230) transmits the processed signal through the antenna. Further, the wireless interface unit 130 (230) carries out a process opposite to the case of the signal transmission such as frequency down-conversion and conversion into a digital signal on the signal obtained from the antenna.

The control unit 140 (240) generally controls the operation of the wireless LAN communication device 100-1 (200-1). Specifically, the control unit 140 (240) performs, for example, a process such as transfer of information between functions, setting of a communication parameter, and scheduling of a frame (or a packet) in the data processing unit 110 (210). Further, the control unit 140 (240) controls signal transmission control on the basis of a result of the carrier sense process performed by the signal processing unit 120 (220).

The storage unit 150 (250) stores information used in the processes of the data processing unit 110 (210), the signal processing unit 120 (220), and the control unit 140 (240). Specifically, the storage unit 150 (250) stores information stored in the frame, information acquired from the frame, information for carrier sense control, information of a communication parameter, and the like.

2-2. Detailed Configuration

Next, a function of the wireless LAN communication device 100-1 (200-1) according to the present embodiment will be described in detail.
((Function of AP))
First, the function of the AP 100-1 will be described in detail.
(Monitoring of Non-Wireless LAN Signal)
The AP 100-1 monitors a reception signal. Specifically, the signal processing unit 120 performs the reception determination for the non-wireless LAN signal serving as a second signal having a different format from a wireless LAN signal serving as a first signal. Then, the signal processing unit 120 provides the result of the reception determination to the control unit 140. More specifically, the signal processing unit 120 performs the reception determination for the non-wireless LAN signal on the basis of the result of determination on whether or not the reception signal is the wireless LAN signal.

More specifically, the signal processing unit 120 determines whether or not the reception signal is the wireless LAN signal on the basis of the signal pattern of the reception signal. More specifically, the signal pattern of the reception signal includes a signal pattern in the preamble of the reception signal. For example, the signal processing unit 120 monitors an output value of the correlator for the preamble detection of the wireless LAN signal. In a case in which the output value of the preamble detection correlator for the reception signal exceeds a detection threshold value, the signal processing unit 120 determines that the wireless LAN signal is detected. Therefore, in a case in which the output value of the correlator for the preamble detection for the reception signal is equal to or less than the detection threshold value, the reception signal is likely to be the non-wireless LAN signal.

In this regard, the signal processing unit 120 performs the reception determination for the non-wireless LAN signal further on the basis of the reception signal strength. For example, the signal processing unit 120 monitors the RSSI of the reception signal. In a case in which the RSSI for the reception signal exceeds a first threshold value, and the output value of the preamble detection correlator does not exceed the detection threshold value, that is, the wireless LAN signal is determined not to be detected, the signal processing unit 120 determines that the non-wireless LAN signal is detected. Further, the first threshold value may be substantially the same value as the energy detection threshold value in carrier sense of the related art and may be, for example, −62 dBm per 20 MHz. Of course, the first threshold value may be another value or a value designated from the AP 100-1.

Further, the signal processing unit 120 may determine whether or not the reception signal is the wireless LAN signal on the basis of the periodicity of the reception signal. For example, the signal processing unit 120 monitors the output value of the correlator for Mid Packet detection of the wireless LAN signal. In a case in which the output value of the correlator for Mid Packet detection for the reception signal exceeds the detection threshold value, the signal processing unit 120 determines that the wireless LAN signal is detected. Further, in a case in which the RSSI for the reception signal exceeds the first threshold value, when the output value of the preamble detection correlator does not exceed the detection threshold value, and the output value of the correlator for the Mid Packet detection does not exceed the detection threshold value, the signal processing unit 120 determines that the non-wireless LAN signal is detected. In this case, it is possible to reduce a possibility of erroneous determination on whether a signal which has not undergone the preamble detection since it is received during reception of another signal is the wireless LAN signal or the non-wireless LAN signal.

Further, the AP 100-1 records a monitoring result for the non-wireless LAN signal. More specifically, in a case in which the non-wireless LAN signal is detected, the AP 100-1 records information related to the detection of the non-wireless LAN signal (hereinafter also referred to as "detection information"). More specifically, in a case in which the non-wireless LAN signal is determined to be detected, the signal processing unit 120 gives a notification indicating the detection determination result for the non-wireless LAN signal to the control unit 140. The control unit 140 generates the detection information for the non-wireless LAN signal on the basis of a detection determination result to be notified of and stores the generated detection information in the storage unit 150.

For example, as the detection determination result for the non-wireless LAN signal, the signal processing unit 120 gives a notification indicating the presence or absence of detection of the non-wireless LAN signal and a time from the start to the end of detection (hereinafter also referred to as a "detection time") to the control unit 140. The control unit 140 generates or updates the number of detections and a total detection time serving as the detection information on the basis of the presence/absence of detection and the detection time. Then, the detection information is stored in the storage unit 150. Further, the detection information may be only either of the number of detections and the total detection time. Further, the signal processing unit 120 may generate and update the detection information.

(Operation Change Control and Operation Change Notification)

The AP 100-1 controls a communication operation on the basis of the monitoring result for the reception signal. Specifically, the control unit 140 controls carrier sense on the basis of the reception determination for the non-wireless LAN signal. More specifically, the control unit 140 determines a communication mode related to the control of carrier sense on the basis of the detection information stored in the storage unit 150. For example, the control unit 140 determines whether or not at least one of the number of detections and the total detection time serving as the detection information exceeds a threshold value. In a case in which at least one of the number of detections and the total detection time is determined to exceed the threshold value, the control unit 140 sets the communication mode to the first communication mode which is one of extended operation modes (hereinafter also referred to as an "extended carrier sense mode"). Further, instead of setting the communication mode to the extended carrier sense mode, the extended carrier sense mode may be activated or set to enable. Further, after the communication mode is decided to be set to the extended carrier sense mode, and an operation change notification frame to be described later is transmitted, the communication mode may be set to the extended carrier sense mode.

Figure 7:
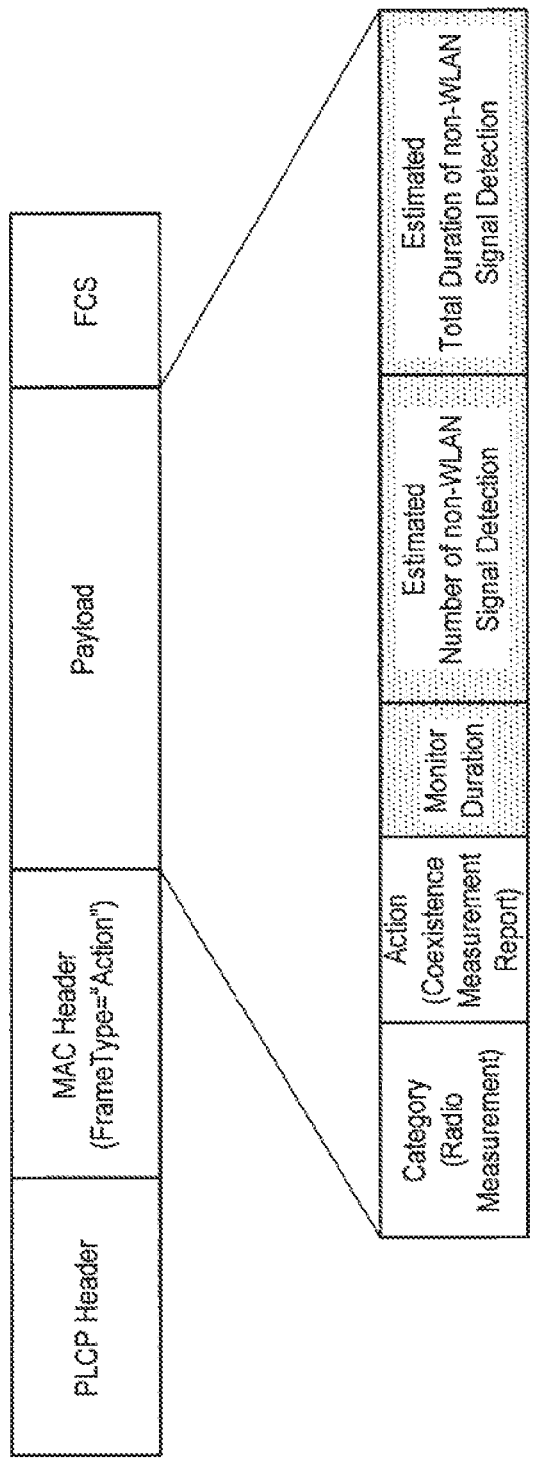
FIG. 7 is a diagram illustrating a configuration example of a monitoring result notification frame communicated in a wireless LAN communication system according to the embodiment.

Further, the monitoring result may be acquired from other wireless LAN communication devices. In other words, the reception determination for the non-wireless LAN signal includes reception of a signal related to the result of the reception determination for the non-wireless LAN signal. For example, the control unit 140 determines the communication mode on the basis of the detection information of the non-wireless LAN signal included in a monitoring result notification frame received from the STA 200-1. Further, the monitoring result notification frame will be described in detail with reference to FIG. 7. FIG. 7 is a diagram illustrating a configuration example of the monitoring result notification frame communicated in the wireless LAN communication system according to the present embodiment.

As illustrated in FIG. 7, the monitoring result notification frame includes fields such as a PLCP Header, a MAC Header, a Payload, and a frame check sequence (FCS). Further, "Action" is stored in a sub field Frame Type of the MAC Header field.

As illustrated in FIG. 7, the Payload field includes Monitor Duration in which information related to monitoring is stored, Estimated Number of non-WLAN Signal Detection in which the detection information is stored, and Estimated Total Duration of non-WLAN Signal Detection in addition to Category and Action. Further, "Radio Measurement" is stored in the Category field, and "Coexistence Measurement Report" is stored in the Action field.

Information indicating a monitoring period is stored in the Monitor Duration field. Further, information indicating the number of detections of the non-wireless LAN signal is stored in the Estimated Number of non-WLAN Signal Detection field, and information indicating the total detection time of the non-wireless LAN signal is stored in the Estimated Total Duration of non-WLAN Signal Detection field.

Further, the monitoring result notification frame is not limited to the frame having the above configuration, and various configurations can be employed as long as at least the information related to the monitoring and the detection information are stored.

Figure 8:
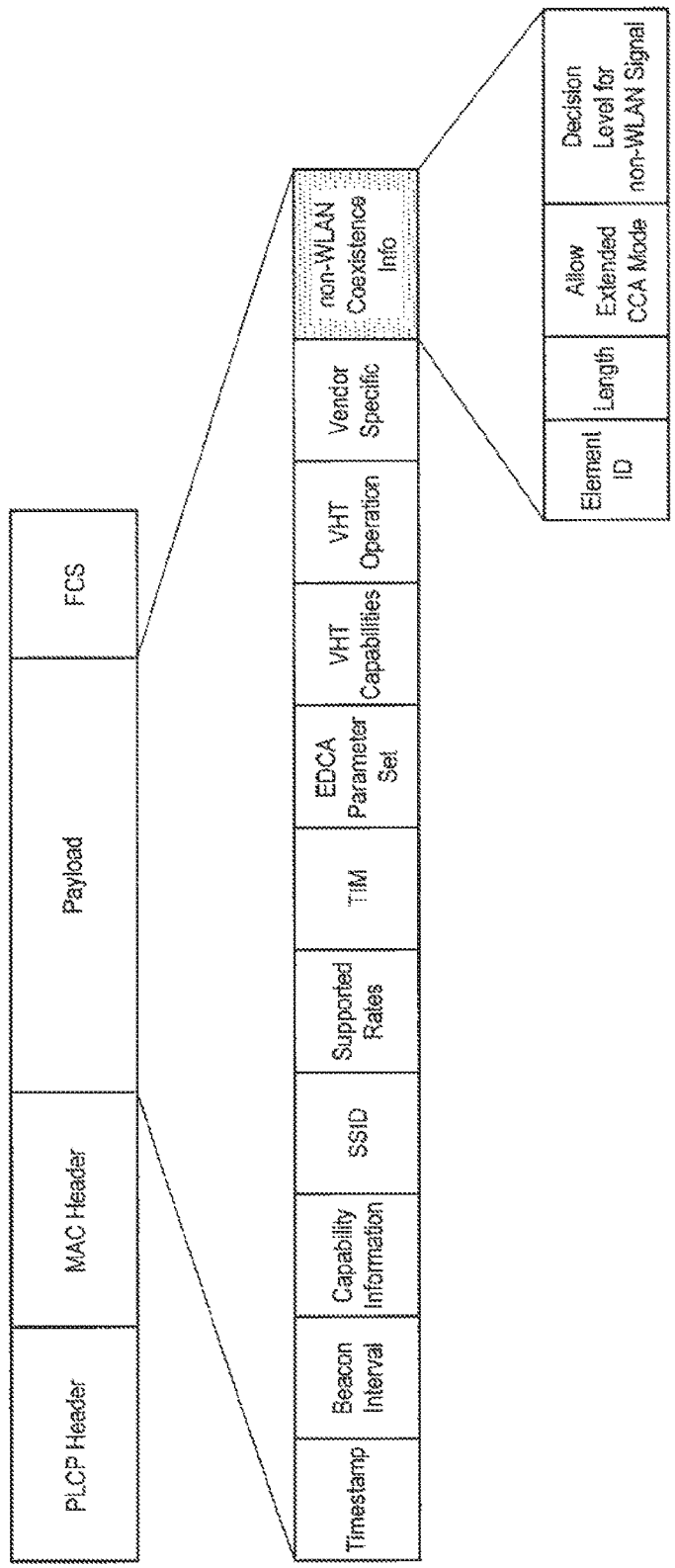
FIG. 8 is a diagram illustrating a configuration example of an operation change notification frame communicated in a wireless LAN communication system according to the embodiment.

Further, the AP 100-1 gives a notification indicating the information related to the determined communication mode to the STA 200-1. Specifically, if the communication mode is determined to transition to the extended carrier sense mode on the basis of the detection information, the control unit 140 causes the data processing unit 110 to generate a frame (hereinafter also referred to as an "operation change notification frame") including information related to the determined communication mode (hereinafter also referred to as "communication mode setting information"). Then, the generated frame is transmitted to the STA 200-1 through the wireless communication unit. Further, the communication mode setting information may be used as a request for changing the communication mode to the set communication mode. Further, the operation change notification frame according to the present embodiment will be described in detail with reference to FIG. 8. FIG. 8 is a diagram illustrating a configuration example of the operation change notification frame communicated in the wireless LAN communication system according to the present embodiment.

As illustrated in FIG. 8, the operation change notification frame includes fields such as a PLCP Header, a MAC Header, a Payload, and an FCS. For example, the operation change notification frame may be a beacon frame.

As illustrated in FIG. 8, the Payload field includes such as Timestamp, Beacon Interval, Capability Information, Service Set Identifier (SSID), Supported Rates, Traffic Indication Message (TIM), Enhanced Distributed Channel Access (EDCA) Parameter Set, Very High Throughput (VHT) Capabilities, VHT Operation, VHT Specific, and non-WLAN Coexistence Info in which the communication mode setting information is stored.

As illustrated in FIG. 8, the non-WLAN Coexistence Info field includes fields such as Element ID, Length, Allow Extended Clear Channel Assessment (CCA) Mode, and Decision Level for non-WLAN Signal.

Information indicating that the set extended carrier sense mode is used is stored in the Allow Extended CCA Mode field, and a bandwidth serving as a processing target in the set communication mode, and information specifying a threshold value (a second threshold value) of the RSSI used in carrier sense in the communication mode are stored in the Decision Level for non-WLAN Signal field. Further, in a case in which the set communication mode is used at all available bandwidths, the information specifying the bandwidth may not be stored.

Further, the operation change notification frame is not limited to the frame having the above configuration, and various configurations can be employed as long as at least the communication mode setting information is stored.

(First Communication Mode: Extended Carrier Sense Mode)

The AP 100-1 performs detection and reception of a signal according to the extended carrier sense mode set on the basis of the reception determination for the non-wireless LAN signal. Specifically, the control unit 140 causes the wireless communication unit to perform transmission on the basis of carrier sense controlled on the basis of the reception determination for the non-wireless LAN signal. More specifically, the control of carrier sense includes control of a carrier sense time.

Figure 9:
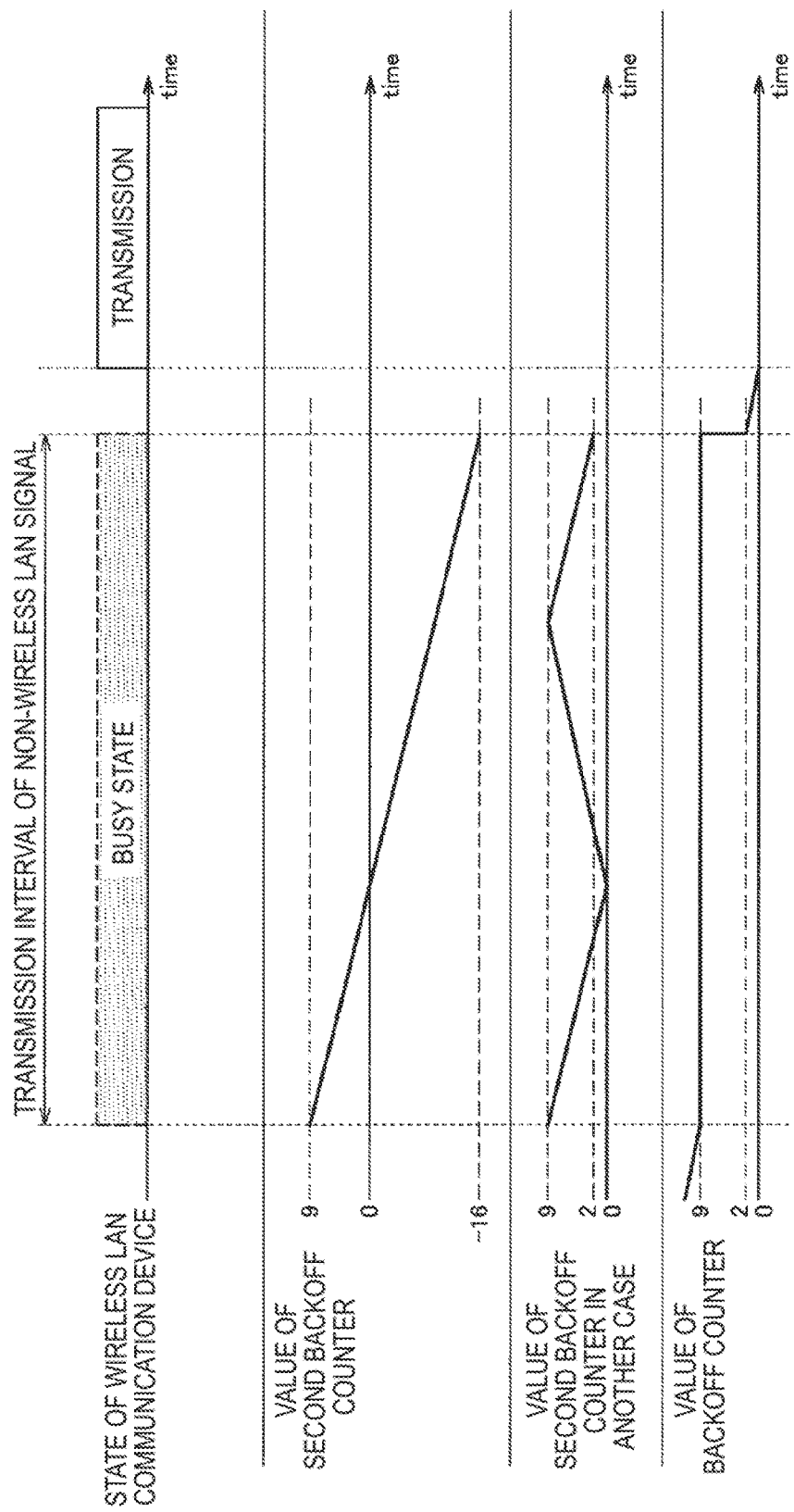
FIG. 9 is a diagram illustrating a status transition and a change in each value used in a standby time process of an AP that performs carrier sense according to the embodiment.

In detail, the carrier sense time includes a standby time from a time point at which the signal ceases to be received, and the signal processing unit 120 consumes the standby time while the non-wireless LAN signal is being received. In further detail, the standby time includes the random backoff. Further, the carrier sense process in the extended carrier sense mode will be described with reference to FIG. 9. FIG. 9 is a diagram illustrating a status transition and a change in each value used in the standby time process of the AP 100-1 that performs carrier sense according to the present embodiment.

First, the signal processing unit 120 sets the random backoff if a transmission request occurs. For example, if the transmission request occurs, the signal processing unit 120 determines the random backoff to be 15 time slots and sets a value of the backoff counter to 15.

Then, the signal processing unit 120 decrements the value of the backoff counter while the signal is not being received. For example, the signal processing unit 120 decrements the value of the backoff counter while the channel state is determined to be the idle state by carrier sense, that is, while the signal is not detected in the preamble detection and the energy detection.

If the non-wireless LAN signal is detected, the signal processing unit 120 sets a second backoff counter. For example, if the channel state transitions to the busy state, that is, if no signal is detected in the preamble detection, and a signal is detected in the energy detection, the signal processing unit 120 sets 9 which is the value of the backoff counter to the second backoff counter.

While the detection of the non-wireless LAN signal is continuing, the signal processing unit 120 decrements the value of the second backoff counter. For example, as illustrated in a stage of the value of the second backoff counter in FIG. 9, the signal processing unit 120 decrements the value of the second backoff counter from 9 while the channel state is the busy state.

Thereafter, if the detection of the non-wireless LAN signal ends, the signal processing unit 120 sets the value of the second backoff counter as the value of the backoff counter. For example, if the channel state transitions to the idle state, the signal processing unit 120 sets the value of the second backoff counter to the backoff counter. Further, the example in which the value of the counter is actually decremented in the non-wireless LAN signal using the second backoff counter has been described above, but when the detection of the non-wireless LAN signal ends, a value obtained by the decrement may be calculated, and the calculated value may be set as the value of the backoff counter.

Here, in a case in which the standby time is completely consumed when the reception of the non-wireless LAN signal is completed, the signal processing unit 120 sets the standby time to be a time shorter than before the standby time is consumed. Specifically, in a case in which the value of the second backoff counter is 0 or less when the channel state transitions to the idle state, the signal processing unit 120 sets one of the following first to third values as the value of the backoff counter.

As first value, the signal processing unit 120 sets 0 as the value of the backoff counter. In this case, after the channel state transitions to the idle state, the wireless communication unit performs transmission without waiting.

As second value, the signal processing unit 120 sets a value between the value before the decrement and 0 as the value of the backoff counter. Specifically, if the channel state transitions to the busy state, the decrement of the value of the second backoff counter is started, and if the value of the second backoff counter becomes 0, the increment is started. Further, if the value of the second backoff counter reaches a value at which the decrement start, the decrement is started again. While the channel state is the busy state, the signal processing unit 120 sets a value obtained by repeating the above process as the value of the backoff counter.

For example, as illustrated in a stage of the value of the second backoff counter in another case of FIG. 9, the value of the second backoff counter is decremented to 0 after it is set to 9 and is incremented until it becomes 9 if it becomes 0. Then, the value of the second backoff counter is decremented again if it becomes 9 and becomes 2 when the busy state ends. Further, as illustrated in a stage of the value of the backoff counter in FIG. 9, the value of the second backoff counter is set as the value of the backoff counter.

Further, the second value described above may be calculated when the busy state ends, and the calculated value may be set as the value of the backoff counter. For example, in a case in which the value of the second backoff counter is a negative value, the value of the second backoff counter is set to a difference with 0, that is, an absolute value of the value of the second backoff counter. Further, in a case in which the value of the second backoff counter is equal to or greater than the value before the decrement, a value obtained by subtracting the difference with the value before the decrement from the value before the decrement is set as the value of the second backoff counter.

Further, the value of the backoff counter may be set to the value of the backoff counter before the decrement, that is, the value between the initial value of the backoff counter and 0 and may be set to a value between the value of the second backoff counter before the decrement and 0.

As a third value, the signal processing unit 120 sets the value of the backoff counter to the value between the value before the decrement and 0 in a method different from the second value setting method. For example, the signal processing unit 120 randomly selects the value from the value between 0 and the value of the backoff counter or the value of the second backoff counter before the decrement when the busy state ends. Then, the signal processing unit 120 sets the selected value as the value of the backoff counter.

Then, the signal processing unit 120 decrements the value of the backoff counter, and if the value of the backoff counter becomes 0, the signal processing unit 120 causes the wireless interface unit 130 to transmit the signal. For example, in a case in which the set value of the backoff counter is not 0, the signal processing unit 120 decrements the value of the backoff counter. Further, if the value of the backoff counter becomes 0, the signal related to the transmission request is transmitted through the wireless communication unit.

Here, after the detection of the non-wireless LAN signal ends, a standby time of a predetermined period of time is not set. For example, the signal processing unit 120 does not set the standby time based on the IFS after the busy state ends, and starts to decrement the value of the backoff counter. Further, it is not denied that the standby time of the predetermined period of time is set.

Further, in the extended carrier sense mode, the AP 100-1 additionally uses the second threshold value as the detection threshold value of the energy detection in carrier sense. Specifically, the signal processing unit 120 uses the first threshold value corresponding to the energy detection threshold value used in the normal carrier sense and the second threshold value included in the operation notification frame as the energy detection threshold value in carrier sense. The details will be described in a flowchart to be described later. Further, the second threshold value is a value higher than the energy detection threshold value in the normal carrier sense.

((Function of STA))

Next, the function of the STA 200-1 will be described in detail.

(Monitoring of Non-Wireless LAN Signal)

The STA 200-1 monitors the reception signal. Further, since the monitoring is substantially the same as the monitoring of the AP 100-1 described above, description thereof is omitted.

(Notification of Monitoring Result)

The STA 200-1 gives a notification indicating the monitoring result to the AP 100-1. More specifically, the control unit 240 causes the data processing unit 210 to generate a monitoring result notification frame including information indicating the recorded monitoring result, and the generated monitoring result notification frame is transmitted to the AP 100-1 through the wireless communication unit. For example, the control unit 240 causes the data processing unit 210 to generate the monitoring result notification frame on the basis of the end of the monitoring period or the occurrence of a predetermined event. Further, since the monitoring result notification frame has been described above, description thereof is omitted.

(Operation Change Control)

The STA 200-1 controls a communication operation on the basis of the monitoring result for the reception signal. Further, since the control of the communication operation is substantially the same as the control of the communication operation of the AP 100-1 described above, description thereof is omitted.

Further, the STA 200-1 may control the communication operation on the basis of the operation change notification received from another wireless LAN communication device instead of or in addition to the monitoring result of the STA 200-1. Specifically, the reception determination for the non-wireless LAN signal includes reception of a signal related to the carrier sense control based on the reception determination for the non-wireless LAN signal. For example, the control unit 240 sets the communication mode to the extended carrier sense mode on the basis of the communication mode setting information included in the operation change notification frame received from the AP 100-1. Further, the control unit 240 sets the bandwidth serving as the processing target in the extended carrier sense mode and the second threshold value used in carrier sense on the basis of the communication mode setting information included in the operation change notification frame. Further, the control unit 240 may set the communication mode only on the basis of the reception of the operation change notification frame.

(First Communication Mode: Extended Carrier Sense Mode)

The STA 200-1 performs detection and reception of a signal according to the extended carrier sense mode set on the basis of the reception determination for the non-wireless LAN signal. Further, since the detection and reception of the signal in the extended carrier sense mode are substantially the same as the detection and reception of the signal in the extended carrier sense mode in the AP 100-1 described above, description thereof is omitted.

2-3. Process of Device

Next, the process of the AP 100-1 and the STA 200-1 (hereinafter also referred to as the wireless LAN communication device 100-1 (200-1)) according to the present embodiment will be described.

(Overview of Process)

Figure 10:
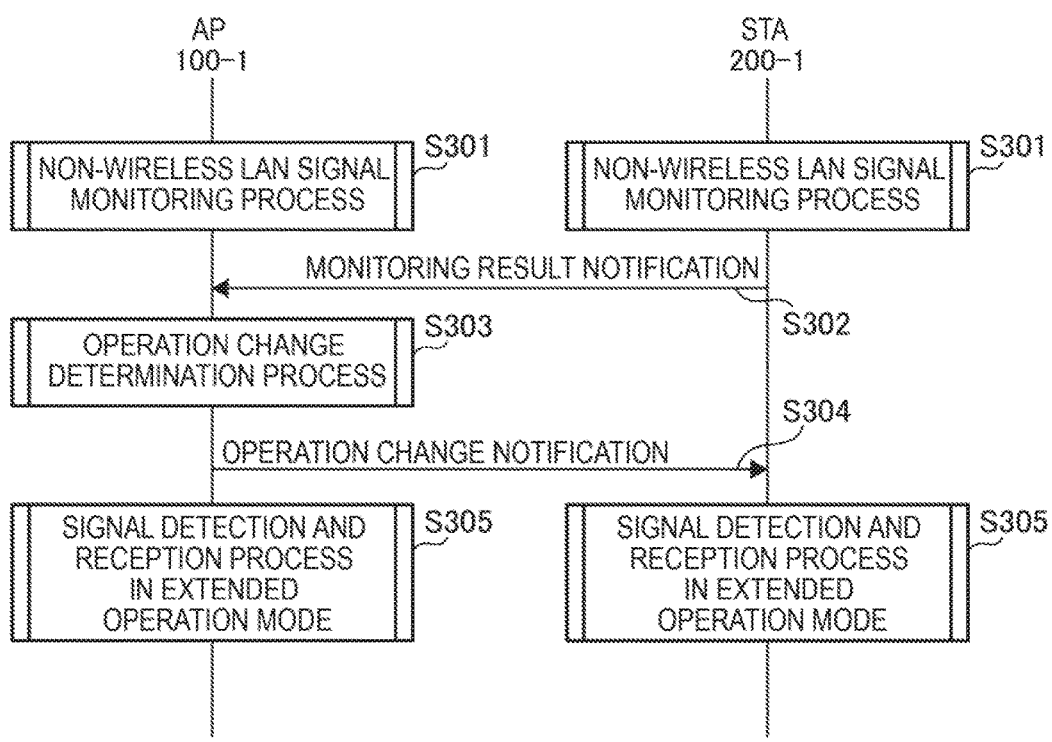
FIG. 10 is a sequence diagram illustrating an overview of a process of a wireless LAN communication device according to the embodiment.

First, an overview of the process of the wireless LAN communication device 100-1 (200-1) will be described with reference to FIG. 10. FIG. 10 is a sequence diagram illustrating an overview of the process of the wireless LAN communication device 100-1 (200-1) according to the present embodiment.

The wireless LAN communication device 100-1 (200-1) performs a monitoring process for the non-wireless LAN signal (step S301). Specifically, the wireless LAN communication device 100-1 (200-1) monitors the non-wireless LAN signal and records the monitoring result.

Then, the STA 200-1 issues the monitoring result notification to the AP 100-1 (step S302). Specifically, the STA 200-1 transmits the monitoring result notification frame including information indicating the monitoring result to be recorded to the AP 100-1.

Then, the AP 100-1 performs an operation change determination process (step S303). Specifically, the AP 100-1 determines the communication mode on the basis of the monitoring result.

Then, the AP 100-1 gives an operation change notification to the STA 200-1 (step S304). Specifically, the AP 100-1 transmits the operation change notification frame including the communication mode setting information for the determined communication mode, that is, the extended carrier sense mode to the STA 200-1.

Then, the wireless LAN communication device 100-1 (200-1) performs a signal detection and reception process in the extended operation mode (step S305). Specifically, the wireless LAN communication device 100-1 (200-1) sets the communication mode of the wireless LAN communication device 100-1 (200-1) to the determined extended carrier sense mode and performs the signal detection and reception process according to the set extended carrier sense mode.

(Non-Wireless LAN Signal Monitoring Process)

Figure 11:
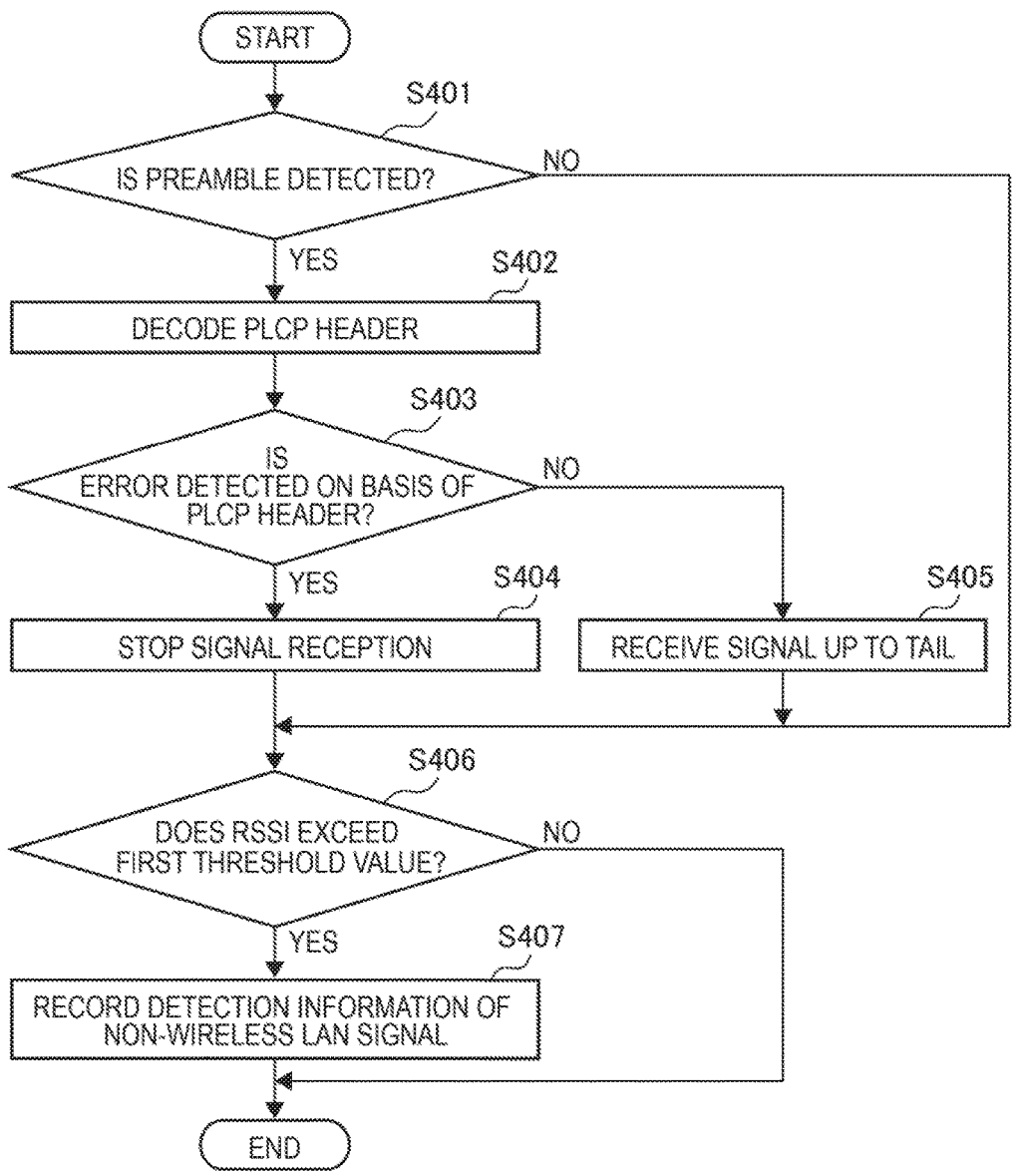
FIG. 11 is a flowchart conceptually illustrating a process of monitoring a non-wireless LAN signal of a wireless LAN communication device according to the embodiment.

Next, a non-wireless LAN signal monitoring process of the wireless LAN communication device 100-1 (200-1) will be described with reference to FIG. 11. FIG. 11 is a flowchart conceptually illustrating the non-wireless LAN signal monitoring process of the wireless LAN communication device 100-1 (200-1) according to the present embodiment.

The wireless LAN communication device 100-1 (200-1) determines whether or not the preamble is detected (step S401). More specifically, if a signal is received, the signal processing unit 120 (220) determines whether or not the output value of the preamble detection correlator for the signal exceeds the detection threshold value.

If the preamble is determined to be detected, the wireless LAN communication device 100-1 (200-1) decodes the PLCP header (step S402). Specifically, the signal processing unit 120 decodes the PLCP header of the reception signal.

Then, the wireless LAN communication device 100-1 (200-1) detects an error on the basis of the PLCP header (step S403). More specifically, the data processing unit 110 (210) determines whether or not the CRC calculation result for the PLCP header coincides with the CRC value included in the PLCP header.

In a case in which an error is detected, the wireless LAN communication device 100-1 (200-1) stops the signal reception (step S404), and in a case in which no error is detected, the wireless LAN communication device 100-1 (200-1) receives the signal up to the tail (step S405).

Further, in a case in which it is determined in step S401 that the preamble is not detected, the wireless LAN communication device 100-1 (200-1) determines whether or not the RSSI exceeds the first threshold value (step S406). Specifically, the signal processing unit 120 (220) determines whether or not the RSSI of the reception signal exceeds, for example, a normal energy detection threshold value.

If the RSSI is determined to exceed the first threshold value, the wireless LAN communication device 100-1 (200-1) records detection information of the non-wireless LAN signal (step S407). Specifically, if the RSSI of the reception signal is determined to exceed the energy detection threshold value, the signal processing unit 120 (220) determines that the non-wireless LAN signal is detected and records or updates the detection information, that is, the number of detections and the total detection time.

(Another Example of Non-Wireless LAN Signal Monitoring Process)

Figure 12:
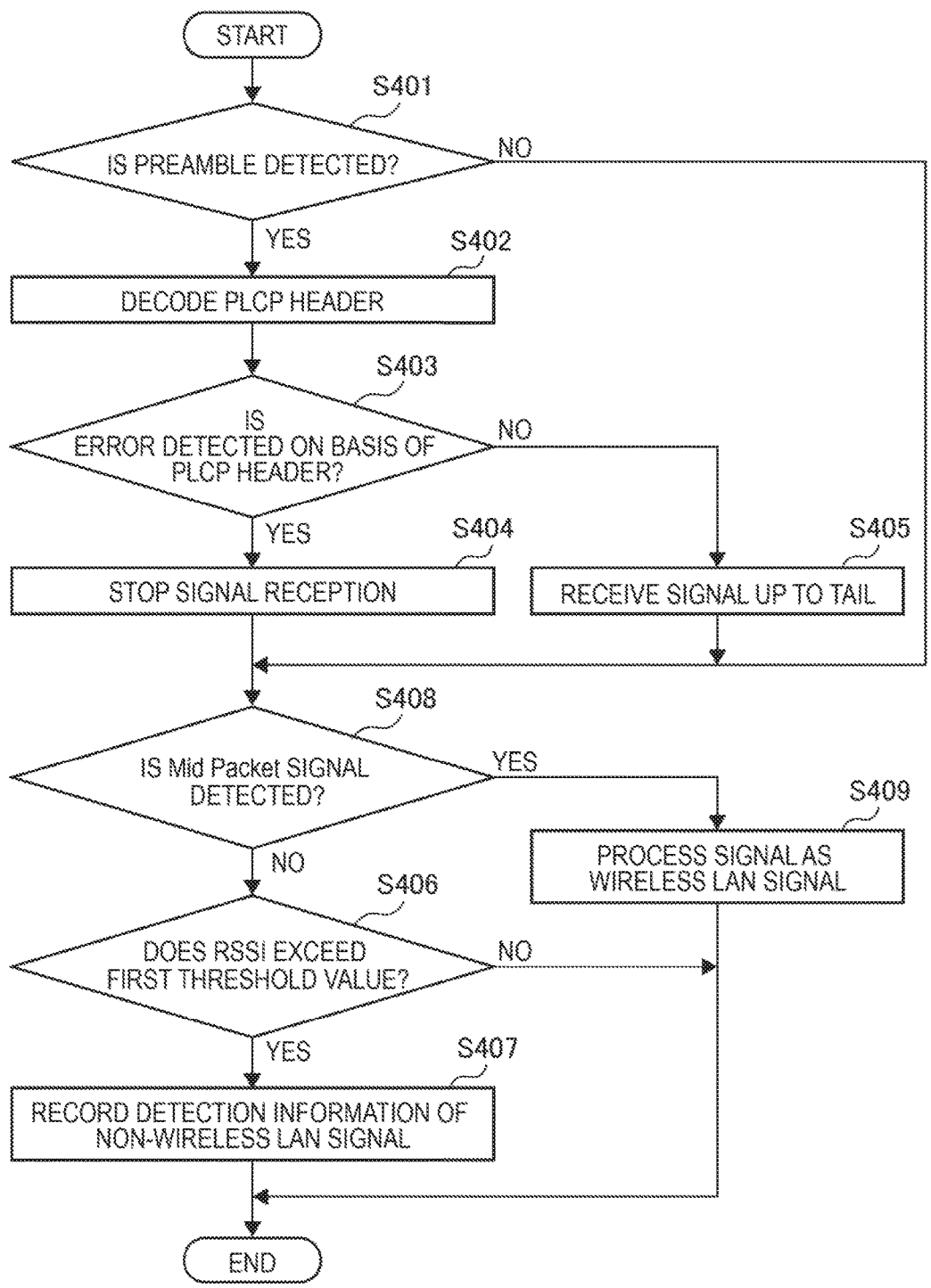
FIG. 12 is a flowchart conceptually illustrating a process of monitoring a non-wireless LAN signal using Mid Packet detection of a wireless LAN communication device according to the embodiment.

Further, in this monitoring process, the Mid Packet detection may be used. A non-wireless LAN signal monitoring process using the Mid Packet detection in the wireless LAN communication device 100-1 (200-1) will be described with reference to FIG. 12. FIG. 12 is a flowchart conceptually illustrating the non-wireless LAN signal monitoring process using the Mid Packet detection in the wireless LAN communication device 100-1 (200-1) according to the present embodiment. Further, description of processes which are substantially the same as the processes described with reference to FIG. 11 is omitted.

If it is determined in step S401 that the preamble is not detected, the wireless LAN communication device 100-1 (200-1) determines whether or not a Mid Packet signal is detected (step S408). More specifically, the signal processing unit 120 (220) determines whether or not the output value of the correlator for the Mid Packet detection exceeds the detection threshold value.

If the Mid Packet signal is determined to be detected, the signal is processed as the wireless LAN signal (step S409). Specifically, the signal processing unit 120 (220) deals the reception signal as the wireless LAN signal while the Mid Packet signal is being detected. Further, in a case in which the Mid Packet signal is determined not to be detected, the process proceeds to step S406.

(Monitoring Result Notification Process of STA)

Figure 13:
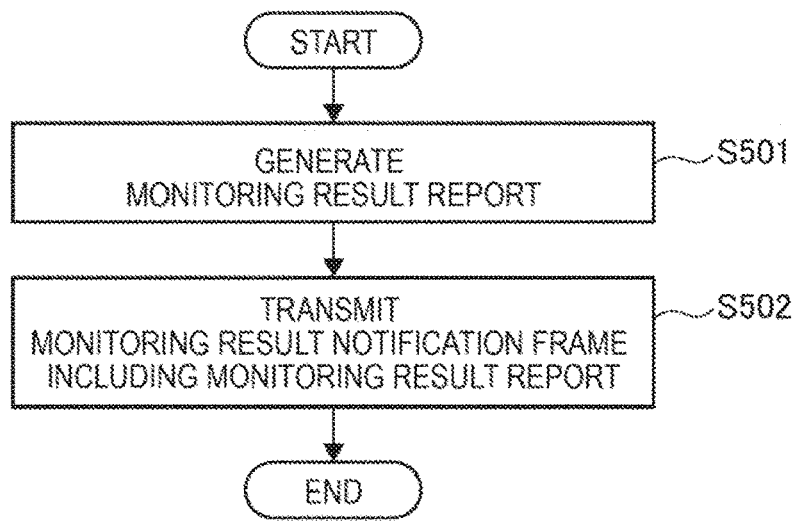
FIG. 13 is a flowchart conceptually illustrating a monitoring result notification process of an STA according to the embodiment.

Next, the monitoring result notification process of the STA 200-1 will be described with reference to FIG. 13. FIG. 13 is a flowchart conceptually illustrating the monitoring result notification process of the STA 200-1 according to the present embodiment.

The STA 200-1 generates a monitoring result report (step S501). Specifically, after the monitoring period expires, the control unit 240 generates the monitoring result report as information indicating the monitoring result using the monitoring result, that is, the detection information stored in the storage unit 150. Further, the monitoring result report may be generated during the monitoring period.

Then, the STA 200-1 transmits the generated monitoring result notification frame to the AP 100-1 (step S502). Specifically, the control unit 240 causes the data processing unit 210 to generate the monitoring result notification frame including the generated monitoring result report. Then, the wireless communication unit transmits the generated monitoring result notification frame to the AP 100-1.

(Operation Change Control Process of AP)

Figure 14:
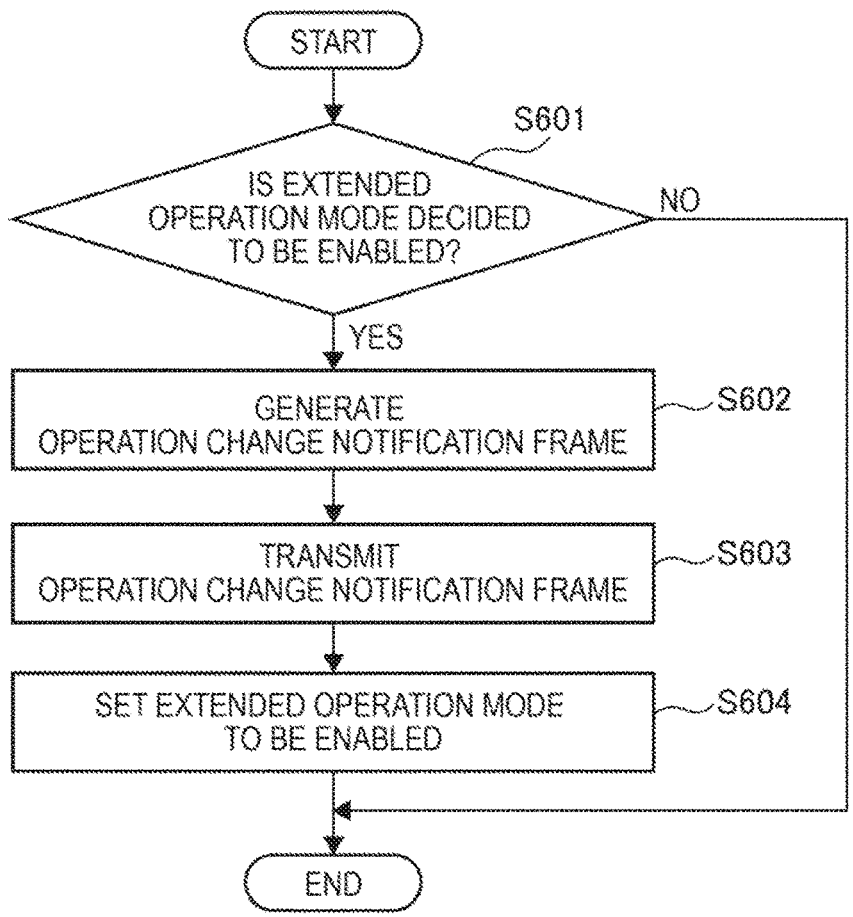
FIG. 14 is a flowchart conceptually illustrating an operation change control process of an AP according to the embodiment.

Next, the operation change control process of the AP 100-1 will be described with reference to FIG. 14. FIG. 14 is a flowchart conceptually illustrating the operation change control process of the AP 100-1 according to the present embodiment.

The AP 100-1 determines whether or not the extended operation mode is decided to be enabled (step S601). The details will be described later with reference to FIG. 15.

If the extended operation mode is determined to be decided to be enabled, the AP 100-1 generates the operation change notification frame (step S602). Specifically, if the extended mode is determined to be decided to be enabled, that is, the communication mode is determined to be the extended carrier sense mode, the control unit 140 causes the data processing unit 110 to generate the operation change notification frame including the communication mode setting information.

Then, the AP 100-1 transmits the generated operation change notification frame to the STA 200-1 (step S603). Specifically, the wireless communication unit transmits the operation change notification frame generated by the data processing unit 110 to the STA 200-1.

Then, the AP 100-1 sets the extended operation mode to enable (step S604). Specifically, the control unit 140 sets the extended carrier sense mode to enable. While the extended carrier sense mode is in the enable state, the signal detection and reception process in the extended carrier sense mode is performed.

Further, the example in which the AP 100-1 performs the operation change regardless of whether or not the STA 200-1 performs the operation change has been described above, but the AP 100-1 may perform the operation change only in a case in which an acknowledgment frame is received from the STA 200-1 in response to the operation change notification frame. In this case, since the communication operations, that is, the communication modes of the AP 100-1 and the STA 200-1 coincide with each other, it is possible to reduce the possibility that one of the AP 100-1 and the STA 200-1 will suffer from a disadvantage in acquisition of the transmission authority.

(Operation Change Determination Process of AP)

Figure 15:
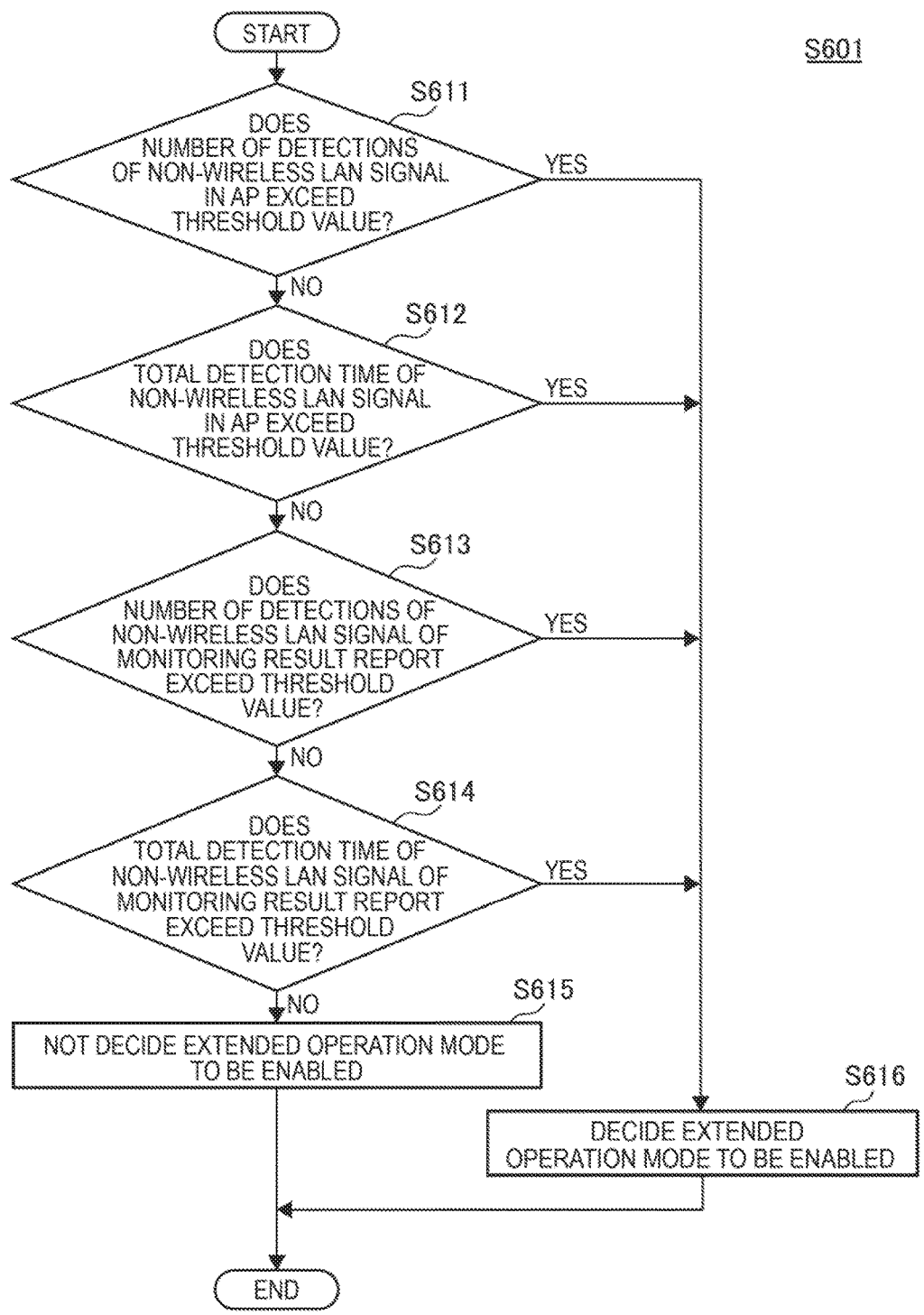
FIG. 15 is a flowchart conceptually illustrating an operation change determination process of an AP according to the embodiment.

Further, the operation change determination process, that is, a process of determining whether or not the extended operation mode is decided to be enabled in step S601 of FIG. 14 will be described with reference to FIG. 15. FIG. 15 is a flowchart conceptually illustrating the operation change determination process of the AP 100-1 according to the present embodiment.

The AP 100-1 determines whether or not the number of detections of the non-wireless LAN signal in the AP 100-1 exceeds a threshold value (step S611). Specifically, the control unit 140 determines whether or not the number of detections of the detection information stored in the storage unit 150 exceeds the threshold value.

If the number of detections of the non-wireless LAN signal in the AP 100-1 is determined to be equal to or smaller than the threshold value, the AP 100-1 determines whether or not the total detection time of the non-wireless LAN signal in the AP 100-1 exceeds a threshold value (Step S612). Specifically, the control unit 140 determines whether or not the total detection time of the detection information stored in the storage unit 150 exceeds the threshold value.

If the total detection time of the non-wireless LAN signal in the AP 100-1 is determined to be equal to or less than the threshold value, the AP 100-1 determines whether or not the number of detections of the non-wireless LAN signal of the monitoring result report exceeds a threshold value (Step S613). Specifically, the control unit 140 determines whether or not the number of detections indicated by the monitoring result report included in the monitoring result notification frame received from the STA 200-1 exceeds the threshold value.

If the number of detections of the non-wireless LAN signal of the monitoring result report is determined to be equal to or less than the threshold value, the AP 100-1 determines whether or not the total detection time of the non-wireless LAN signal of the monitoring result report exceeds a threshold value (Step S614). Specifically, the control unit 140 determines whether or not the total detection time indicated by the monitoring result report exceeds the threshold value.

If the total detection time of the non-wireless LAN signal of the monitoring result report is determined to be equal to or less than the threshold value, the AP 100-1 does not decide the extended operation mode to be enabled (step S615). Specifically, the control unit 140 maintains the state in a case in which the extended carrier sense mode is not enabled, for example, a case in which the extended carrier sense mode is disabled, and decides to set the extended carrier sense mode to be disabled in a case in which the extended carrier sense mode is enabled.

Further, in a case in which any one of the determination results in steps S611 to S614 is YES, the AP 100-1 decides the extended operation mode to be enabled (step S616). Specifically, the control unit 140 maintains the state in a case in which the extended carrier sense mode is enabled and decides to set the extended carrier sense mode to be enabled in a case in which the extended carrier sense mode is disabled. Further, the extended carrier sense mode may be set to be enabled or disabled at this time point.

(Operation Change Process of STA)

Figure 16:
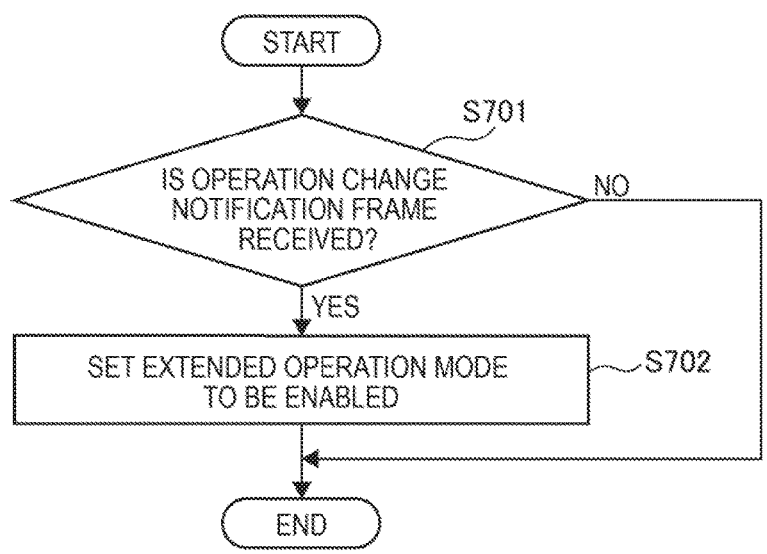
FIG. 16 is a flowchart conceptually illustrating an operation change control process of an STA according to the embodiment.

Next, the operation change control process of the STA 200-1 will be described with reference to FIG. 16. FIG. 16 is a flowchart conceptually illustrating the operation change control process of the STA 200-1 according to the present embodiment.

The STA 200-1 determines whether or not the operation change notification frame is received (step S701). Specifically, the control unit 240 determines whether or not the operation change notification frame is received from the AP 100-1. Further, if the operation change notification frame is determined not to be received, the STA 200-1 ends the process and maintains the extended operation mode.

If the operation change notification frame is determined to be received, the STA 200-1 sets the extended operation mode to be enabled (step S702). Specifically, the control unit 240 sets the extended carrier sense mode to be enabled on the basis of the communication mode setting information included in the operation change notification frame.

Further, the example in which the extended operation mode is not set until the operation change notification frame is received has been described above, but, as described above, the extended operation mode may be set to be enabled on the basis of the monitoring result in STA 200-1 regardless of the reception of the operation change notification frame.

(Signal Detection and Reception Process in Extended Operation Mode)

Figure 17:
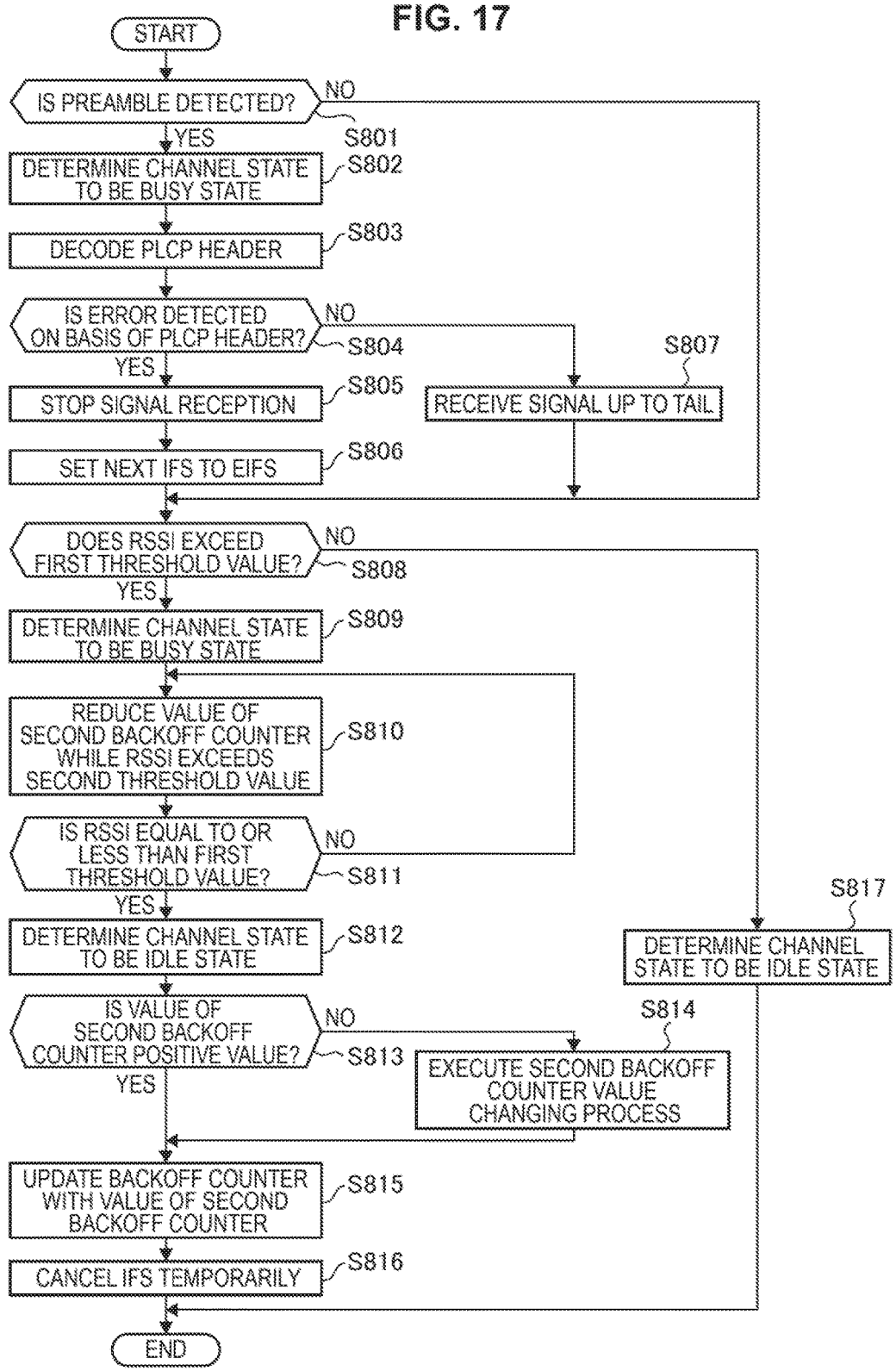
FIG. 17 is a flowchart conceptually illustrating signal detection and a reception process in an extended carrier sense mode of a wireless LAN communication device according to the embodiment.

Next, the signal detection and reception process in the extended operation mode, that is, the extended carrier sense mode in the wireless LAN communication device 100-1 (200-1) will be described with reference to FIG. 17. FIG. 17 is a flowchart conceptually illustrating the signal detection and reception process in the extended carrier sense mode in the wireless LAN communication device 100-1 (200-1) according to the present embodiment. Further, description of processes which are substantially the same as the processes described above is omitted.

The wireless LAN communication device 100-1 (200-1) determines whether or not the preamble is detected (step S801), and determines that the channel state is the busy state if the preamble is determined to be detected (step S802).

Then, the wireless LAN communication device 100-1 (200-1) decodes the PLCP header (step S803), and detects an error on the basis of the decoded PLCP header (step S804).

If an error is detected, the wireless LAN communication device 100-1 (200-1) stops the signal reception (step S805) and sets the next IFS to the EIFS (step S806). Further, in a case in which no error is detected, the wireless LAN communication device 100-1 (200-1) receives the signal up to the tail (step S807).

Further, in a case in which the preamble is determined not to be detected in step S801, the wireless LAN communication device 100-1 (200-1) determines whether or not the RSSI exceeds the first threshold value (step S808).

If the RSSI is determined to exceed the first threshold value, the wireless LAN communication device 100-1 (200-1) determines that the channel state is the busy state (step S809). Specifically, the signal processing unit 120 (220) sets a predetermined transmission standby time and the random backoff. More specifically, the signal processing unit 120 (220) sets the IFS, the backoff counter, and the second backoff counter.

Then, while the RSSI exceeds the second threshold value, the wireless LAN communication device 100-1 (200-1) reduces the value of the second backoff counter (step S810). Specifically, the signal processing unit 120 (220) decrements the value of the second backoff counter while the preamble is not detected, and the RSSI exceeds the second threshold value.

Then, the wireless LAN communication device 100-1 (200-1) determines whether or not the RSSI is equal to or less than the first threshold value (step S811). Specifically, the signal processing unit 120 (220) determines whether or not the RSSI is decreased to be equal to or less than the first threshold value.

If the RSSI is determined to be equal to or less than the first threshold value, the wireless LAN communication device 100-1 (200-1) determines that the channel state is the idle state (step S811).

Then, the wireless LAN communication device 100-1 (200-1) determines whether or not the value of the second backoff counter is a positive value (step S813). Specifically, the signal processing unit 120 (220) determines whether or not the value of the second backoff counter is a positive value.

If the value of the second backoff counter is determined to be equal to or less than 0, a second backoff counter value changing process is executed (step S814). Specifically, if the value of the second backoff counter is determined to be equal to or less than 0, the signal processing unit 120 (220) changes the value of the second backoff counter to one of the first to third values.

Then, the wireless LAN communication device 100-1 (200-1) updates the value of the backoff counter with the value of the second backoff counter (step S815). Specifically, signal processing unit 120 (220) sets the value of the backoff counter to the value of the second backoff counter.

Then, the wireless LAN communication device 100-1 (200-1) temporarily cancels the IFS (step S816). Specifically, the signal processing unit 120 (220) cancels the setting of the IFS immediately after the channel state transitions to the idle state. Further, the IFS may not be set in the extended carrier sense mode.

Further, if the RSSI is determined to be equal to or less than the first threshold value in step S808, the wireless LAN communication device 100-1 (200-1) determines that the channel state is the idle state (step S817).

(Another Example of Signal Detection and Reception Process in Extended Operation Mode)

Figure 18:
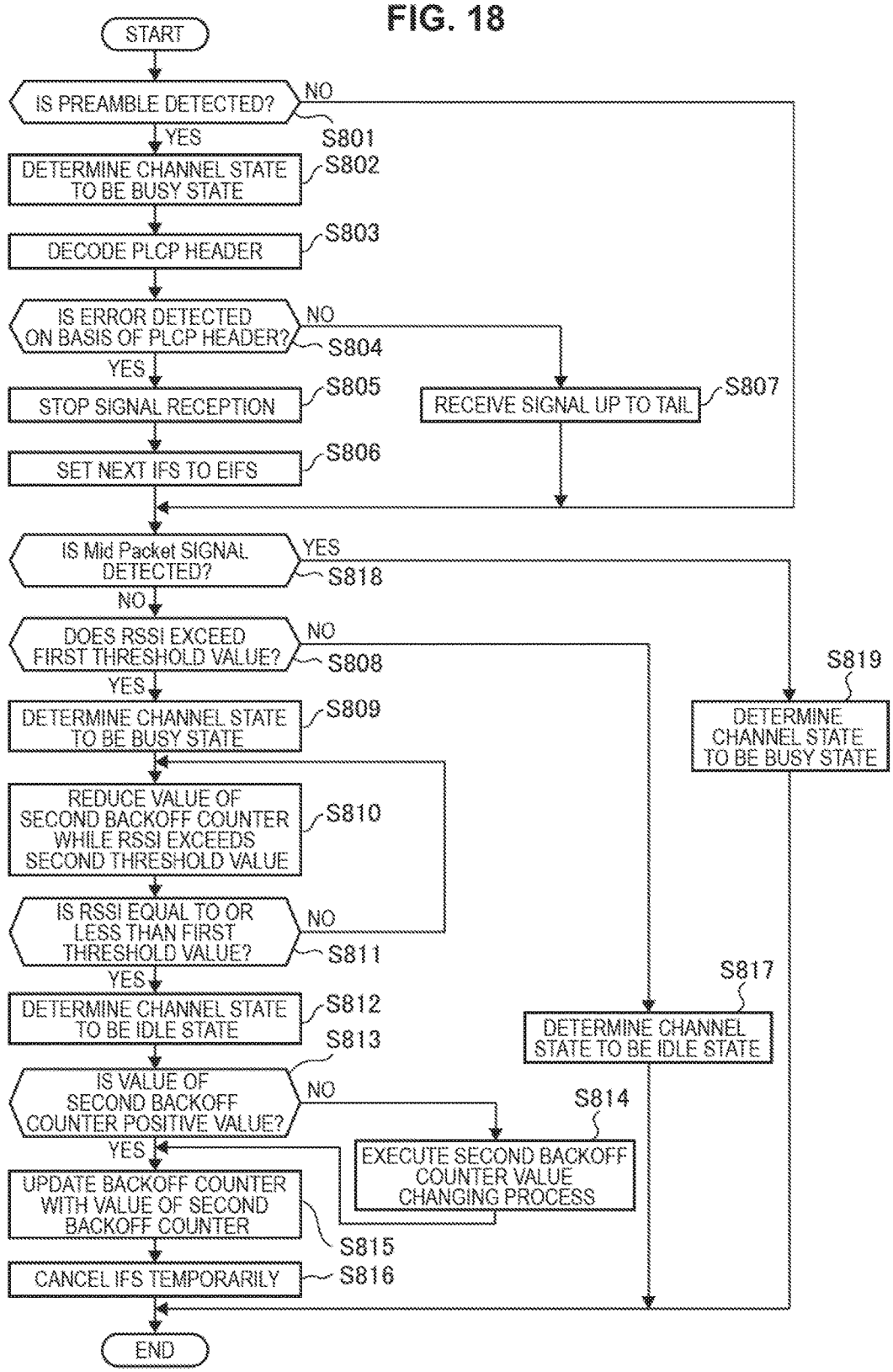
FIG. 18 is a flowchart conceptually illustrating signal detection and a reception process in an extended carrier sense mode using Mid Packet detection of a wireless LAN communication device according to the embodiment.

Further, the Mid Packet detection may be used in the signal detection and reception process in the extended carrier sense mode. A signal detection and reception process in the extended carrier sense mode using the Mid Packet detection in the wireless LAN communication device 100-1 (200-1) will be described with reference to FIG. 18. FIG. 18 is a flowchart conceptually illustrating the signal detection and reception process in the extended carrier sense mode using the Mid Packet detection in the wireless LAN communication device 100-1 (200-1) according to the present embodiment. Further, description of processes which are substantially the same as the processes described with reference to FIG. 17 is omitted.

If the preamble is determined not to be detected in step S801, the wireless LAN communication device 100-1 (200-1) determines whether or not the Mid Packet signal is detected (step S817).

If the Mid Packet signal is determined to be detected, the wireless LAN communication device 100-1 (200-1) determines that the channel state is the busy state (step S818).

Further, if the Mid Packet signal is determined not to be detected, the process proceeds to step S810 via step S808. In step S810, the signal processing unit 120 (220) decrements the value of the second backoff counter while the preamble and the Mid Packet signals are not detected, and the RSSI exceeds the second threshold value. A subsequent process is substantially the same as the process described above with reference to FIG. 17.

2-4. Conclusion of First Embodiment

As described above, according to the first embodiment of the present disclosure, the wireless LAN communication device 100-1 (200-1) performs the reception determination for the second signal having a different format from the first signal related to the communication of the wireless LAN standard and controls carrier sense on the basis of the reception determination for the second signal. Further, the wireless LAN communication device 100-1 (200-1) performs the transmission on the basis of carrier sense in which the control is performed. Therefore, carrier sense is performed such that it is advantageous to the transmission of the wireless LAN communication device 100-1 (200-1) in accordance with the reception of the non-wireless LAN signal, and it is possible to secure the transmission opportunities of the wireless LAN communication device 100-1 (200-1) in the situation in which the non-wireless LAN signal having the different format from the signal of the wireless LAN communication is transmitted. For example, the transmission authority of the wireless LAN communication device is prevented from being unilaterally continuously lost as the non-wireless LAN communication device transmits the signal from irrespective of the wireless LAN signal in the situation in which the wireless LAN communication device 100-1 (200-1) and the non-wireless LAN communication device are mixed.

Further, the reception determination for the second signal is performed on the basis of the result of determining whether or not the reception signal is the first signal. Therefore, since the non-wireless LAN signal is indirectly detected, it is not necessary to maintain the configuration of directly detecting the non-wireless LAN signal, and the configuration of the wireless LAN communication device 100-1 (200-1) can be simplified.

Further, it is determined whether or not the reception signal is the first signal on the basis of the signal pattern of the reception signal. Therefore, since the wireless LAN signal is detected in accordance with the degree of correlation with the signal pattern of the wireless LAN signal, the detection process can be performed in the physical layer, and it is possible to increase the speed of the detection process as compared with the case in which the detection process is performed in the upper layer.

Further, the signal pattern of the reception signal includes the signal pattern in the preamble of the reception signal. Therefore, since the wireless LAN signal is detected using the preamble disposed in the head of the wireless LAN signal, it is possible to further increase the speed of the wireless LAN signal detection process.

Further, the signal pattern of the reception signal includes the periodicity of the reception signal. Therefore, it is possible to improve the accuracy of detection of the wireless LAN signal using the periodicity of the reception signal which is more likely to be detected than the preamble.

Further, the reception determination for the second signal is performed further on the basis of the reception signal strength. Therefore, it is possible to suppress the erroneous detection of the non-wireless LAN signal since the determination that the reception signal is the non-wireless LAN signal on the basis of only the fact that the wireless LAN signal is not detected is not performed. Further, since the erroneous detection of the non-wireless LAN signal is suppressed, it is possible to reduce the possibility that the transmission of the wireless LAN communication device 100-1 (200-1) will be unreasonably suppressed.

Further, the reception determination for the second signal includes the reception of the signal related to the reception determination result for the second signal or the control of carrier sense. Therefore, since the monitoring can be omitted, for example, using the monitoring result included in the monitoring result notification frame or the like described above instead of performing the monitoring, and the configuration and the process of the wireless LAN communication device 100-1 (200-1) can be simplified.

Further, the control of carrier sense includes the control of the carrier sense time. Therefore, it is possible to increase the transmission opportunities of the wireless LAN communication device 100-1 (200-1) since the carrier sense time including the transmission standby time is reduced on the basis of the reception determination for the non-wireless LAN signal.

Further, the carrier sense time includes the standby time from the time point at which the signal ceases to be received, and the wireless LAN communication device 100-1 (200-1) sets the standby time to the time obtained by consuming the standby time during the reception of the second signal when the reception of the second signal is completed. In the related art, while the signal is being received, the standby time is maintained regardless of whether the signal is the wireless LAN signal or the non-wireless LAN signal. On the other hand, the standby time is consumed only in a case in which the reception signal is the non-wireless LAN signal, and thus it is possible to suppress the transmission opportunities of the wireless LAN communication device 100-1 (200-1) from being reduced by the non-wireless LAN device.

Further, the wireless LAN communication device 100-1 (200-1) sets the standby time to a time shorter than before the consumption, in a case in which the standby time to be set when the reception of the second signal is completed is a time obtained by completely consuming the standby time during the reception of the second signal. Here, in a case in which there are a plurality of wireless LAN communication devices 100-1 (200-1), if the standby time is completely consumed, the signal transmission is started at the same timing. As a result, the signals transmitted by a plurality of the wireless LAN communication devices 100-1 (200-1) interfere with each other, and a reception success rate may decrease. On the other hand, in this configuration, since the standby time is set, it is possible to avoid the communication collision with other wireless LAN communication devices 100-1 (200-1).

Figure 19:
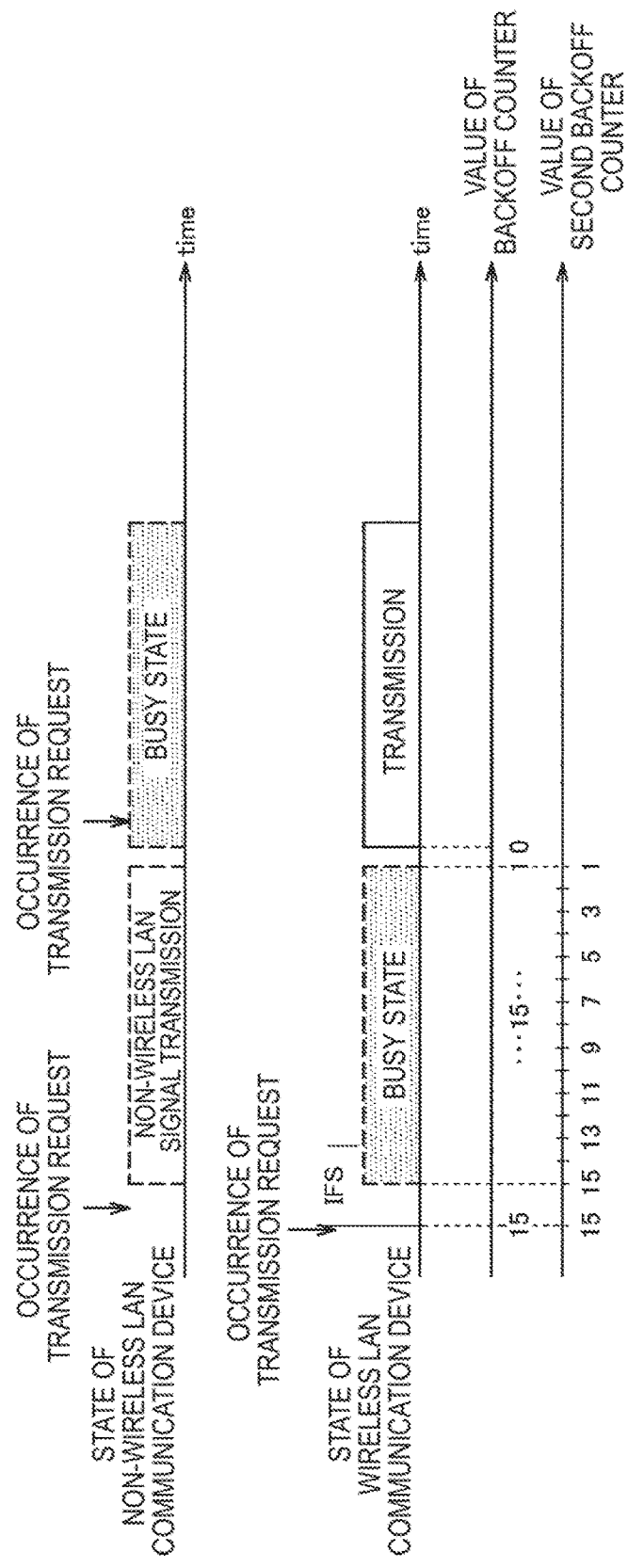
FIG. 19 is a diagram illustrating a status transition example of a wireless LAN communication device according to the present embodiment in a situation in which a non-wireless LAN communication device is mixed.

Further, an example of the effects obtained by the configuration according to the present embodiment will be described with reference to FIG. 19. FIG. 19 is a diagram illustrating a status transition example of the wireless LAN communication device 100-1 (200-1) according to the present embodiment in a situation in which the non-wireless LAN communication device is mixed.

If a transmission request occurs, the wireless LAN communication device 100-1 (200-1) determines the random backoff and stands by during the IFS time. For example, as illustrated in FIG. 19, if a transmission request occurs, the wireless LAN communication device 100-1 (200-1) sets the value of the backoff counter related to the random backoff to 15 and stands by until the IFS period elapses while maintaining the value of the backoff counter.

If a transmission request occurs, the non-wireless LAN communication device transmits the non-wireless LAN signal without waiting. For example, as illustrated in FIG. 19, while the wireless LAN communication device stands by during the IFS time, the non-wireless LAN communication device starts to transmit the non-wireless LAN signal.

If a signal is detected in the standby state, the wireless LAN communication device 100-1 (200-1) stands by until the signal detection ends. Here, the wireless LAN communication device 100-1 (200-1) decrements the value of the second backoff counter of the random backoff while the non-wireless LAN signal is being detected. For example, as illustrated in FIG. 19, since the non-wireless LAN signal is detected, the wireless LAN communication device 100-1 (200-1) determines that the channel state is the busy state and decrements the value of the backoff counter while maintaining the value of the second backoff counter. Further, the decrement of the value of the second backoff counter may be started after the IFS elapses.

Further, if the reception of the non-wireless LAN signal is completed, the wireless LAN communication device 100-1 (200-1) sets the value of the backoff counter as the value of the second backoff counter, and transmits the signal at an earlier timing than the random backoff of the related art. For example, as illustrated in FIG. 19, if the reception of the non-wireless LAN signal is completed, the wireless LAN communication device 100-1 (200-1) updates the value of the backoff counter with the value of the second backoff counter, and starts the transmission of the signal of the wireless LAN communication device 100-1 (200-1) before retransmission of the non-wireless LAN signal is started.

As described above, the wireless LAN communication device 100-1 (200-1) according to the present embodiment can transmit the signal with no transmission interference caused by the non-wireless LAN communication device. Therefore, even in the situation in which the wireless LAN communication device 100-1 (200-1) and the non-wireless LAN communication device are mixed, it is possible to secure the transmission opportunities of the wireless LAN communication device 100-1 (200-1).

3. Second Embodiment (Determination Based on Wireless LAN Standard/Second Communication Mode)

The wireless LAN communication device 100-1 (200-1) according to the first embodiment of the present disclosure has been described above. Next, the wireless LAN communication device 100-2 (200-2) according to the second embodiment of the present disclosure will be described. The wireless communication system according to the present embodiment performs the reception determination for the non-wireless LAN signal on the basis of the communication protocol of the wireless LAN standard and performs detection and reception of the signal in a second communication mode.

3-1. Detailed Configuration of Device

A function of the wireless LAN communication device 100-2 (200-2) according to the present embodiment will be described in detail. Further, description of a function which is substantially the same as in the first embodiment will be omitted.

((Function of AP))

First, the function of the AP 100-2 will be described in detail.

(Monitoring of Non-Wireless LAN Signal)

The AP 100-2 performs the reception determination for the non-wireless LAN signal on the basis of the communication protocol of the wireless LAN standard. Specifically, the signal processing unit 120 determines whether or not the reception signal is the wireless LAN signal by determining whether or not reception is performed at a time or a frequency according to the communication protocol of the wireless LAN standard. For example, if a signal is received, the signal processing unit 120 determines whether or not at least one of the following conditions (1) to (5) is satisfied.

(1) Is a signal received before the elapse of the standby time shorter than any other standby time specified in the wireless LAN standard after completion of a frame reception?

Specifically, does signal reception start before the elapse of the SIFS (Short IFS) specified in the IEEE 802.11 standard after the frame reception is completed?

(2) Is a signal received at a time point apart from a time point serving as a delimiter of a transmission time specified in the wireless LAN standard by a predetermined period of time or more?

Specifically, does signal reception start at a time point apart from a time point serving as a boundary of a time slot specified in the wireless LAN standard by a predetermined period of time or more?

(3) Is a signal in which a signal of the physical layer is not decoded received during a period in which transmission is suppressed in wireless LAN standard?

Specifically, does reception of a signal in which the PLCP header fails to be decoded start in a transmission control period (NAV) specified in the IEEE 802.11 standard?

(4) Is a signal of a frequency component not used in the wireless LAN standard detected?

Specifically, is a signal of a subcarrier component not used in an OFDM signal format specified by the IEEE 802.11 standard detected?

(5) Is a signal of a bandwidth which is not a multiple of a unit bandwidth specified in the wireless LAN standard detected?

Specifically, is a signal of a bandwidth which is not a multiple of a unit bandwidth specified in the IEEE 802.11 standard (for example, 20 MHz×52/64 in 802.11a, 20 MHz× 56/64 in 802.11n/ac, and 20 MHz×26/256 in 802.11ax) detected?

(6) Is a frequency at which at least one of the conditions (1) to (5) described above is satisfied is equal to or more than a predetermined frequency?

Further, in a case in which at least one of the above conditions is satisfied, the signal processing unit 120 determines that the non-wireless LAN signal is received and updates the number of detections and the total detection time.

(Operation Change Control and Operation Change Notification)

The AP 100-2 performs control such that the communication mode is changed to the second communication mode on the basis of the monitoring result. Specifically, the control unit 140 controls the communication parameter on the basis of the reception determination for the non-wireless LAN signal.

More specifically, the control unit 140 determines the communication mode related to the control of the communication parameter on the basis of the detection information stored in the storage unit 150. For example, the control unit 140 determines whether or not at least one of the number of detections and the total detection time serving as the detection information exceeds a threshold value. If at least one of the number of detections and the total detection time exceeds the threshold value, the control unit 140 sets the communication mode to the second communication mode which is one of extended operation modes (hereinafter also referred to as a "corrected parameter mode").

Further, the AP 100-2 decides a communication parameter used in the corrected parameter mode (hereinafter also referred to as a "corrected parameter"). Specifically, the control unit 140 decides the communication parameter which causes the transmission authority of the wireless LAN communication device 100-1 (200-1) to be easily acquired as the corrected parameter.

More specifically, as the communication parameter, there is a parameter related to a priority of a frame serving as a parameter for deciding a transmission time, a parameter related to a transmission standby time, a parameter related to transmission power, or a parameter related to the signal detection in carrier sense serving as a parameter for deciding a signal detection sensitivity in carrier sense. For example, as the parameter related to the priority of the frame, there is CWmin (Contention Window Minimum), CWmax (maximum), AIFS (Arbitration IFS), or TXOP (Transmission Opportunity) Limit. As the parameters related to the signal detection in carrier sense, there are threshold values such as the energy detection threshold value, the preamble detection threshold value, and the Mid Packet detection threshold value. As the parameter related to the transmission standby time, there is an SIFS time length or a slot time length.

Further, the corrected parameter may be decided in advance, and in this case, a predetermined corrected parameter is acquired from, for example, the storage unit 150.

Figure 20:
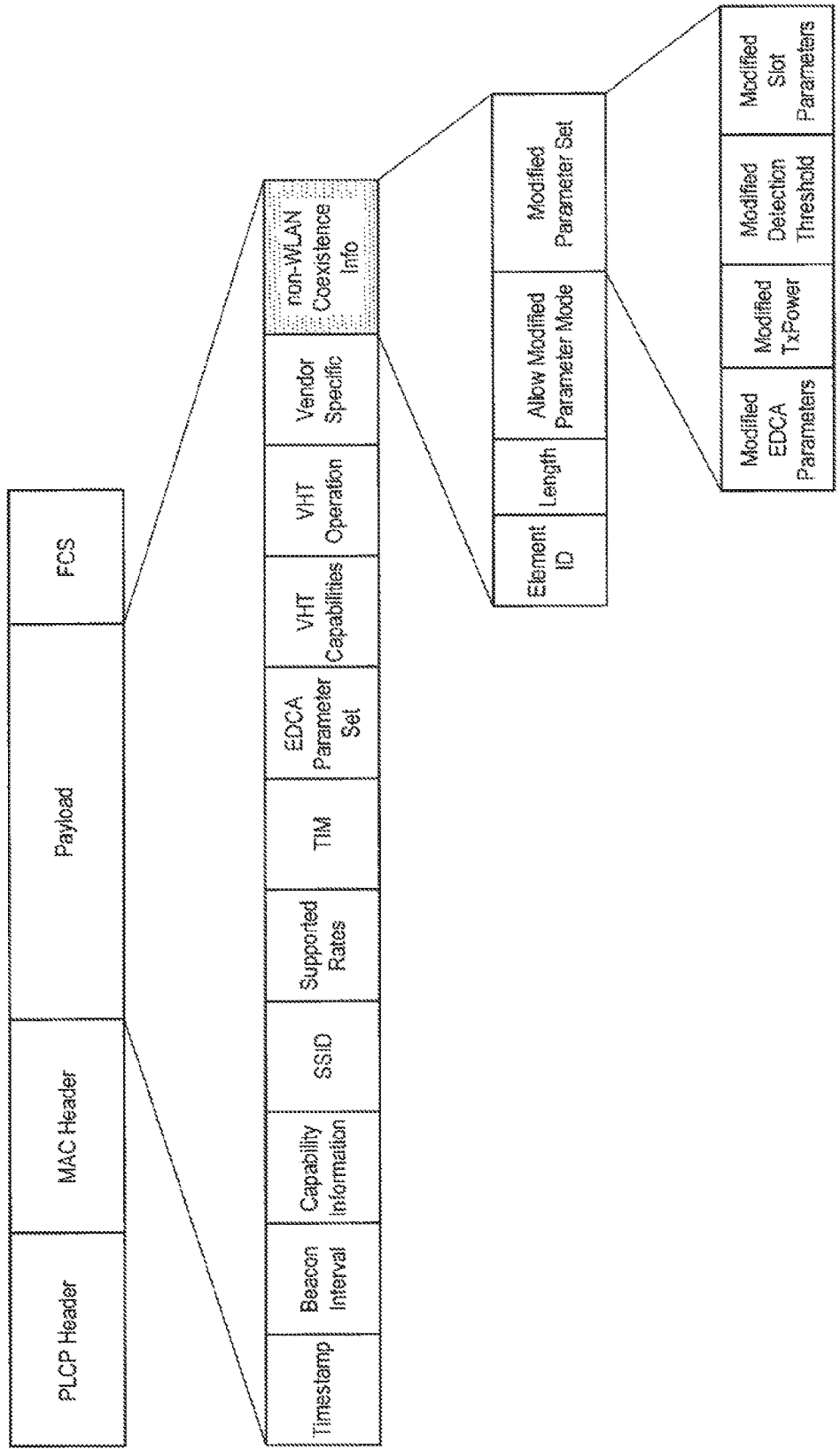
FIG. 20 is a diagram illustrating a configuration example of an operation change notification frame communicated in a wireless LAN communication system according to a second embodiment of the present disclosure.

Further, the AP 100-2 gives a notification indicating information specifying the corrected parameter (hereinafter also referred to as "corrected parameter information") to the STA 200-2. Specifically, if the communication mode is determined to be the corrected parameter mode on the basis of the detection information, the control unit 140 causes the data processing unit 110 to generate an operation change notification frame including the corrected parameter information as the communication mode setting information. Then, the generated frame is transmitted to the STA 200-2 through the wireless communication unit. Further, the operation change notification frame according to the present embodiment will be described in detail with reference to FIG. 20. FIG. 20 is a diagram illustrating a configuration example of the operation change notification frame communicated in the wireless LAN communication system according to the present embodiment. Further, description of fields which are substantially the same as in the operation change notification frame according to the first embodiment is omitted.

As illustrated in FIG. 20, the non-WLAN Coexistence Info field includes fields such as Element ID, Length, Allow Modified Parameter Mode, and Modified Parameter Set. Information indicating that the corrected parameter mode to be set is used is stored in the Allow Modified Parameter Mode field, and the corrected parameter information is stored in the Modified Parameter Set field.

As illustrated in FIG. 20, the Modified Parameter Set field includes fields such as Modified EDCA Parameters, Modified Tx Power, Modified Detection Threshold, and Modified Slot Parameters. Information specifying the parameter related to the priority of the frame is stored in the Modified EDCA Parameters field, and information specifying the parameter related to the transmission power is stored in the Modified Tx Power field. Further, information specifying the parameter related to the signal detection in carrier sense is stored in the Modified Detection Threshold field, and information specifying the parameter related to transmission standby time is stored in the Modified Slot Parameters field.

(Second Communication Mode: Corrected Parameter Mode)

The AP 100-2 performs detection and reception of a signal according to the corrected parameter mode set on the basis of the reception determination for the non-wireless LAN signal. Specifically, the control unit 140 causes the wireless communication unit to perform transmission on the basis of the communication parameter controlled on the basis of the reception determination for the non-wireless LAN signal. For example, if the corrected parameter mode is decided to be set as the communication mode, the control unit 140 sets the communication mode to the corrected parameter mode. Then, in the corrected parameter mode, the wireless communication unit performs communication in accordance with the determined corrected parameter.

((Function of STA))

A function of the STA 200-2 is different from the function of the STA 200-1 according to the first embodiment in the monitoring for the non-wireless LAN signal and the detection and reception of a signal in the corrected parameter mode. However, since these functions are substantially the same as those of the AP 100-2, description thereof is omitted.

(Operation Change Control)

The STA 200-2 sets the communication mode to the corrected parameter mode on the basis of the operation change notification. For example, the control unit 240 sets the communication mode to the corrected parameter mode on the basis of the corrected parameter information included in the operation change notification frame received from the AP 100-2, and sets the communication parameter of the STA 200-2 used in the corrected parameter mode on the basis of the corrected parameter information. Further, only some of the communication parameters of the AP 100-2 may be set on the basis of the corrected parameter information included in the operation change notification frame.

3-2. Process of Device

Next, a process of the wireless LAN communication device 100-2 (200-2) according to the present embodiment will be described. Here, the description will proceed focusing on the operation change control process. Further, description of processes which are substantially the same as those described above is omitted.

(Operation Change Control Process of AP)

First, the operation change control process of the AP 100-2 will be described with reference to FIG. 21. FIG. 21 is a flowchart conceptually illustrating the operation change control process of the AP 100-2 according to the present embodiment.

The AP 100-2 determines whether or not the extended operation mode is decided to be the corrected parameter mode (step S621). Specifically, the control unit 140 determines whether or not the communication mode is decided to be the corrected parameter mode among the extended operation modes on the basis of the detection information.

In a case in which it is determined that the extended operation mode is decided to be the corrected parameter mode, the AP 100-2 decides the corrected parameter (step S622). Specifically, in a case in which the transition to the corrected parameter mode is decided, the control unit 140 decides the corrected parameter used in the corrected parameter mode.

Then, the AP 100-2 generates the operation change notification frame (step S623). Specifically, in a case in which it is determined that the extended mode is decided to be the corrected parameter mode, the control unit 140 causes the data processing unit 110 to generate the operation change notification frame including the corrected parameter information.

Then, the AP 100-2 transmits the generated operation change notification frame to the STA 200-1 (step S624), and activates the corrected parameter mode (step S625). Specifically, the control unit 140 sets the communication mode to the corrected parameter mode. Further, while the communication mode is the corrected parameter mode, the signal detection and reception process using the corrected parameter is performed.

(Operation Change Process of STA)

Then, the operation change control process of the STA 200-2 will be described with reference to FIG. 22. FIG. 22 is a flowchart conceptually illustrating the operation change control process of the STA 200-2 according to the present embodiment.

The STA 200-2 determines whether or not the operation change notification frame is received (step S721), and if the operation change notification frame is determined to be received, the STA 200-2 activates the corrected parameter mode (step S722). Specifically, if the operation change notification frame is received, the control unit 240 sets the communication mode to the corrected parameter mode on the basis of the communication mode setting information included in the operation change notification frame. Further, the control unit 240 sets the communication parameter of the STA 200-2 used in the corrected parameter mode on the basis of the corrected parameter information included in the operation change notification frame.

3-3. Conclusion of Second Embodiment

As described above, according to the second embodiment of the present disclosure, the wireless LAN communication device 100-2 (200-2) controls the communication parameter on the basis of the reception determination for the second signal, and the transmission is performed on the basis of the controlled communication parameter. Therefore, the communication parameter is controlled such that the transmission authority is easily acquired in accordance with the reception of the non-wireless LAN signal, and thus it is possible to secure the transmission opportunities of the wireless LAN communication device 100-2 (200-2) in the situation in which the non-wireless LAN signal having a format different from the signal of the wireless LAN communication is transmitted.

Further, the determination on whether or not the reception signal is the first signal includes a determination on whether or not reception is performed at a time or a frequency according to the communication protocol of the wireless LAN standard. Therefore, since the accuracy of determination on whether or not the reception signal is the wireless LAN signal is improved, the accuracy of detection of the non-wireless LAN signal can be improved. In other words, the erroneous detection of the non-wireless LAN signal can be suppressed.

Further, the communication parameter includes a parameter for deciding the signal detection sensitivity in carrier sense. For this reason, since the non-wireless LAN signal is unlikely to be detected, it is hard to suppress the transmission of the wireless LAN communication device 100-2 (200-2), and it is possible to increase the transmission opportunities.

Further, the communication parameter includes a parameter for deciding the transmission time. Therefore, the transmission opportunities of the wireless LAN communication device 100-2 (200-2) can be increased by increasing the period in which transmission is permitted or decreasing the transmission standby time.

Further, the communication parameter includes a parameter for deciding the transmission power. Therefore, since the transmission power is set to be high, the signal transmitted by the wireless LAN communication device 100-2 (200-2) is more likely to be received, the number of retransmissions is reduced, and thus it is possible to increase the transmission opportunities substantially. Further, in a case in which the non-wireless LAN communication device has a function equivalent to carrier sense, the transmission of the non-wireless LAN communication device can be easily suppressed.

4. Third Embodiment (Determination on the Basis of Detection of Non-Wireless LAN Signal/First Communication Mode)

The wireless LAN communication device 100-2 (200-2) according to the second embodiment of the present disclosure has been described above. Next, the wireless LAN communication device 100-3 (200-3) according to the third embodiment of the present disclosure will be described. The wireless communication system according to the present embodiment performs the reception determination for the non-wireless LAN signal directly and performs detection and reception of a signal in the first communication mode.

4-1. Detailed Configuration of Device

A function of the wireless LAN communication device 100-3 (200-3) according to the present embodiment will be described in detail. Further, description of functions which are substantially the same as the functions according to the above embodiments will be omitted.

((Function of AP))

First, the function of the AP 100-3 will be described in detail.

(Monitoring of Non-Wireless LAN Signal)

The AP 100-3 performs the reception determination for the non-wireless LAN signal by directly receiving (detecting) the non-wireless LAN signal. Specifically, the signal processing unit 120 performs the reception determination for the non-wireless LAN signal on the basis of the presence or absence of reception (presence or absence of detection) of the non-wireless LAN signal. More specifically, the signal processing unit 120 determines the presence or absence of reception (presence or absence of detection) of the non-wireless LAN signal on the basis of the periodicity for the reception signal.

For example, as the periodicity of the reception signal, there is a periodicity from a viewpoint of a time, and in a case in which the non-wireless LAN signal is a signal according to a long term evolution (LTE) standard, a reference signal (a common reference signal (CRS)) is periodically transmitted. In this regard, the signal processing unit 120 determines whether or not the non-wireless LAN signal is detected by determining the presence/absence of a periodicity for a reception timing of a signal.

Further, for example, as the periodicity of the reception signal, there is a periodicity from a viewpoint of a frequency, and in a case in which the non-wireless LAN signal is a signal according to the LTE standard, a reference signal specified in the standard is transmitted at predetermined subcarrier intervals. In this regard, the signal processing unit 120 determines whether or not the non-wireless LAN signal is detected by determining the presence or absence of the periodicity for the frequency at which the signal is detected. Further, for the determination for the periodicity, an output value of a correlator for detecting a signal having a periodicity is used.

Further, in a case in which the periodicity of the reception signal is detected, the signal processing unit 120 determines that the non-wireless LAN signal is received and updates the number of detections and the total detection time.

Further, both of the two periodicities may be determined, and only one periodicity may be determined. Further, the AP 100-3 may separately include a receiver for the non-wireless LAN signal, and the reception of the non-wireless LAN signal may be detected by the receiver.

(Operation Change Control and Operation Change Notification)

In addition to the detection information, the AP 100-3 controls the communication operation on the basis of an instruction of the user. Specifically, the control unit 140 causes the user to present the determination result for the communication mode based on the detection information, and determines the communication mode on the basis of the input of the user.

For example, the AP 100-3 has an output unit such as a display unit that separately displays the determination result and an input unit that receives an input manipulation of the user. The control unit 140 determines whether or not at least one of the number of detections and the total detection time serving as the detection information exceeds a threshold value, and if at least one of the number of detections and the total detection time is determined to exceed the threshold value, the control unit 140 causes the determination result to be displayed on the output unit. Then, if the user inputs content indicating a permission of setting the communication mode to the extended carrier sense mode through the input unit, the control unit 140 sets the communication mode to the extended carrier sense mode. Further, the output unit may display a graphical user interface (GUI) that urges the user to determine the permission of setting the communication mode and input a manipulation on the determination result. Further, the output unit and the input unit may be integrated.

(First Communication Mode: Extended Carrier Sense Mode)

The AP 100-3 controls the signal detection and reception process in the extended carrier sense mode on the basis of whether or not the non-wireless LAN signal is received. Specifically, the signal processing unit 120 uses the presence or absence of the reception of the non-wireless LAN signal instead of using the second threshold value in the process of decrementing the value of the second backoff counter in the first embodiment. The details will be described with reference to a flowchart to be described later. In this case, since a possibility that the reception signal will be the non-wireless LAN signal is increased as compared with the case using the second threshold value, the transmission authority of another wireless LAN communication device can be prevented from being erroneously lost.

((Function of STA))

Then, the function of the STA 200-3 will be described in detail. Among the functions of the STA 200-3, the monitoring for the non-wireless LAN signal and the detection and reception of the signal in the extended carrier sense mode are different from the functions of the STA 200 in accordance with the first and second embodiments. However, since these functions are substantially the same as those of the AP 100-3, description thereof is omitted.

(Operation Change Control)

The STA 200-3 controls the communication operation on the basis of an instruction of the user. Specifically, the control unit 240 sets the communication mode on the basis of the input of the user instead of the operation change notification. For example, the STA 200-3 includes an output unit and an input unit described above as in the AP 100-3. If the operation change notification frame is received from the AP 100-3, the control unit 140 causes the output unit to display content of inquiring about whether or not the communication mode is set to the communication mode included in the operation change notification frame, that is, the extended carrier sense mode. Then, if the user inputs content indicating a permission of setting the communication mode to the extended carrier sense mode through the input unit, the control unit 140 sets the communication mode to the extended carrier sense mode.

4-2. Process of Device

Next, a process of the wireless LAN communication device 100-3 (200-3) according to the present embodiment will be described. Further, description of processes which are substantially the same as those described above is omitted.

(Non-Wireless LAN Signal Monitoring Process)

Figure 23:
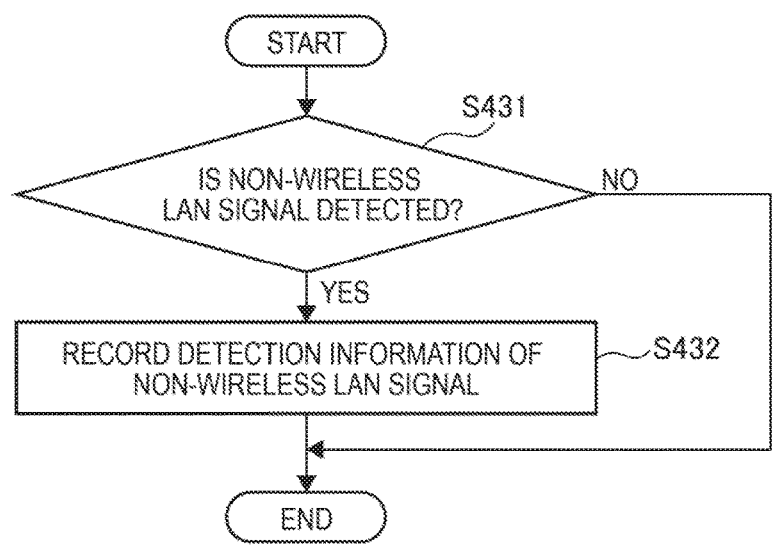
FIG. 23 is a flowchart conceptually illustrating a process of monitoring a non-wireless LAN signal of a wireless LAN communication device according to a third embodiment of the present disclosure.

First, a non-wireless LAN signal monitoring process of the wireless LAN communication device 100-3 (200-3) will be described with reference to FIG. 23. FIG. 23 is a flowchart conceptually illustrating the non-wireless LAN signal monitoring process of the wireless LAN communication device 100-3 (200-3) according to the present embodiment.

The wireless LAN communication device 100-3 (200-3) determines whether or not the non-wireless LAN signal is detected (step S431). Specifically, the signal processing unit 120 determines whether or not the output value of the correlator that performs an output on the basis of the periodicity of the non-wireless LAN signal exceeds a predetermined threshold value.

If the non-wireless LAN signal is determined to be detected, the wireless LAN communication device 100-3 (200-3) records the detection information of the non-wireless LAN signal (step S432). Specifically, if the output value of the correlator for detecting the non-wireless LAN signal is determined to exceed a predetermined threshold value, the signal processing unit 120 updates the number of detections and the total detection time.

(Operation Change Determination Process of AP)

Figure 24:
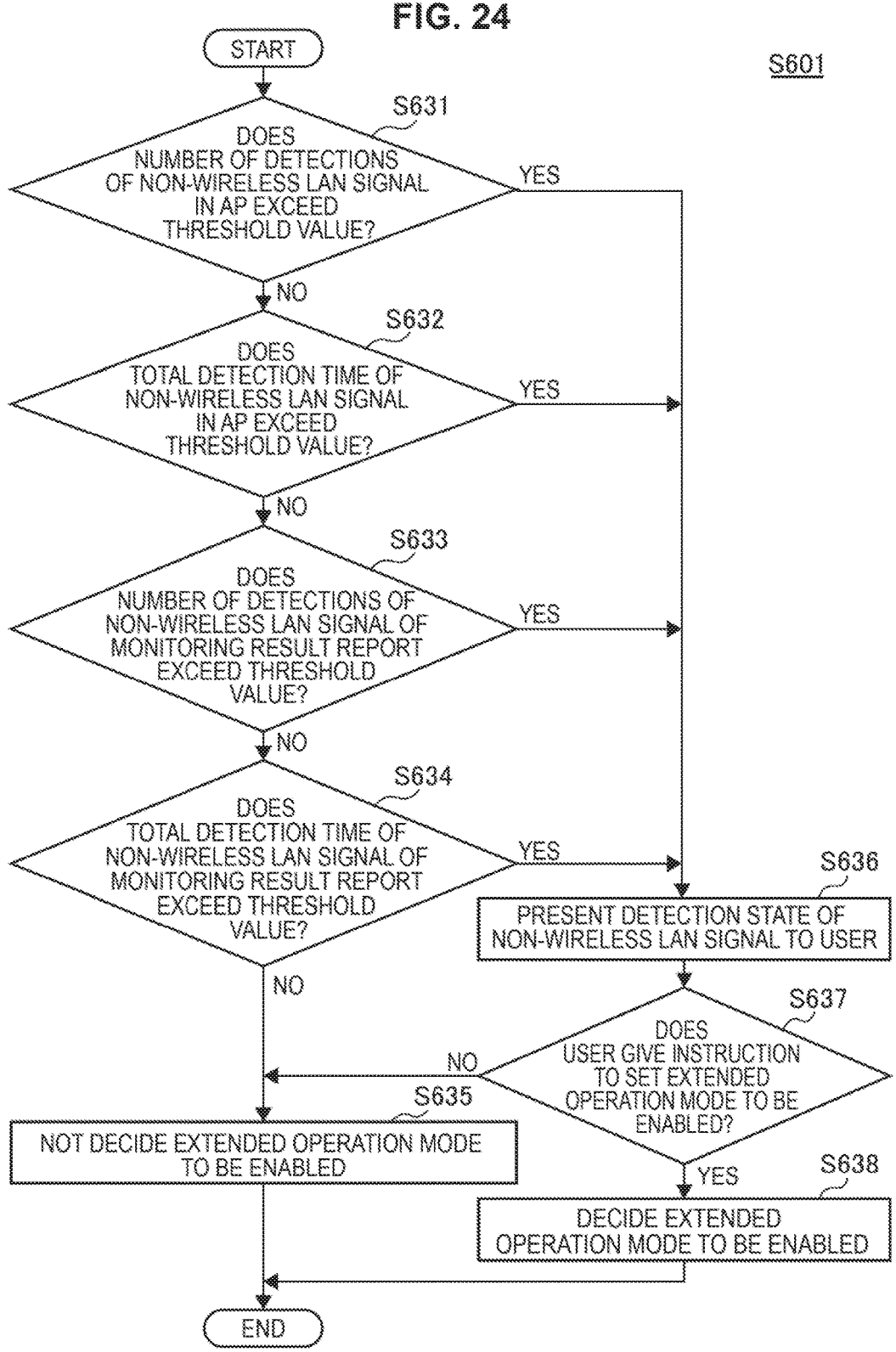
FIG. 24 is a flowchart conceptually illustrating an operation change determination process of an AP according to the embodiment.

Next, the operation change determination process, that is, the process of determining whether or not the extended operation mode is decided to be enabled will be described with reference to FIG. 24. FIG. 24 is a flowchart conceptually illustrating the operation change determination process of the AP 100-3 according to the present embodiment.

The AP 100-3 determines whether or not the number of detections of the non-wireless LAN signal in the AP 100-3 exceeds a threshold value (step S631), and if the number of detections of the non-wireless LAN signal in the AP 100-3 is determined to be equal to or less than a threshold value, the AP 100-3 determines whether or not the total detection time of the non-wireless LAN signal in the AP 100-3 exceeds a threshold value (step S632).

If the total detection time of the non-wireless LAN signal in the AP 100-3 is determined to be equal to or less than the threshold value, the AP 100-3 determines whether or not the number of detections of the non-wireless LAN signal of the monitoring result report exceeds a threshold value (Step S633). Further, if the number of detections of the non-wireless LAN signal of the monitoring result report is determined to be equal to or less than a threshold value, the AP 100-3 determines that the total detection time of the non-wireless LAN signal of the monitoring result report exceeds a threshold value (Step S634).

If the total detection time of the non-wireless LAN signal of the monitoring result report is determined to be equal to or less than a threshold value, the AP 100-3 does not decide the extended operation mode to be enabled (step S635).

Further, in a case in which any of the determination results in steps S631 to S634 is YES, the AP 100-3 presents the detection state of the non-wireless LAN signal to the user (step S636). Specifically, the control unit 140 causes the output unit to output the detection determination result for the non-wireless LAN signal. Further, the control unit 140 causes the output unit to output content for urging the user to input whether or not the extended operation mode is enabled.

Then, the AP 100-3 determines whether or not the user gives an instruction to set the extended operation mode to be enabled (step S637). More specifically, the control unit 140 determines whether or not to the extended operation mode is set to be enabled on the basis of input information obtained through the input unit.

If the user gives an instruction to set the extended operation mode to be enabled, the AP 100-3 decides the extended operation mode to be enabled (step S638), and otherwise, the process proceeds to step S635.

(Operation Change Process of STA)

Figure 25:
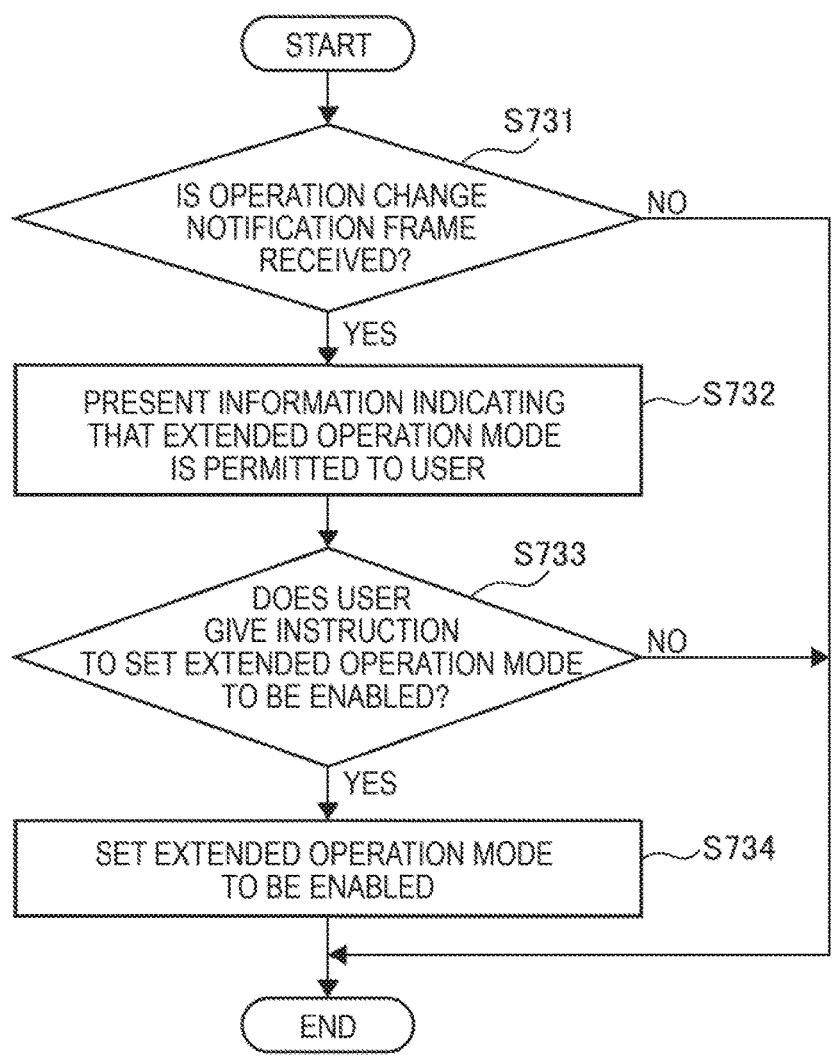
FIG. 25 is a flowchart conceptually illustrating an operation change control process of an STA according to the embodiment.

Next, the operation change control process of the STA 200-3 will be described with reference to FIG. 25. FIG. 25 is a flowchart conceptually illustrating the operation change control process of the STA 200-3 according to the present embodiment.

The STA 200-3 determines whether or not the operation change notification frame is received (step S731), and if the operation change notification frame is determined to be received, the STA 200-3 presents information indicating that the extended operation mode is permitted to the user (step S732). Specifically, the control unit 240 causes the output unit to output information indicating that the extended operation mode is available on the basis of the communication mode setting information included in the operation change notification frame. Further, the control unit 240 causes the output unit to output content for urging the user to input whether or not the extended operation mode is set to enabled.

Then, the STA 200-3 determines whether or not the user gives an instruction to set the extended operation mode to be enabled (step S733). Specifically, the control unit 240 determines whether or not the extended operation mode is set to be enabled on the basis of the input information obtained through the input unit.

If the user gives an instruction to set the extended operation mode to be enabled, the STA 200-3 sets the extended operation mode to be enabled (step S734).

Further, similarly to the first embodiment, the STA 200-3 may transmit the acknowledgment frame in response to the operation change notification frame. Further, in a case in which the extended operation mode is determined to be set to be enabled, the STA 200-3 may transmit a response frame indicating that the extended operation mode is set to be enabled to the AP 100-3. Further, the AP 100-3 may perform the operation change only in a case in which the response frame is received. In this case, since the communication modes of the AP 100-3 and the STA 200-3 coincide with each other, it is possible to reduce the possibility that one of the AP 100-3 and the STA 200-3 will suffer from a disadvantage in acquisition of the transmission authority.

(Signal Detection and Reception Process in Extended Operation Mode)

Figure 26:
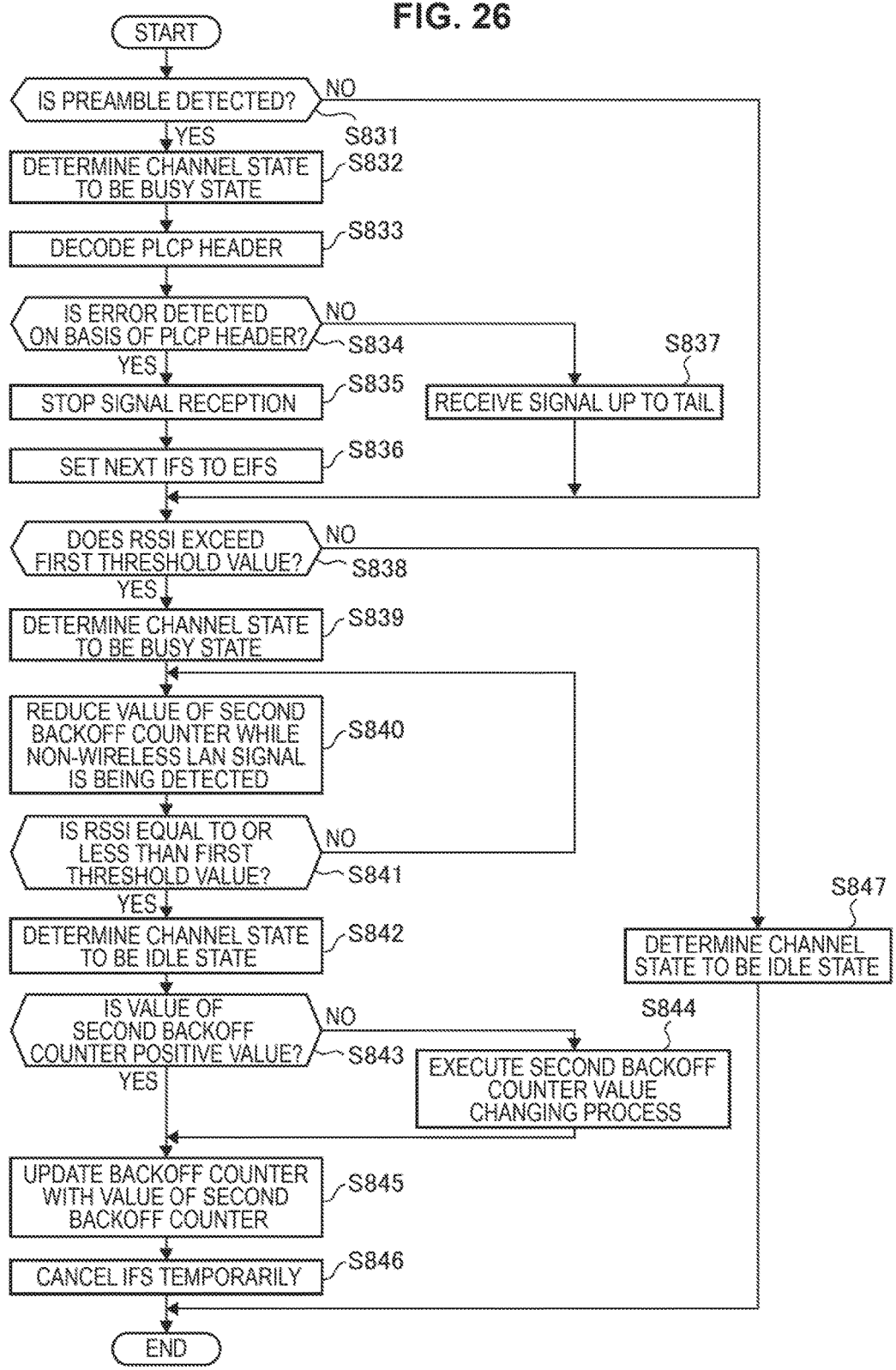
FIG. 26 is a flowchart conceptually illustrating signal detection and a reception process in an extended carrier sense mode of a wireless LAN communication device according to the embodiment.

Next, the signal detection and reception process in the extended operation mode, that is, the extended carrier sense mode in the wireless LAN communication device 100-3 (200-3) will be described with reference to FIG. 26. FIG. 26 is a flowchart conceptually illustrating the signal detection and reception process in the extended carrier sense mode in the wireless LAN communication device 100-3 (200-3) according to the present embodiment.

Since a process of steps S831 to S839 is substantially the same as the process of steps S801 to S809 described above, description thereof is omitted.

After a process of step S809, while the non-wireless LAN signal is being detected, the wireless LAN communication device 100-3 (200-3) reduces the value of the second backoff counter (step S840). Specifically, the signal processing unit 120 (220) decrements the value of the second backoff counter while no preamble is being detected, and the non-wireless LAN signal is being detected.

Since a process of step S841 and subsequent steps is substantially the same as the process of steps S811 to S817 described above, description thereof is omitted.

4-3. Conclusion of Third Embodiment

As described above, according to the third embodiment of the present disclosure, the reception determination for the second signal is performed on the basis of the presence or absence of reception of the second signal. Therefore, since the reception determination for the non-wireless LAN signal is directly performed, the accuracy of the determination result is improved. Therefore, it is possible to suppress the occurrence of loss of the transmission authority of the wireless LAN communication device 100-3 (200-3) or inappropriate acquisition of the transmission authority.

Further, it is determined whether or not the second signal is received on the basis of the periodicity for the reception signal. Therefore, since a characteristic which appears in the non-wireless LAN signal repeatedly is used, the occurrence of detection failure is suppressed as compared with the case in which a characteristic appearing once is used. Therefore, it is possible to further improve the accuracy of the determination result.

Further, the periodicity for the reception signal includes the periodicity for the time or the frequency. Therefore, since the reception time of the signal or the frequency of the reception signal which is normally detected at the time of signal detection is used, it is possible to detect the non-wireless LAN signal without adding a new configuration.

5. Fourth Embodiment (Determination Based on Signal Pattern/First Communication Mode)

The wireless LAN communication device 100-3 (200-3) according to the third embodiment of the present disclosure has been described above. Next, the wireless LAN communication device 100-4 (200-4) according to the fourth embodiment of the present disclosure will be described. The wireless communication system according to the present embodiment performs the reception determination for the non-wireless LAN signal on the basis of the signal pattern regardless of the process for starting the extended operation mode, and performs the detection and reception of the signal in the first communication mode.

5-1. Detailed Configuration of Device

A function of the wireless LAN communication device 100-4 (200-4) according to the present embodiment will be described in detail. Further, description of functions which are substantially the same as the functions according to the above embodiment will be omitted.
((Function of AP))

First, the function of the AP 100-4 will be described in detail. Each time the non-wireless LAN signal is received, the AP 100-4 controls carrier sense and performs transmission on the basis of the controlled carrier sense. Specifically, the AP 100-4 normally performs the signal detection and reception process in the extended operation mode, that is, the extended carrier sense mode regardless of the monitoring or the reception of monitoring result notification. Therefore, the AP 100-4 may not have the functions such as the monitoring for the non-wireless LAN signal, the operation change control, and the operation change notification.
((Function of STA))

Then, the function of the STA 200-4 will be described in detail. Similarly to the AP 100-4, the STA 200-4 normally performs the signal detection and reception process in the extended carrier sense mode regardless of the monitoring or the reception of the operation change notification. Therefore, the STA 200-4 may not have the functions such as the monitoring for the non-wireless LAN signal, the monitoring result notification, and the operation change control.

5-2. Process of Device

Since the wireless LAN communication device 100-4 (200-4) according to the present embodiment perform the signal detection and reception process in the extended carrier sense mode each time a signal is received.

5-3. Conclusion of Fourth Embodiment

As described above, according to the fourth embodiment of the present disclosure, the wireless LAN communication device 100-4 (200-4) controls carrier sense each time the non-wireless LAN signal is received and performs transmission on the basis of the controlled carrier sense. Therefore, as compared with the case in which the signal detection and reception process in the extended carrier sense mode is performed on the basis of the monitoring result for the non-wireless LAN signal, the process related to the monitoring and the operation change notification is omitted, and thus the configuration of the wireless LAN communication device 100-4 (200-4) is simplified. Accordingly, the processing load and the manufacturing cost of the wireless LAN communication device 100-4 (200-4) can be reduced.

Further, it may be determined whether or not the signal detection and reception process in the extended carrier sense mode is performed may be determined on the basis of setting information or the like when the AP 100-4 is activated or may be switched on the basis of a setting performed by the user.

6. Fifth Embodiment (Determination on the Basis of Signal Pattern/Third Communication Mode)

The wireless LAN communication device 100-4 (200-4) according to the fourth embodiment of the present disclosure has been described above. Next, the wireless LAN communication device 100-5 (200-5) according to the fifth embodiment of the present invention will be described. The wireless communication system according to the present embodiment performs the reception determination for the non-wireless LAN signal on the basis of the signal pattern and performs the detection and reception of the signal in a third communication mode.

6-1. Detailed Configuration of Device

A function of the wireless LAN communication device 100-5 (200-5) according to the present embodiment will be described in detail. Further, description of functions which are substantially the same as the functions according to the above embodiments will be omitted.
((Function of AP))

First, the function of the AP 100-5 will be described in detail.
(Operation Change Control and Operation Change Notification)

The AP 100-5 determines whether or not the communication mode transitions to an energy detection condition change mode on the basis of the reception determination for the non-wireless LAN signal. Specifically, the control unit 140 determines whether or not the communication mode transitions to the energy detection condition change mode on the basis of the detection information of the non-wireless LAN signal described above. If the communication mode is determined to transition to the energy detection condition change mode, the control unit 140 sets the communication mode to the energy detection condition change mode, and decides a second energy detection threshold value serving as a candidate of an energy detection threshold value used for determination used in carrier sense. Further, the second energy detection threshold value is higher than the energy detection threshold value used in the normal carrier sense. Further, the second energy detection threshold value may be stored in the storage unit 150 in advance.

Figure 27:
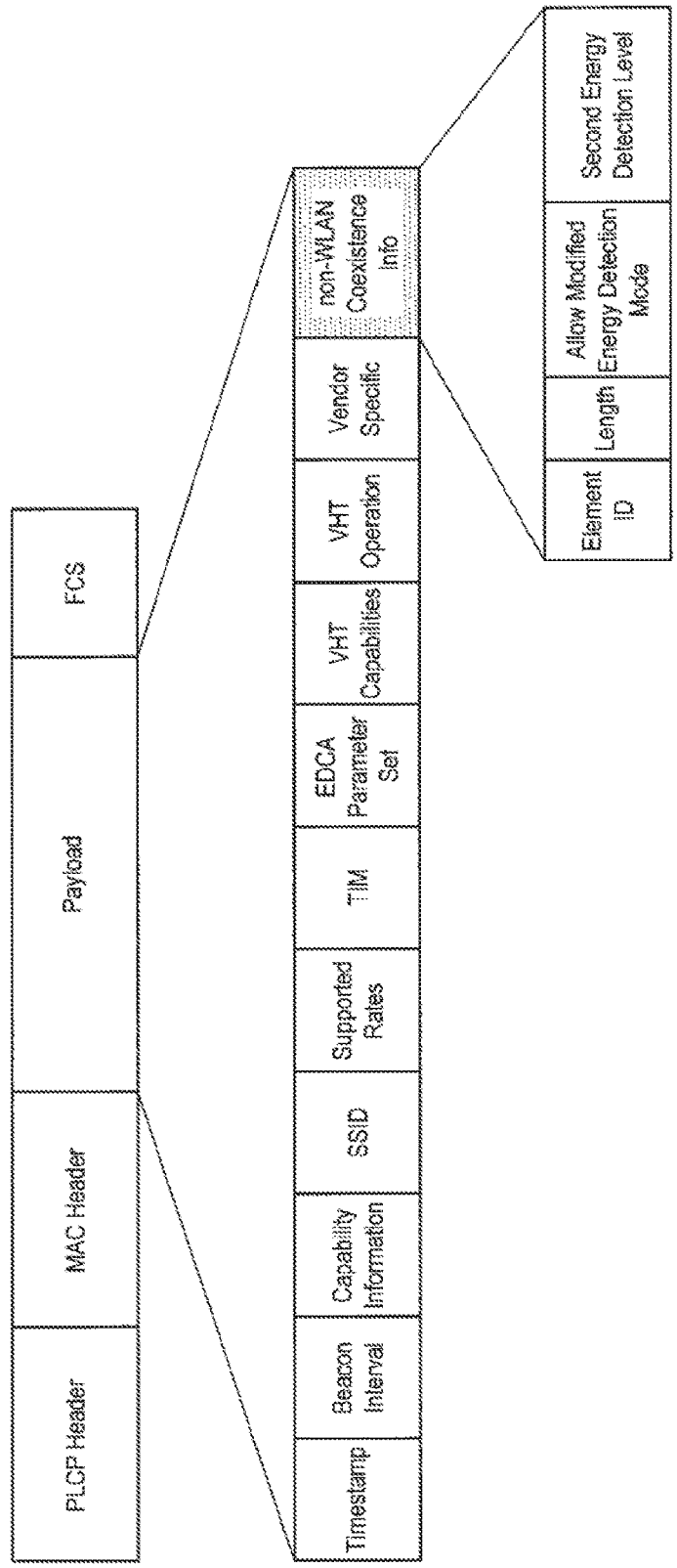
FIG. 27 is a diagram illustrating a configuration example of an operation change notification frame communicated in a wireless LAN communication system according to a fifth embodiment of the present disclosure.

Further, the AP 100-5 gives a notification indicating information related to the energy detection condition change mode to the STA 200-5. Specifically, if the communication mode is determined to transition to the energy detection condition change mode on the basis of the detection information, the control unit 140 causes an operation change notification frame including information related to the energy detection condition change mode (hereinafter also referred to as "energy detection information") to be generated. Then, the generated frame is transmitted to the STA 200-5 through the wireless communication unit. Further, the operation change notification frame according to the present embodiment will be described in detail with reference to FIG. 27. FIG. 27 is a diagram illustrating a configuration example of the operation change notification frame communicated in the wireless LAN communication system according to the present embodiment. Further, description of fields which are substantially the same as in the operation change notification frame according to the above embodiments will be omitted.

As illustrated in FIG. 27, the non-WLAN Coexistence Info field includes fields such as Element ID, Length, Allow Modified Energy Detection Mode, and Second Energy Detection Level. Information indicating that the set energy detection condition change mode is used is stored in the Allow Modified Energy Detection Mode field, and information indicating the second energy detection threshold value as the energy detection information is stored in the Second Energy Detection Level field. Further, the energy detection information includes information specifying a bandwidth and an RSSI to be applied.

(Third Communication Mode: Energy Detection Condition Change Mode)

The AP 100-5 performs detection and reception of a signal according to a third communication mode set on the basis of the reception determination for the non-wireless LAN signal (hereinafter also referred to as an "energy detection condition change mode"). Specifically, the control unit 140 causes the wireless communication unit to perform transmission on the basis of a carrier sense different from carrier sense in the extended carrier sense mode controlled on the basis of the reception determination for the non-wireless LAN signal. More specifically, control of carrier sense in the energy detection condition change mode includes selection of a threshold value for a reception signal strength used for the reception determination for the non-wireless LAN signal.

Specifically, the control unit 140 selects the threshold value for the reception signal strength on the basis of the result of the reception determination for the non-wireless LAN signal. More specifically, if a signal is received, the control unit 140 selects the threshold value for the reception signal strength, that is, the energy detection threshold value as a threshold value for the energy detection determination in carrier sense in accordance with the presence or absence of the preamble detection by the signal processing unit 120 or in accordance with the presence or absence of the Mid Packet detection in addition to the presence or absence of the preamble detection. Further, in a case in which the non-wireless LAN signal can be directly detected as described above, the energy detection threshold value for the determination may be selected in accordance with whether or not the non-wireless LAN signal is detected.

For example, in a case in which the preamble is not detected by the signal processing unit 120, and no Mid Packet signal is detected, the control unit 140 selects the second energy detection threshold value out of the energy detection threshold value used in carrier sense of the related art and the second energy detection threshold value as the energy detection threshold value for the determination. Thus, in a case in which the reception signal is not determined as the wireless LAN signal, that is, there is a possibility that it is the non-wireless LAN signal, the energy detection threshold value higher than usual is used for the energy detection determination, and thus it is difficult for the non-wireless LAN signal to be detected as a signal which is to undergo the transmission control.

((Function of STA))

A function of the STA 200-5 differs from the function of the STA 200 according to the above embodiment in the detection and reception of the signal in the energy detection condition change mode. However, since this function is substantially the same as the function of the AP 100-5, description thereof is omitted.

(Operation Change Control)

The STA 200-5 sets the communication mode to the energy detection condition change mode on the basis of the operation change notification. For example, the control unit 240 sets the communication mode to the energy detection condition change mode on the basis of the energy detection information included in the operation change notification frame received from the AP 100-5, and sets the energy detection threshold value for the determination used in the energy detection condition change mode on the basis of the energy detection information.

6-2. Process of Device

Next, a process of the wireless LAN communication device 100-5 (200-5) according to the present embodiment will be described. Here, the description will proceed focusing on the signal detection and reception process in the extended operation mode, that is, the energy detection condition change mode. Further, descriptions of processes which are substantially the same as those described above are omitted.

Figure 28:
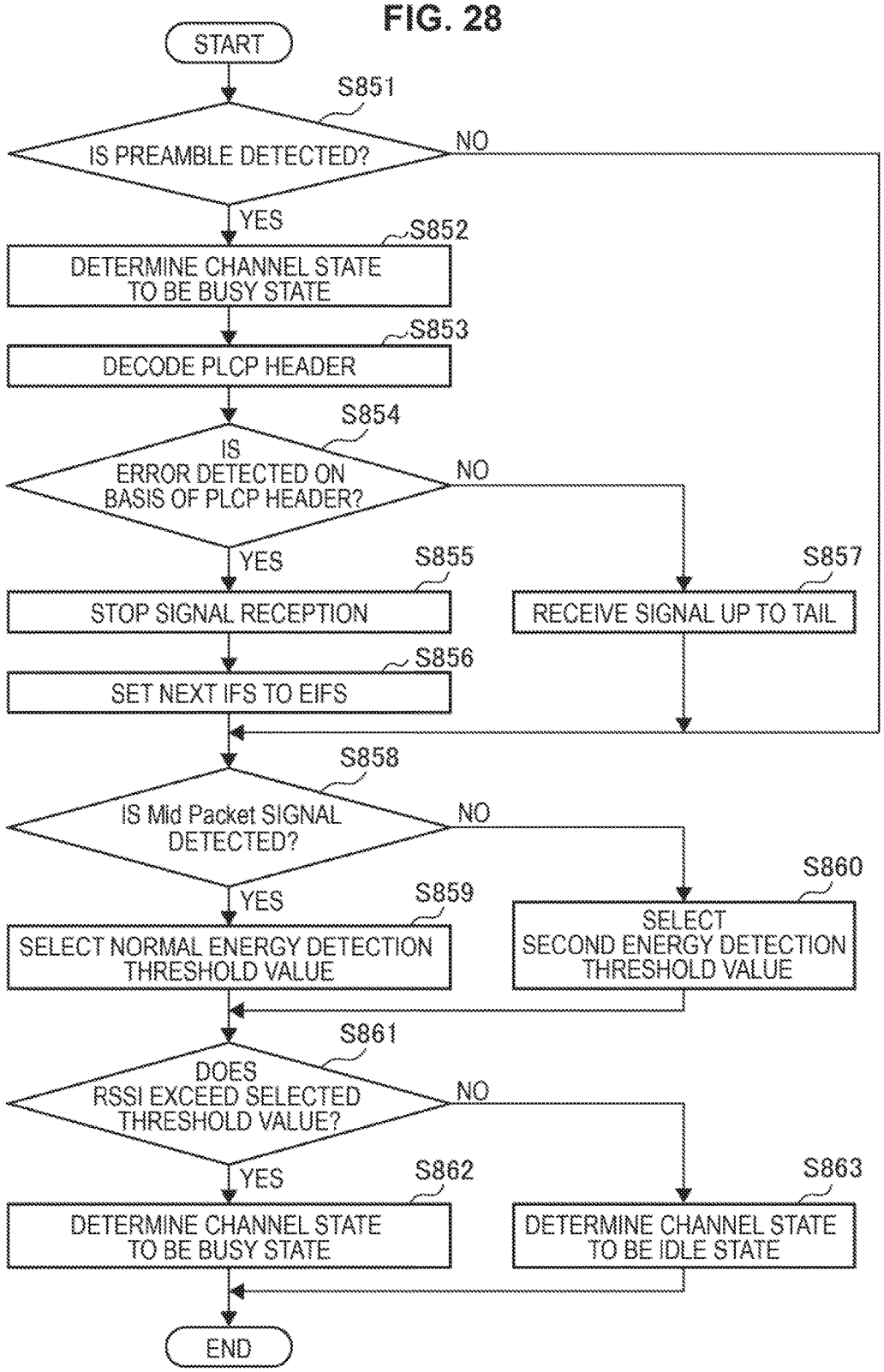
FIG. 28 is a flowchart conceptually illustrating signal detection and a reception process in an energy detection condition change mode of a wireless LAN communication device according to the embodiment.

First, the signal detection and reception process in the energy detection condition change mode in the wireless LAN communication device 100-5 (200-5) will be described with reference to FIG. 28. FIG. 28 is a flowchart conceptually illustrating the signal detection and reception process in the energy detection condition change mode in the wireless LAN communication device 100-5 (200-5) according to the present embodiment. Further, descriptions of processes which are substantially the same as those described above are omitted.

Since a process of steps S851 to S857 is substantially the same as the process of steps S801 to S807, description thereof is omitted.

If the preamble is determined not to be detected in step S851, the wireless LAN communication device 100-5 (200-5) determines whether or not the Mid Packet signal is detected (step S858).

If the Mid Packet signal is determined to be detected, the wireless LAN communication device 100-5 (200-5) selects the normal energy detection threshold value (step S859), and if the Mid Packet signal is determined not to be detected, the wireless LAN communication device 100-5 (200-5) selects the second energy detection threshold value (step S860). Specifically, in a case in which the preamble is not detected, and the Mid Packet signal is detected, the control unit 140 (240) selects the normal energy detection threshold value as the energy detection threshold value for the determination. On the other hand, in a case in which the preamble is not detected, and the Mid Packet signal is not detected, the control unit 140 (240) selects the second energy detection threshold value as the energy detection threshold value for the determination.

Then, the wireless LAN communication device 100-5 (200-5) determines whether or not the RSSI exceeds the selected threshold value (step S861). Specifically, the control unit 140 (240) determines whether or not the RSSI of the reception signal exceeds the energy detection threshold value for the determination.

If the RSSI is determined to exceed the selected threshold value, the wireless LAN communication device 100-5 (200-5) determines that the channel state is the busy state (step S862), and if the RSSI is determined to be equal to or less than the threshold value, the wireless LAN communication device 100-5 (200-5) determines that the channel state is the idle state (step S863).

Figure 29:
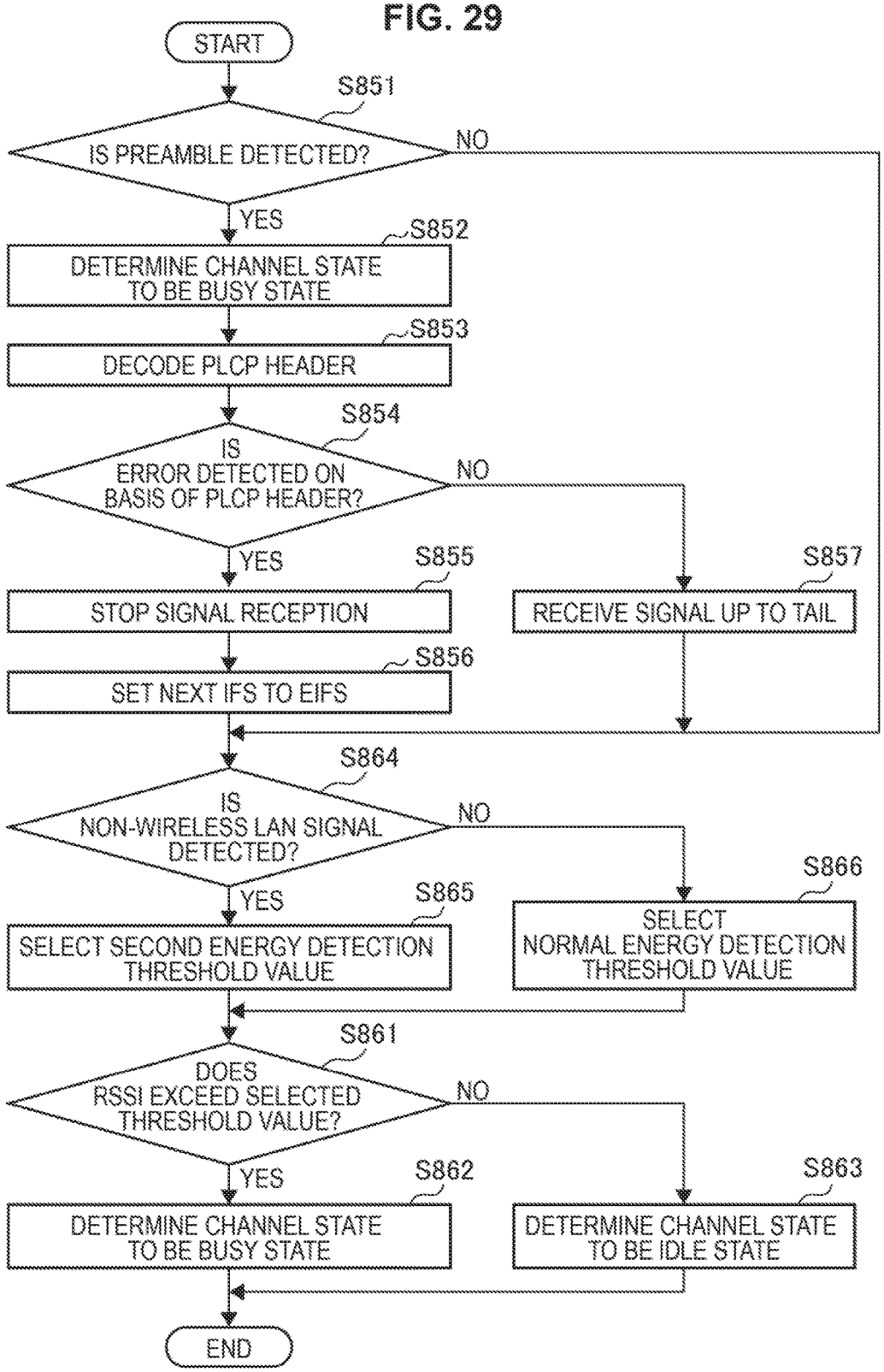
FIG. 29 is a flowchart conceptually illustrating signal detection and a reception process in an energy detection condition change mode using detection of a non-wireless LAN signal of a wireless LAN communication device according to the embodiment.

Further, in the signal detection and reception process in the energy detection condition change mode, the detection of the non-wireless LAN signal may be used as described above. The signal detection and reception process in the energy detection condition change mode using the detection of the non-wireless LAN signal in the wireless LAN communication device 100-5 (200-5) will be described with reference to FIG. 29. FIG. 29 is a flowchart conceptually illustrating the signal detection and reception process in the energy detection condition change mode using the detection of the non-wireless LAN signal in the wireless LAN communication device 100-5 (200-5) according to the present embodiment. Further, description of processes which are substantially the same as the processes described with reference to FIG. 28 is omitted.

If the preamble is determined not to be detected in step S851, the wireless LAN communication device 100-5 (200-5) determines whether or not the non-wireless LAN signal is detected (step S864).

If the non-wireless LAN signal is determined to be detected, the wireless LAN communication device 100-5 (200-5) selects the second energy detection threshold value (step S865), and if the non-wireless LAN signal is determined not to be detected, the wireless LAN communication device 100-5 (200-5) selects the normal energy detection threshold value (step S866).

Since a process of step S861 and subsequent steps is substantially the same as the process described with reference to FIG. 28, description thereof is omitted.

6-3. Conclusion of Fifth Embodiment

As described above, according to the fifth embodiment of the present disclosure, the control of carrier sense includes the selection of the threshold value for the reception signal strength used for the reception determination for the second signal. Therefore, since the second energy detection threshold value higher than the normal energy detection threshold value is used for the energy detection determination for the non-wireless LAN signal, it is difficult for the non-wireless LAN signal to be detected as a signal which is to undergo the transmission control. Therefore, the possibility that the wireless LAN communication device 100-5 (200-5) will be deprived of the transmission opportunities by the non-wireless LAN communication device can be reduced.

Further, the wireless LAN communication device 100-5 (200-5) selects the threshold value for the reception signal strength on the basis of the result of the reception determination for the second signal. Therefore, in a case in which the wireless LAN signal is not detected, that is, the reception signal is highly likely to be the non-wireless LAN signal, the second LAN detection threshold value is selected, and thus only the non-wireless LAN signal is unlikely to be detected. Therefore, it is possible to ensure the fairness for the transmission authority with other wireless LAN communication devices.

7. Application Examples

The technology according to the present disclosure is applicable to various products. For example, the wireless LAN communication device 200 may be implemented as a mobile terminal such as smartphones, tablet personal computers (PCs), notebook PCs, portable game terminals, or digital cameras, a fixed-type terminal such as television receivers, printers, digital scanners, or network storages, or a car-mounted terminal such as car navigation devices. In addition, the wireless LAN communication device 200 may be implemented as a terminal (also referred to as machine type communication (MTC) terminal) which performs machine-to-machine (M2M) communication, such as smart meters, vending machines, remote monitoring devices, and point of sale (POS) terminals. Furthermore, the wireless LAN communication device 200 may be a wireless communication module mounted in such terminals (e.g., integrated circuit modules including one die).

On the other hand, for example, the wireless LAN communication device 100 may be implemented as a wireless LAN access point (also referred to as a wireless base station) having or not having a router function. In addition, the wireless LAN communication device 100 may be implemented as a mobile wireless LAN router. Furthermore, the wireless LAN communication device 100 may be a wireless communication module (e.g., integrated circuit modules including one die) mounted on these devices.

7-1. First Application Example

Figure 30:
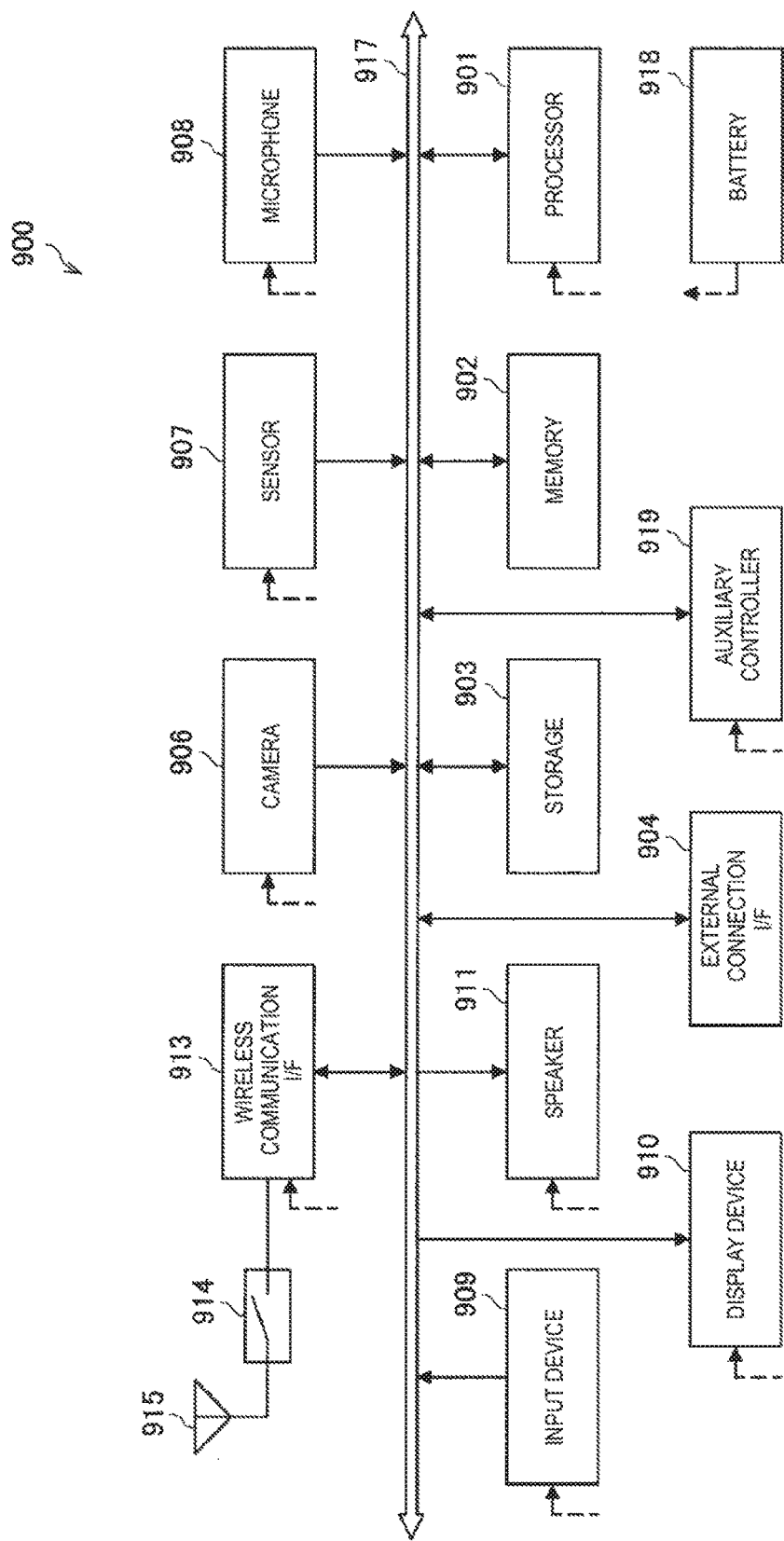
FIG. 30 is a block diagram illustrating an example of a schematic configuration of a smartphone.

FIG. 30 is a block diagram illustrating an example of a schematic configuration of a smartphone 900 to which the technology according to the present disclosure can be applied. The smartphone 900 includes a processor 901, a memory 902, a storage 903, an external connection interface 904, a camera 906, a sensor 907, a microphone 908, an input device 909, a display device 910, a speaker 911, a wireless communication interface 913, an antenna switch 914, an antenna 915, a bus 917, a battery 918, and an auxiliary controller 919.

The processor 901 may be, for example, a central processing unit (CPU) or a system on chip (SoC), and controls functions of an application layer and other layers of the smartphone 900. The memory 902 includes a random access memory (RAM) and a read only memory (ROM), and stores programs executed by the processor 901 and data. The storage 903 can include a storage medium such as a semiconductor memory or a hard disk. The external connection interface 904 is an interface for connecting an externally attached device such as a memory card or a universal serial bus (USB) device to the smartphone 900.

The camera 906 includes, for example, an image sensor such as a charge coupled device (CCD) or a complementary metal oxide semiconductor (CMOS), and generates a captured image. The sensor 907 can include a sensor group including, for example, a positioning sensor, a gyro sensor, a geomagnetic sensor, an acceleration sensor, and the like.

The microphone 908 converts voice input to the smartphone 900 into an audio signal. The input device 909 includes, for example, a touch sensor that detects touches on a screen of the display device 910, a key pad, a keyboard, buttons, switches, and the like, and accepts an operation or information input from a user. The display device 910 includes a screen such as a liquid crystal display (LCD) or an organic light emitting diode (OLED) display, and displays an output image of the smartphone 900. The speaker 911 converts an audio signal output from the smartphone 900 into voice.

The wireless communication interface 913 supports one or more wireless LAN standards such as IEEE 802.11a, 11b, 11g, 11n, 11ac, 11ad, and 11ax, and executes wireless communication. The wireless communication interface 913 can communicate with other devices via a wireless LAN access point in an infrastructure mode. In addition, the wireless communication interface 913 can directly communicate with other devices in a direct communication mode such as an ad hoc mode or Wi-Fi Direct (registered trademark). Note that in Wi-Fi Direct mode, unlike the ad hoc mode, one of two terminals operates as an access point, but communication is performed directly between the terminals. The wireless communication interface 913 can typically include a baseband processor, a radio frequency (RF) circuit, a power amplifier, and the like. The wireless communication interface 913 may be a single-chip module on which a memory for storing a communication control program, a processor for executing the program, and a relevant circuit are integrated. The wireless communication interface 913 may support other types of wireless communication schemes such as a short-range wireless communication scheme, a close proximity wireless communication scheme, or a cellular communication scheme, in addition to the wireless LAN scheme. The antenna switch 914 switches a connection destination of the antenna 915 among a plurality of circuits (e.g., circuits for different wireless communication schemes) included in the wireless communication interface 913. The antenna 915 includes a single antenna element or a plurality of antenna elements (e.g., a plurality of antenna elements included in a MIMO antenna), and is used for transmission and reception of a wireless signal through the wireless communication interface 913.

Note that the configuration of the smartphone 900 is not limited to the example of FIG. 30, and the smartphone 900 may include a close plurality of antennas (e.g., an antenna for a wireless LAN and an antenna for a proximity wireless communication scheme and the like). In this case, the antenna switch 914 may be omitted from the configuration of the smartphone 900.

The bus 917 connects the processor 901, the memory 902, the storage 903, the external connection interface 904, the camera 906, the sensor 907, the microphone 908, the input device 909, the display device 910, the speaker 911, the wireless communication interface 913, and the auxiliary controller 919 to one another. The battery 918 supplies electric power to each of the blocks of the smartphone 900 illustrated in FIG. 30 via a power supply line partially indicated by dashed lines in the figure. The auxiliary controller 919 causes the required minimum functions of the smartphone 900 to operate, for example, in the sleep mode.

In the smartphone 900 illustrated in FIG. 30, the data processing unit 210, the signal processing unit 220, the wireless interface unit 230, and the control unit 240 described with reference to FIG. 6 may be implemented in the wireless communication interface 913. Further, at least some of these functions may be implemented in the processor 901 or the auxiliary controller 919. For example, in a case in which the non-wireless LAN signal is detected by the signal processing unit 220, the control unit 240 controls carrier sense or the communication parameter such that the transmission opportunities of the smartphone 900 can be secured even in the situation in which the non-wireless LAN communication device is mixed.

Note that the smartphone 900 may operate as a wireless access point (software AP) by the processor 901 executing an access point function at the application level. In addition, the wireless communication interface 913 may have the wireless access point function.

7-2. Second Application Example

Figure 31:
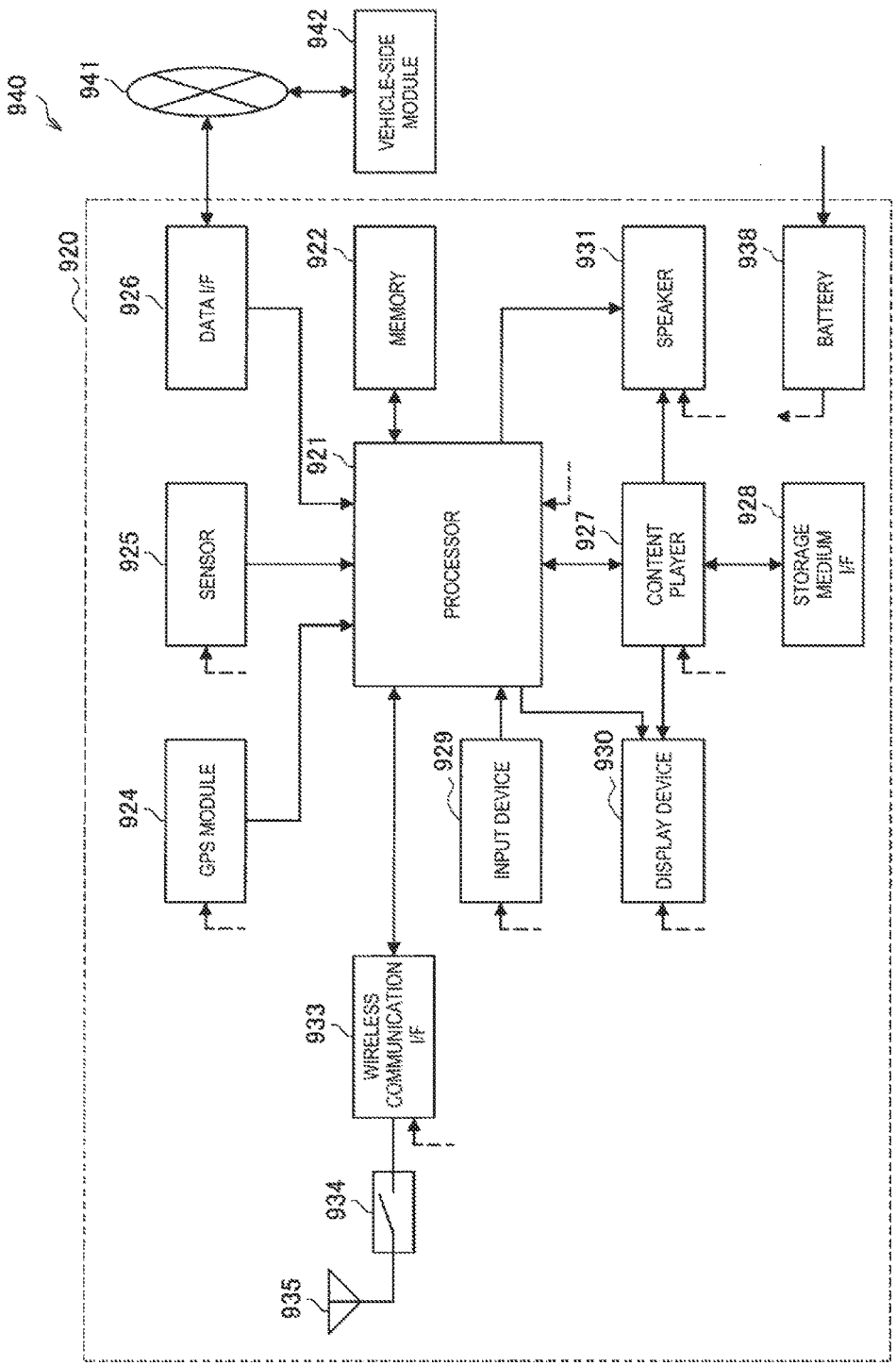
FIG. 31 is a block diagram illustrating an example of a schematic configuration of a car navigation device.

FIG. 31 is a block diagram illustrating an example of a schematic configuration of a car navigation device 920 to which the technology according to the present disclosure can be applied. The car navigation device 920 includes a processor 921, a memory 922, a global positioning system (GPS) module 924, a sensor 925, a data interface 926, a content player 927, a storage medium interface 928, an input device 929, a display device 930, a speaker 931, a wireless communication interface 933, an antenna switch 934, an antenna 935, and a battery 938.

The processor 921 may be, for example, a CPU or SoC, and controls a navigation function and other functions of the car navigation device 920. The memory 922 includes a RAM and a ROM, and stores programs executed by the processor 921 and data.

The GPS module 924 measures the position (e.g., latitude, longitude, and altitude) of the car navigation device 920 using GPS signals received from a GPS satellite. The sensor 925 can include a sensor group including, for example, a gyro sensor, a geomagnetic sensor, and a barometric sensor. The data interface 926 is connected to, for example, an in-vehicle network 941 via a terminal that is not illustrated, and acquires data generated on the vehicle side such as car speed data.

The content player 927 reproduces the content stored in a storage medium (e.g., CD or DVD) inserted into the storage medium interface 928. The input device 929 includes, for example, a touch sensor that detects touches on a screen of the display device 930, buttons, switches, and the like, and accepts an operation or information input from the user. The display device 930 includes a screen such as an LCD or an OLED display, and displays a navigation function or an image of content. The speaker 931 outputs sound of the navigation function or the content to be reproduced.

The wireless communication interface 933 supports one or more wireless LAN standards such as IEEE 802.11a, 11b, 11g, 11n, 11ac, 11ad, and 11ax, and executes wireless communication. The wireless communication interface 933 can communicate with other devices via a wireless LAN access point in an infrastructure mode. In addition, the wireless communication interface 933 can directly communicate with other devices in a direct communication mode, such as an ad hoc mode and Wi-Fi Direct. The wireless communication interface 933 can typically include a baseband processor, an RF circuit, a power amplifier, and the like. The wireless communication interface 933 may be a single-chip module on which a memory for storing a communication control program, a processor for executing the program, and a relevant circuit are integrated. The wireless communication interface 933 may support other types of wireless communication schemes such as a short-range wireless communication scheme, a close proximity wireless communication scheme, or a cellular communication scheme, in addition to the wireless LAN scheme. The antenna switch 934 switches a connection destination of the antenna 935 among a plurality of circuits included in the wireless communication interface 933. The antenna 935 includes a single antenna element or a plurality of antenna elements, and is used for transmission and reception of a wireless signal through the wireless communication interface 933.

Note that the configuration of the car navigation device 920 is not limited to the example of FIG. 31, and the car navigation device 920 may include a plurality of antennas. In this case, the antenna switch 934 may be omitted from the configuration of the car navigation device 920.

The battery 938 supplies electric power to each of the blocks of the car navigation device 920 illustrated in FIG. 31 via a power supply line partially indicated by a dashed line in the figure. In addition, the battery 938 accumulates electric power supplied from the vehicle side.

In the car navigation device 920 illustrated in FIG. 31, the data processing unit 210, the signal processing unit 220, the wireless interface unit 230, and the control unit 240 described with reference to FIG. 6 may be implemented in the wireless communication interface 933. Further, at least some of these functions may be implemented in the processor 921. For example, in a case in which the non-wireless LAN signal is detected by the signal processing unit 220, the control unit 240 controls carrier sense or the communication parameter such that the transmission opportunities of the car navigation device 920 can be secured even in the situation in which the non-wireless LAN communication device is mixed.

In addition, the wireless communication interface 933 may operate as the above-described wireless LAN communication device 100 and may provide wireless connection to a terminal carried by a user who rides in a vehicle. At this time, for example, in a case in which the non-wireless LAN signal is detected by the signal processing unit 120, the control unit 140 controls carrier sense or the communication parameter such that the transmission opportunities of the car navigation device 920 can be secured even in the situation in which the non-wireless LAN communication device is mixed.

In addition, the technology according to the present disclosure may be implemented as an in-vehicle system (or vehicle) 940 including one or more blocks of the above-described car navigation device 920, the in-vehicle network 941, and a vehicle-side module 942. The vehicle-side module 942 generates vehicle-side data such as vehicle speed, engine rpm, or failure information, and outputs the generated data to the in-vehicle network 941.

7-3. Third Application Example

Figure 32:
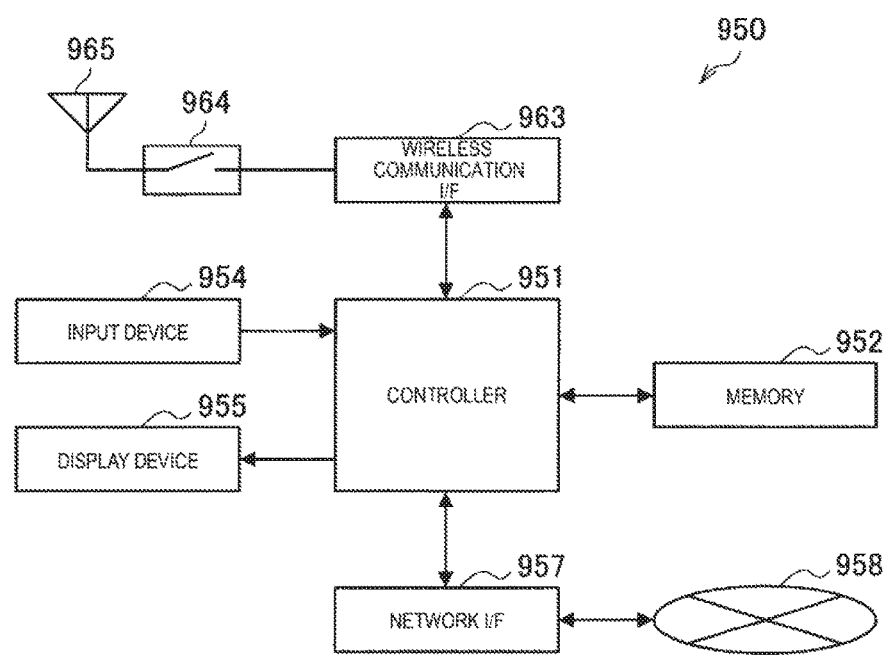
FIG. 32 is a block diagram illustrating an example of a schematic configuration of a wireless access point.

FIG. 32 is a block diagram illustrating an example of a schematic configuration of a wireless access point 950 to which the technology according to the present disclosure can be applied. The wireless access point 950 includes a controller 951, a memory 952, an input device 954, a display device 955, a network interface 957, a wireless communication interface 963, an antenna switch 964, and an antenna 965.

The controller 951 may be, for example, a CPU or a digital signal processor (DSP), and causes various functions (e.g., access restriction, routing, encryption, firewall, log management, and the like) of the Internet Protocol (IP) layer and higher layers of the wireless access point 950 to be operated. The memory 952 includes a RAM and a ROM, and stores a program to be executed by the controller 951 and various kinds of control data (e.g., a terminal list, a routing table, an encryption key, security settings, a log, and the like).

The input device 954 includes, for example, a button, a switch, or the like, and accepts an operation from a user. The display device 955 includes an LED lamp or the like, and displays operation status of the wireless access point 950.

The network interface 957 is a wired communication interface for the wireless access point 950 to connect to a wired communication network 958. The network interface 957 may include a plurality of connection terminals. The wired communication network 958 may be a LAN such as Ethernet (registered trademark) or a wide area network (WAN).

The wireless communication interface 963 supports one or more wireless LAN standards such as IEEE 802.11a, 11b, 11g, 11n, 11ac, 11ad, and 11ax, and provides wireless connection to a neighboring terminal as an access point. The wireless communication interface 963 can typically include a baseband processor, an RF circuit, a power amplifier, and the like. The wireless communication interface 963 may be a single-chip module on which a memory for storing a communication control program, a processor for executing the program, and a relevant circuit are integrated. The antenna switch 964 switches a connection destination of the antenna 965 among a plurality of circuits included in the wireless communication interface 963. The antenna 965 includes a single antenna element or a plurality of antenna elements, and is used for transmission and reception of a wireless signal through the wireless communication interface 963.

In the wireless access point 950 illustrated in FIG. 32, the data processing unit 110, the signal processing unit 120, the wireless interface unit 130, and the control unit 140 described with reference to FIG. 6 may be implemented in the wireless communication interface 963. Further, at least some of these functions may be implemented in the controller 951. For example, in a case in which the non-wireless LAN signal is detected by the signal processing unit 120, the control unit 140 controls carrier sense or the communication parameter such that the transmission opportunities of the wireless access point 950 can be secured even in the situation in which the non-wireless LAN communication device is mixed.

8. Conclusion

As described above, according to the first embodiment of the present disclosure, carrier sense is performed such that it is advantageous to the transmission of the wireless LAN communication device 100-1 (200-1) in accordance with the reception of the non-wireless LAN signal, and it is possible to secure the transmission opportunities of the wireless LAN communication device 100-1 (200-1) in the situation in which the non-wireless LAN signal having the different format from the signal of the wireless LAN communication is transmitted.

Further, according to the second embodiment of the present disclosure, the communication parameter is controlled such that the transmission authority is easily acquired in accordance with the reception of the non-wireless LAN signal, and thus it is possible to secure the transmission opportunities of the wireless LAN communication device 100-2 (200-2) in the situation in which the non-wireless LAN signal having a format different from the signal of the wireless LAN communication is transmitted.

Further, according to the third embodiment of the present disclosure, since the reception determination for the non-wireless LAN signal is directly performed, the accuracy of the determination result is improved. Therefore, it is possible to suppress the occurrence of loss of the transmission authority of the wireless LAN communication device 100-3 (200-3) or inappropriate acquisition of the transmission authority.

Further, according to the fourth embodiment of the present disclosure, as compared with the case in which the signal detection and reception process in the extended carrier sense mode is performed on the basis of the monitoring result for the non-wireless LAN signal, the process related to the monitoring and the operation change notification is omitted, and thus the configuration of the wireless LAN communication device 100-4 (200-4) is simplified. Accordingly, the processing load and the manufacturing cost of the wireless LAN communication device 100-4 (200-4) can be reduced.

Further, according to the fifth embodiment of the present disclosure, since the second energy detection threshold value higher than the normal energy detection threshold value is used for the energy detection determination for the non-wireless LAN signal, it is difficult for the non-wireless LAN signal to be detected as a signal which is to undergo the transmission control. Therefore, the possibility that the wireless LAN communication device 100-5 (200-5) will be deprived of the transmission opportunities by the non-wireless LAN communication device can be reduced.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, in the above embodiments, a single extended operation mode and the normal communication mode are switched, but the present technology is not limited to this example. For example, the communication mode may be switched to a mode selected from a plurality of extended operation modes.

Further, in the above embodiments, the example in which the AP 100 and the STA 200 employ the same extended operation mode has been described, but different extended operation modes may be selected in the AP 100 and the STA 200. Similarly, the extended operation mode may be different between the STAs 200.

Further, the processes according to the above embodiments and modifications may be recombined or may be combined. For example, the wireless LAN communication device 100 (200) may perform the reception determination of the non-wireless LAN signal on the basis of any one of the signal pattern, the communication protocol of the wireless LAN standard, and the direct detection of the non-wireless LAN signal and perform the detection and reception of the signal in any one of the first to third communication modes. Further, as in the fourth embodiment, the wireless LAN communication device 100 (200) may normally perform the process corresponding to the signal detection and reception process in any one of the first to third communication mode regardless of the process for starting the extended operation mode.

Further, in the above embodiments, the example in which the bandwidth serving as the processing target of the extended operation mode is set has been described, but a plurality of bandwidths serving as the processing target of the extended operation mode may be set. For example, in a case in which a channel bonding scheme is employed in the wireless LAN communication device 100 (200), a primary channel and several secondary channels are set as the processing target of the extended operation mode. Further, only the primary channel or a specific secondary channel may be set as the processing target.

Further, in the above embodiments, the example in which the communication system includes the AP 100 and the STA 200 has been described, but instead of the AP 100, one of the STAs 200 may be a wireless communication device having a plurality of direct links with other STAs 200. In this case, a downlink can be interpreted as "simultaneous transmission from one STA 200 to a plurality of STAs 200," and an uplink can be interpreted as "simultaneous transmission from a plurality of STAs 200 to one STA 200."

Further, in the above embodiments, the example in which the second threshold value is notified of using the operation change notification frame has been described, but in a case in which the second threshold value is not notified of, the first threshold value may be used instead of the second threshold value. For example, in a case in which the operation change notification frame is omitted or the information indicating the second threshold value is not stored in the operation change notification frame, the first threshold value is used for the process in the extended carrier sense mode.

Further, the effects described in this specification are merely illustrative or exemplified effects, and are not limitative. That is, with or in the place of the above effects, the technology according to the present disclosure may achieve other effects that are clear to those skilled in the art from the description of this specification.

Further, not only a process in which steps shown in the flowcharts of the above embodiments are performed in a time-series manner in accordance with a described sequence but also a process in which the steps are not necessarily processed in a time-series manner but are executed in parallel or individually is included. Also, it is self-evident that even steps processed in a time-series manner can be appropriately changed in sequence depending on circumstances.

Additionally, the present technology may also be configured as below.

(1)

A communication device, including:

a signal processing unit configured to perform reception determination for a second signal having a different format from a first signal related to communication of a wireless local area network (LAN) standard;

a control unit configured to control carrier sense or a communication parameter on a basis of the reception determination for the second signal; and a communication unit configured to perform transmission on a basis of the controlled carrier sense or the controlled communication parameter.

(2)

The communication device according to (1), in which the reception determination for the second signal is performed on a basis of a result of determining whether or not a reception signal is the first signal.

(3)

The communication device according to (2), in which the determination on whether or not the reception signal is the first signal is performed on a basis of a signal pattern of the reception signal.

(4)
The communication device according to (3),
in which the signal pattern of the reception signal includes a signal pattern in a preamble of the reception signal.
(5)
The communication device according to (3) or (4),
in which the signal pattern of the reception signal includes periodicity of the reception signal.
(6)
The communication device according to any one of (2) to (5),
in which the reception determination for the second signal is performed further on a basis of a reception signal strength.
(7)
The communication device according to any one of (2) to (6),
in which the determination on whether or not the reception signal is the first signal includes determination on whether or not reception is performed at a time or a frequency according to a communication protocol of the wireless LAN standard.
(8)
The communication device according to any one of (1) to (7), in which the reception determination for the second signal is performed on a basis of whether or not the second signal is received.
(9)
The communication device according to (8),
in which it is determined whether or not the second signal is received on a basis of periodicity for a reception signal.
(10)
The communication device according to (9),
in which the periodicity for the reception signal includes periodicity for a time or a frequency.
(11)
The communication device according to any one of (1) to (10),
in which the reception determination for the second signal includes reception of a signal related to a result of the reception determination for the second signal or control of the carrier sense or the communication parameter.
(12)
The communication device according to any one of (1) to (11),
in which the control of the carrier sense includes control of a carrier sense time.
(13)
The communication device according to (12),
in which the carrier sense time includes a standby time from a time point at which a signal ceases to be received, and
the control unit sets the standby time to a time obtained by consuming the standby time during reception of the second signal when the reception of the second signal is completed.
(14)
The communication device according to (13),
in which the control unit sets the standby time to a time shorter than before the consumption, in a case in which the standby time to be set when the reception of the second signal is completed is a time obtained by completely consuming the standby time during the reception of the second signal.
(15)
The communication device according to any one of (1) to (14),
in which the control of the carrier sense includes selection of a threshold value for a reception signal strength used for the reception determination for the second signal.
(16)
The communication device according to (15),
in which the control unit selects a threshold value for the reception signal strength on a basis of a result of the reception determination for the second signal.
(17)
The communication device according to any one of (1) to (16),
in which the communication parameter includes a parameter for deciding a signal detection sensitivity in the carrier sense.
(18)
The communication device according to any one of (1) to (17),
in which the communication parameter includes a parameter for deciding a transmission time.
(19)
The communication device according to any one of (1) to (18),
in which the communication parameter includes a parameter for deciding transmission power.
(20)
A communication method, including:
performing, by a signal processing unit, reception determination for a second signal having a different format from a first signal related to communication of a wireless local area network (LAN) standard;
controlling, by a control unit, carrier sense or a communication parameter on a basis of the reception determination for the second signal; and
performing, by a communication unit, transmission on a basis of the controlled carrier sense or the controlled communication parameter.

REFERENCE SIGNS LIST 100, 200 wireless LAN communication device
110, 210 data processing unit
120, 220 signal processing unit
130, 230 wireless interface unit
140, 240 control unit
150, 250 storage unit

The invention claimed is:
1. A communication device, comprising:
circuitry configured to
perform reception determination for a second signal having a different format from a first signal related to communication of a wireless local area network (LAN) standard, and
control carrier sense or a communication parameter on a basis of the reception determination for the second signal; and
a transmitter configured to perform transmission on a basis of the controlled carrier sense or the controlled communication parameter, wherein
the control of the carrier sense includes control of a carrier sense time that includes a standby time from a time point at which a signal ceases to be received, and
the circuitry sets the standby time to a time obtained by consuming the standby time during reception of the second signal when the reception of the second signal is completed.
2. The communication device according to claim 1,
wherein the reception determination for the second signal is performed on a basis of a result of determining whether or not a reception signal is the first signal.

3. The communication device according to claim 2,
wherein the determination on whether or not the reception signal is the first signal is performed on a basis of a signal pattern of the reception signal.
4. The communication device according to claim 3,
wherein the signal pattern of the reception signal includes a signal pattern in a preamble of the reception signal.
5. The communication device according to claim 3,
wherein the signal pattern of the reception signal includes periodicity of the reception signal.
6. The communication device according to claim 2,
wherein the reception determination for the second signal is performed further on a basis of a reception signal strength.
7. The communication device according to claim 2,
wherein the determination on whether or not the reception signal is the first signal includes determination on whether or not reception is performed at a time or a frequency according to a communication protocol of the wireless LAN standard.
8. The communication device according to claim 1,
wherein the reception determination for the second signal is performed on a basis of whether or not the second signal is received.
9. The communication device according to claim 8,
wherein it is determined whether or not the second signal is received on a basis of periodicity for a reception signal.
10. The communication device according to claim 9,
wherein the periodicity for the reception signal includes periodicity for a time or a frequency.
11. The communication device according to claim 1,
wherein the reception determination for the second signal includes reception of a signal related to a result of the reception determination for the second signal or control of the carrier sense or the communication parameter.
12. The communication device according to claim 1,
wherein the circuitry sets the standby time to a time shorter than before the consumption, in a case in which the standby time to be set when the reception of the second signal is completed is a time obtained by completely consuming the standby time during the reception of the second signal.
13. The communication device according to claim 1,
wherein the control of the carrier sense includes selection of a threshold value for a reception signal strength used for the reception determination for the second signal.
14. The communication device according to claim 13,
wherein the circuitry selects a threshold value for the reception signal strength on a basis of a result of the reception determination for the second signal.
15. The communication device according to claim 1,
wherein the communication parameter includes a parameter for deciding a signal detection sensitivity in the carrier sense.
16. The communication device according to claim 1,
wherein the communication parameter includes a parameter for deciding a transmission time.
17. The communication device according to claim 1,
wherein the communication parameter includes a parameter for deciding transmission power.
18. A communication method, comprising:
performing, with a signal processor, reception determination for a second signal having a different format from a first signal related to communication of a wireless local area network (LAN) standard;
controlling, with circuitry, carrier sense or a communication parameter on a basis of the reception determination for the second signal; and
performing, with a transmitter, transmission on a basis of the controlled carrier sense or the controlled communication parameter, wherein
the control of the carrier sense includes control of a carrier sense time that includes a standby time from a time point at which a signal ceases to be received, and
the circuitry sets the standby time to a time obtained by consuming the standby time during reception of the second signal when the reception of the second signal is completed.

* * * * *